(12) United States Patent
Yamasaki et al.

(10) Patent No.: US 9,418,695 B2
(45) Date of Patent: Aug. 16, 2016

(54) OPTICAL INFORMATION APPARATUS AND INFORMATION PROCESSING APPARATUS

(71) Applicant: Panasonic Intellectual Property Management Co., Ltd., Osaka (JP)

(72) Inventors: Fumitomo Yamasaki, Nara (JP); Kousei Sano, Osaka (JP); Yoshiaki Komma, Osaka (JP); Kanji Wakabayashi, Kyoto (JP); Toshiyasu Tanaka, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/971,326

(22) Filed: Dec. 16, 2015

(65) Prior Publication Data

US 2016/0104505 A1    Apr. 14, 2016

Related U.S. Application Data

(63) Continuation of application No. PCT/JP2014/003260, filed on Jun. 17, 2014.

(30) Foreign Application Priority Data

Jun. 19, 2013 (JP) .................................. 2013-128389
Jun. 21, 2013 (JP) .................................. 2013-130874
Aug. 9, 2013 (JP) .................................. 2013-166769

(51) Int. Cl.
*G11B 7/135* (2012.01)
*G11B 7/1353* (2012.01)
(Continued)

(52) U.S. Cl.
CPC ............ *G11B 7/1353* (2013.01); *G11B 7/1395* (2013.01); *G11B 7/005* (2013.01); *G11B 7/131* (2013.01); *G11B 2007/0013* (2013.01)

(58) Field of Classification Search
None
See application file for complete search history.

(56) References Cited

U.S. PATENT DOCUMENTS 5,347,504 A    9/1994  Ito et al.
5,412,631 A *  5/1995  Komma ............... G11B 7/1353
                                                 369/103

(Continued)

FOREIGN PATENT DOCUMENTS

JP    62-234256    10/1987
JP    5-242512      9/1993
(Continued)

OTHER PUBLICATIONS

International Search Report issued Jul. 29, 2014 in International (PCT) Application No. PCT/JP2014/003260.
(Continued)

*Primary Examiner* — Peter Vincent Agustin
(74) *Attorney, Agent, or Firm* — Wenderoth, Lind & Ponack, L.L.P.

(57) ABSTRACT

An RF hologram is divided in a direction perpendicular to a tangent line of an information track of an information recording surface of an optical disc, and includes a central region including an optical axis of laser light as well as a first end portion region and a second end portion region which sandwich the central region, the central region is formed by a binary diffraction grating and generates ±1 order diffracted light, the first end portion region is formed by a blazed diffraction grating and generates first +1 order diffracted light, the second end portion region is formed by a blazed diffraction grating and generates second +1 order diffracted light, and an RF light receiving element receives both the ±1 order diffracted light, the first +1 order diffracted light, and the second +1 order diffracted light.

14 Claims, 63 Drawing Sheets

(51) Int. Cl.
  *G11B 7/1395* (2012.01)
  *G11B 7/005* (2006.01)
  *G11B 7/131* (2012.01)
  *G11B 7/00* (2006.01)

(56) References Cited

U.S. PATENT DOCUMENTS

| | | | |
|---|---|---|---|
| 5,430,701 A | 7/1995 | Ito et al. | |
| 5,440,536 A | 8/1995 | Ito et al. | |
| 5,623,462 A * | 4/1997 | Tezuka | G11B 7/0903 369/44.14 |
| 6,580,676 B1 | 6/2003 | Yanagisawa et al. | |
| 6,646,976 B1 | 11/2003 | Chung et al. | |
| 6,674,059 B1 * | 1/2004 | Nakano | G11B 7/1353 250/201.5 |
| 2001/0036133 A1 | 11/2001 | Nagata et al. | |
| 2001/0055257 A1 * | 12/2001 | Sato | G11B 7/1369 369/53.28 |
| 2003/0072224 A1 * | 4/2003 | Ando | G11B 7/0909 369/44.26 |
| 2004/0109242 A1 | 6/2004 | Komma et al. | |
| 2004/0223435 A1 | 11/2004 | Nishi et al. | |
| 2006/0104168 A1 * | 5/2006 | Arai | G11B 7/0901 369/44.26 |
| 2007/0097834 A1 * | 5/2007 | Sakai | G11B 7/1353 369/112.05 |
| 2008/0084797 A1 | 4/2008 | Sano et al. | |
| 2008/0175110 A1 | 7/2008 | Yamasaki et al. | |
| 2009/0278029 A1 | 11/2009 | Ogasawara et al. | |
| 2010/0142354 A1 * | 6/2010 | Kimura | G11B 7/1381 369/112.01 |
| 2012/0082201 A1 | 4/2012 | Shiraishi | |
| 2012/0151508 A1 | 6/2012 | Komma et al. | |
| 2012/0263025 A1 * | 10/2012 | Eiza | G11B 7/0945 369/44.11 |
| 2012/0281516 A1 | 11/2012 | Jung | |
| 2013/0088948 A1 * | 4/2013 | Kayama | G11B 7/1353 369/112.03 |
| 2014/0341007 A1 * | 11/2014 | Sano | G11B 7/005 369/47.17 |
| 2015/0138942 A1 | 5/2015 | Wakabayashi et al. | |
| 2016/0104505 A1 * | 4/2016 | Yamasaki | G11B 7/1395 369/110.03 |

FOREIGN PATENT DOCUMENTS

| | | |
|---|---|---|
| JP | 6-68473 | 3/1994 |
| JP | 8-249664 | 9/1996 |
| JP | 9-54952 | 2/1997 |
| JP | 11-328680 | 11/1999 |
| JP | 2001-189019 | 7/2001 |
| JP | 2001-256652 | 9/2001 |
| JP | 2002-190124 | 7/2002 |
| JP | 2007-66492 | 3/2007 |
| JP | 4909449 | 1/2012 |
| JP | 2012-79385 | 4/2012 |
| JP | 5002465 | 5/2012 |
| WO | 2013/179673 | 12/2013 |

OTHER PUBLICATIONS

International Search Report issued Jul. 29, 2014 in International (PCT) Application No. PCT/JP2014/003261.
Office Action issued May 16, 2016 in U.S. Appl. No. 14/848,882.

* cited by examiner

FIG. 26
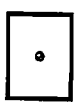
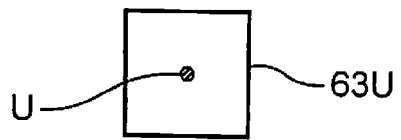
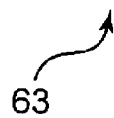
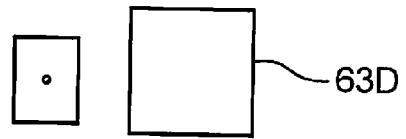

TANGENTIAL DIRECTION
OF INFORMATION TRACK
→ RADIAL DIRECTION

OPTICAL INFORMATION APPARATUS AND INFORMATION PROCESSING APPARATUS

TECHNICAL FIELD

The present disclosure relates to an optical information apparatus that records and/or reproduces information on and/or from a recording medium including a plurality of information recording surfaces and to an information processing apparatus such as a computer, a server, an optical disc player, an optical disc recorder, and the like which use the optical information apparatus.

BACKGROUND ART

The increasing practical use of blue-violet semiconductor lasers has led to the practical application of the Blu-ray Disc (hereinafter, also referred to as BD) which is a high-density, large-capacity optical information recording medium (hereinafter, also referred to as an optical disc) with the same size as CDs (Compact Discs) and DVDs. A BD is an optical disc for recording or reproducing information on or from an information recording surface having an approximately 0.1 mm-thick light transmission layer, by using a blue-violet laser light source that emits laser light with a wavelength of approximately 400 nm and an objective lens with a numerical aperture (hereinafter, also referred to as an NA) of approximately 0.85.

As a previous attempt to increase capacity of optical discs such as a BD, information recording surfaces have been given multilayered structures (multilayering).

However, the multilayering of an information recording surface creates a problem in that unnecessary light (so-called stray light) reflected by an information recording surface that differs from an information recording surface that is a recording or reproducing object converges at a light receiving section of a light receiving element that detects an information signal and/or a servo signal and interferes with signal light.

In consideration thereof, in order to solve such problems, for example, Patent Literature 1 discloses appropriately arranging a luminous flux splitting pattern of a diffraction grating used for detecting an information signal and/or a servo signal and a light receiving section pattern of a light receiving element. Accordingly, since stray light reflected by a plurality of information recording surfaces does not enter each light receiving section, even with a multilayered optical disc, an information signal and/or a servo signal is not affected by interference or an offset and stable signal detection can be realized.

In addition, for example, Patent Literature 2 discloses providing a light shielding section with low transmittance in a diffraction grating (a luminous flux splitting element) used for detecting an information signal and/or a servo signal. By shielding at least a central portion of a luminous flux, since the information signal and/or the servo signal and stray light reflected by an information recording surface that differs from an information recording surface that is a recording or reproducing object do not interfere with each other, stable signal detection can be realized.

Meanwhile, reducing intervals between information tracks (track pitch) of an optical disc or, in other words, attaining a narrow track pitch is known as means for increasing capacity of an optical disc. In this case, reducing the track pitch creates a problem of increasing so-called crosstalk where a signal of an information track (adjacent track) being adjacent to an information track that is an object of reproduction leaks into a reproduced signal and the crosstalk is included in the reproduced signal as noise.

In consideration thereof, in order to solve such problems, for example, Patent Literature 3 discloses an optical disc apparatus that reduces crosstalk (hereinafter, also referred to as crosstalk cancellation) by computing output of a light receiving element that receives a luminous flux split into three in a perpendicular direction to information tracks.

FIG. 63 is a diagram showing a configuration of a light receiving section of a conventional optical disc apparatus. As shown in FIG. 63, an output signal S of a light receiving section PD that receives a luminous flux LF split into three in a perpendicular direction to an information track may be computed based on the following equation.

$$S = k \cdot C + R + L,$$

where C denotes a signal from a central portion region, R denotes a signal from a right portion region, L denotes a signal from a left portion region, and k denotes a constant. Accordingly, crosstalk is reduced.

A further increase in the capacity (density) of optical discs such as a BD requires both multilayering and attaining a narrow track pitch.

However, none of the optical disc apparatuses disclosed in Patent Literature 1, 2, and 3 assumes a high-density optical disc having been multilayered and having attained a narrow track pitch. In addition, all of the optical disc apparatuses disclosed in Patent Literature 1, 2, and 3 completely fail to consider the effect of stray light reflected by an information recording surface that differs from an information recording surface that is a recording or reproducing object on the performance of crosstalk cancellation.

In other words, there is a problem in that interference between stray light caused as a result of multilayering and signal light prevents crosstalk cancellation from being achieved in a stable manner.

Patent Literature 1: Japanese Unexamined Patent Publication No. 2008-135151

Patent Literature 2: Japanese Unexamined Patent Publication No. 2008-198336

Patent Literature 3: Japanese Unexamined Patent Publication No. H5-242512

SUMMARY OF THE INVENTION

The present disclosure has been made in order to solve the problems described above and an object thereof is to provide an optical information apparatus and an information processing apparatus capable of stably recording or reproducing information on or from a recording medium having been multilayered and having attained a narrow track pitch.

In one general aspect, the techniques disclosed here feature an optical information apparatus according to an aspect of the present disclosure is an optical information apparatus that records and/or reproduces information on and/or from a recording medium having a plurality of information recording surfaces, the optical information apparatus including: a light source that emits laser light with a wavelength of λ; an objective lens that causes the laser light from the light source to converge on any of the plurality of information recording surfaces of the recording medium; a luminous flux splitting element which is divided in a direction perpendicular to a tangent line of an information track of the information recording surface of the recording medium, which has a central region including an optical axis of the laser light and a first end portion region and a second end portion region that sandwich the central region, and which splits the laser light reflected by any of the information recording surfaces of the recording medium into a luminous flux diffracted by the central region, a luminous flux diffracted by the first end portion region, and a luminous flux diffracted by the second end portion region; a first light detector which receives a plurality of luminous fluxes split by the luminous flux splitting element and which outputs a plurality of signals in accordance with light intensities of the plurality of received luminous fluxes; a plurality of waveform equalizers which impart different gains to the plurality of signals output from the first light detector in accordance with a frequency component of each signal; an adder which adds up a plurality of signals output from the plurality of waveform equalizers and which outputs the added signals as an information signal; and a signal processing section which processes the information signal, wherein the central region is formed by a binary diffraction grating and generates ±1 order diffracted light from the laser light incident on the central region, the first end portion region is formed by a blazed diffraction grating and generates first +1 order diffracted light from the laser light incident on the first end portion region, the second end portion region is formed by a blazed diffraction grating and generates second +1 order diffracted light from the laser light incident on the second end portion region, and the first light detector receives both the ±1 order diffracted light generated by the central region, the first +1 order diffracted light generated by the first end portion region, and the second +1 order diffracted light generated by the second end portion region.

These general and specific aspects may be implemented using a system, a method, and a computer program, and any combination of systems, methods, and computer programs.

BRIEF DESCRIPTION OF THE DRAWINGS

FIG. 26 is a diagram showing diffracted light incident on an RF light receiving element in a case where a luminous flux is offset to a side of a first adjustment region.

DETAILED DESCRIPTION

Hereinafter, embodiments of the present disclosure will be described with reference to the drawings. It is to be understood that the following embodiments are merely examples embodying the present disclosure and are not intended to limit the technical scope of the present disclosure.

First Embodiment

Figure 1:
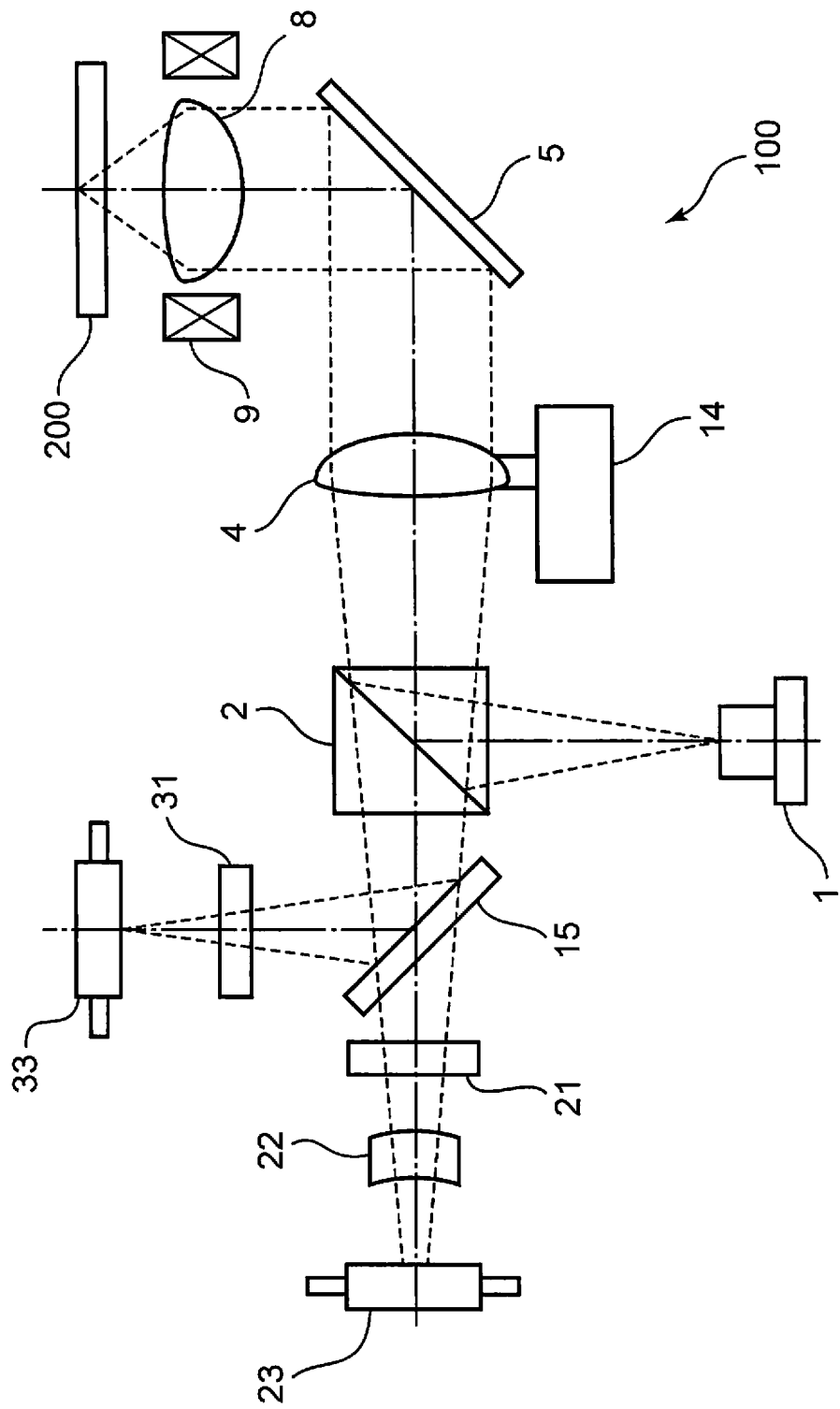
FIG. 1 is a diagram showing a schematic configuration of an optical pickup in an optical disc apparatus according to a first embodiment of the present disclosure.

FIG. 1 is a diagram showing a schematic configuration of an optical pickup in an optical disc apparatus according to the first embodiment of the present disclosure.

In FIG. 1, an optical pickup 100 includes a blue-violet laser light source 1 that emits blue-violet laser light, a polarizing beam splitter 2, a collimating lens 4, a mirror 5, an objective lens 8, an objective lens actuator 9, a collimating lens actuator 14, a plate beam splitter 15, a servo hologram 21, an anamorphic lens 22, a servo light receiving element 23, an RF hologram 31, and an RF light receiving element 33. In addition, a high-density optical disc 200 is an optical disc having been multilayered and having attained a narrow track pitch.

Operations of the optical pickup 100 that records and/or reproduces information on and/or from the high-density optical disc 200 will now be described. Blue-violet laser light emitted from the blue-violet laser light source 1 is incident on the polarizing beam splitter 2. The blue-violet laser light reflected by the polarizing beam splitter 2 is converted into approximately parallel light by the collimating lens 4 and reflected and bent by the mirror 5. The blue-violet laser light reflected by the mirror 5 is caused to converge on an information recording surface of the high-density optical disc 200 as a light spot by the objective lens 8.

The collimating lens 4 is configured to be movable in a direction of an optical axis of the collimating lens 4 by the collimating lens actuator 14. Therefore, when recording and/or reproducing information on and/or from the high-density optical disc 200 having a plurality of information recording surfaces, the collimating lens actuator 14 can correct spherical aberration by moving the collimating lens 4 in accordance with a thickness of a light transmission layer of each information recording surface. In addition, by moving the collimating lens 4 in the optical axis direction, the collimating lens actuator 14 can also correct spherical aberration created by a variation in wavelengths of blue-violet laser light emitted from the blue-violet laser light source 1 as well as spherical aberration created as temperature changes.

The blue-violet laser light reflected by an information recording surface of the high-density optical disc 200 is once again transmitted through the objective lens 8 and reflected by the mirror 5. The blue-violet laser light reflected by the mirror 5 is transmitted through the collimating lens 4, transmitted through the polarizing beam splitter 2 and the plate beam splitter 15, and transmitted and diffracted by the servo hologram 21. The blue-violet laser light transmitted and diffracted by the servo hologram 21 enters the servo light receiving element 23 via the anamorphic lens 22 and forms a detected spot on the servo light receiving element 23. The servo light receiving element 23 photoelectrically converts the detected blue-violet laser light. A photoelectrically-converted signal is computed to generate a focusing error signal for following surface wobbling of the high-density optical disc 200 and a tracking error signal for following eccentricity of the high-density optical disc 200.

The focusing error signal for following surface wobbling of the high-density optical disc 200 can be generated using a so-called astigmatic method in which blue-violet laser light imparted with astigmatism by the anamorphic lens 22 is detected by a four-way splitting light receiving pattern in the servo light receiving element 23.

Meanwhile, the tracking error signal for following eccentricity of the high-density optical disc 200 is generated by detecting 0 order light and 1 order diffracted light that are generated upon transmission and diffraction at the servo hologram 21 by a prescribed light receiving section of the servo light receiving element 23. Accordingly, a fluctuation of the tracking error signal which is created when variations exist in positions, widths, and depths of grooves of information tracks formed on the high-density optical disc 200 can be suppressed. In addition, a fluctuation in the tracking error signal which is created when information is recorded on an information track and reflectance changes can also be suppressed. Furthermore, incidence of stray light reflected by an information recording surface that differs from an information recording surface that is a recording or reproducing object to a light receiving section that detects the tracking error signal can be avoided.

Moreover, the detection of a focusing error signal and a tracking error signal are not limited to these detection methods and, for example, a differential push-pull method (DPP method) using a main beam and a sub beam generated by a diffraction grating can be used to detect a tracking error signal.

The objective lens actuator 9 supports the objective lens 8 by a plurality of suspension wires. In response to a focusing error signal and a tracking error signal, the objective lens actuator 9 drives the objective lens 8 in at least directions of two axes (a focusing direction and a tracking direction) so that a light spot follows an information track of the rotating high-density optical disc 200.

Meanwhile, the blue-violet laser light reflected by the plate beam splitter 15 is transmitted and/or diffracted by the RF hologram 31 and enters the RF light receiving element 33, and forms a detected spot on the RF light receiving element 33. The RF light receiving element photoelectrically converts the detected blue-violet laser light. The photoelectrically-converted signal is computed to generate an information signal.

Figure 2:
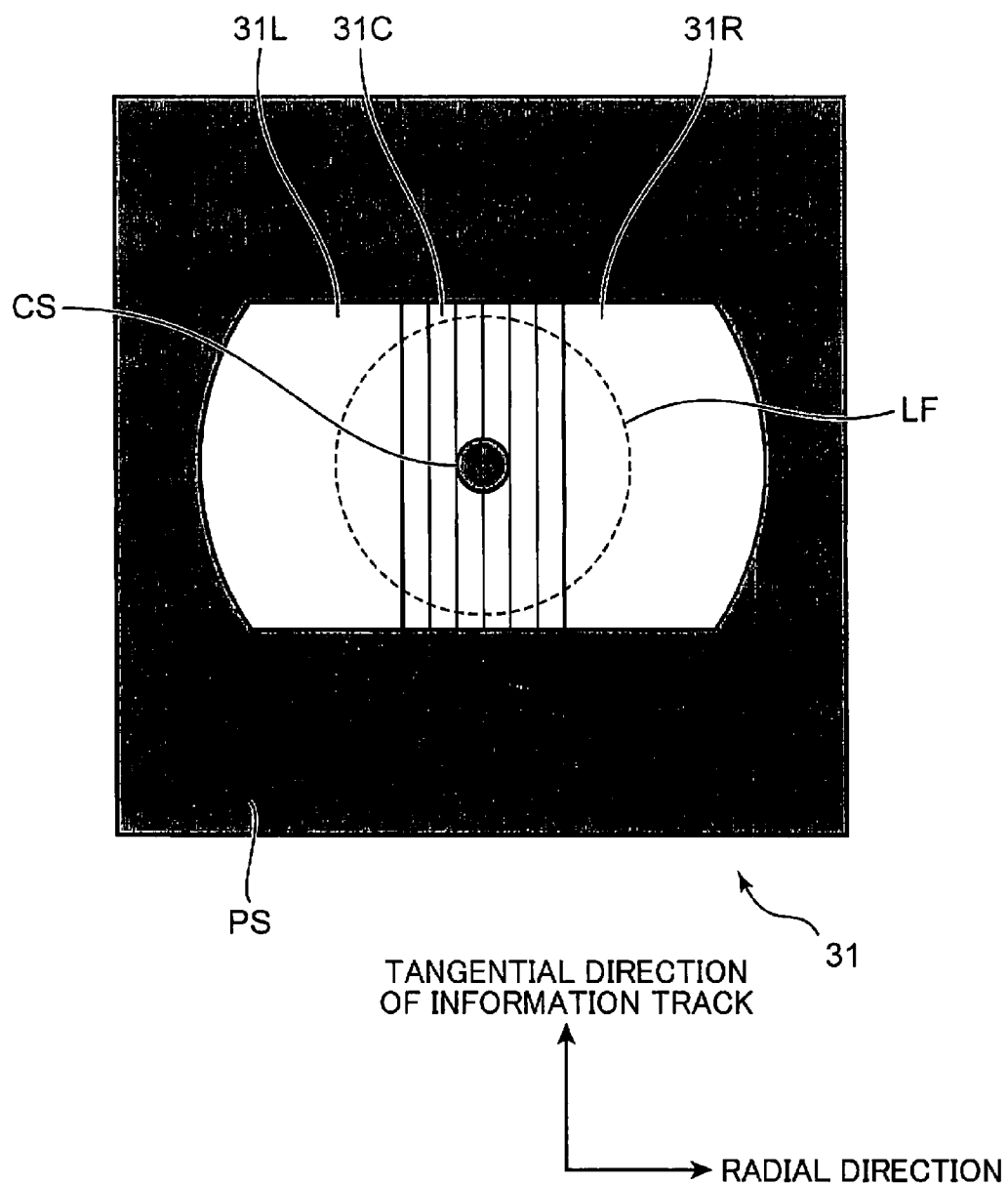
FIG. 2 is a diagram showing a configuration of an RF hologram according to the first embodiment of the present disclosure.

FIG. 2 is a diagram showing a configuration of an RF hologram according to the first embodiment of the present disclosure.

As shown in FIG. 2, the RF hologram 31 is divided into three in a radial direction of the high-density optical disc 200 (a direction perpendicular to a tangent line of an information track), and includes a central region 31C including an optical axis of laser light as well as a first end portion region 31R and a second end portion region 31L which sandwich the central region 31C. In addition, a central shielding section CS which does not transmit blue-violet laser light or which has lower transmittance relative to the central region 31C is formed at a center of the central region 31C. Furthermore, a peripheral shielding section PS which does not transmit blue-violet laser light or which has lower transmittance relative to the central region 31C, the first end portion region 31R, and the second end portion region 31L is formed at a periphery of the central region 31C, the first end portion region 31R, and the second end portion region 31L.

The central shielding section CS and the peripheral shielding section PS are formed by, for example, vapor deposition of a metallic film made of aluminum, chromium, graphite, titanium, gold, silver, or the like or a dielectric film. The transmittance of the central shielding section CS and the peripheral shielding section PS is approximately 0%. Moreover, while the transmittance of the central shielding section CS and the peripheral shielding section PS is desirably close to 0%, substantially, no problems will arise if the transmittance is equal to or lower than 10%.

The central shielding section CS and/or the peripheral shielding section PS may be respectively formed as a diffracting structure that diffracts incident blue-violet laser light at a prescribed angle. When a light shielding section is formed using a diffracting structure in this manner, a depth of the diffracting structure is desirably optimized so that the transmittance of the light shielding section with respect to blue-violet laser light is approximately 0%. Moreover, while the transmittance of the central shielding section CS and the peripheral shielding section PS using a diffracting structure is desirably close to 0%, substantially, no problems will arise if the transmittance is equal to or lower than 10%.

A luminous flux LF (depicted by a dashed line) incident on each region of the RF hologram 31 is transmitted and/or diffracted and enters a corresponding light receiving section on the RF light receiving element 33.

Figure 3:
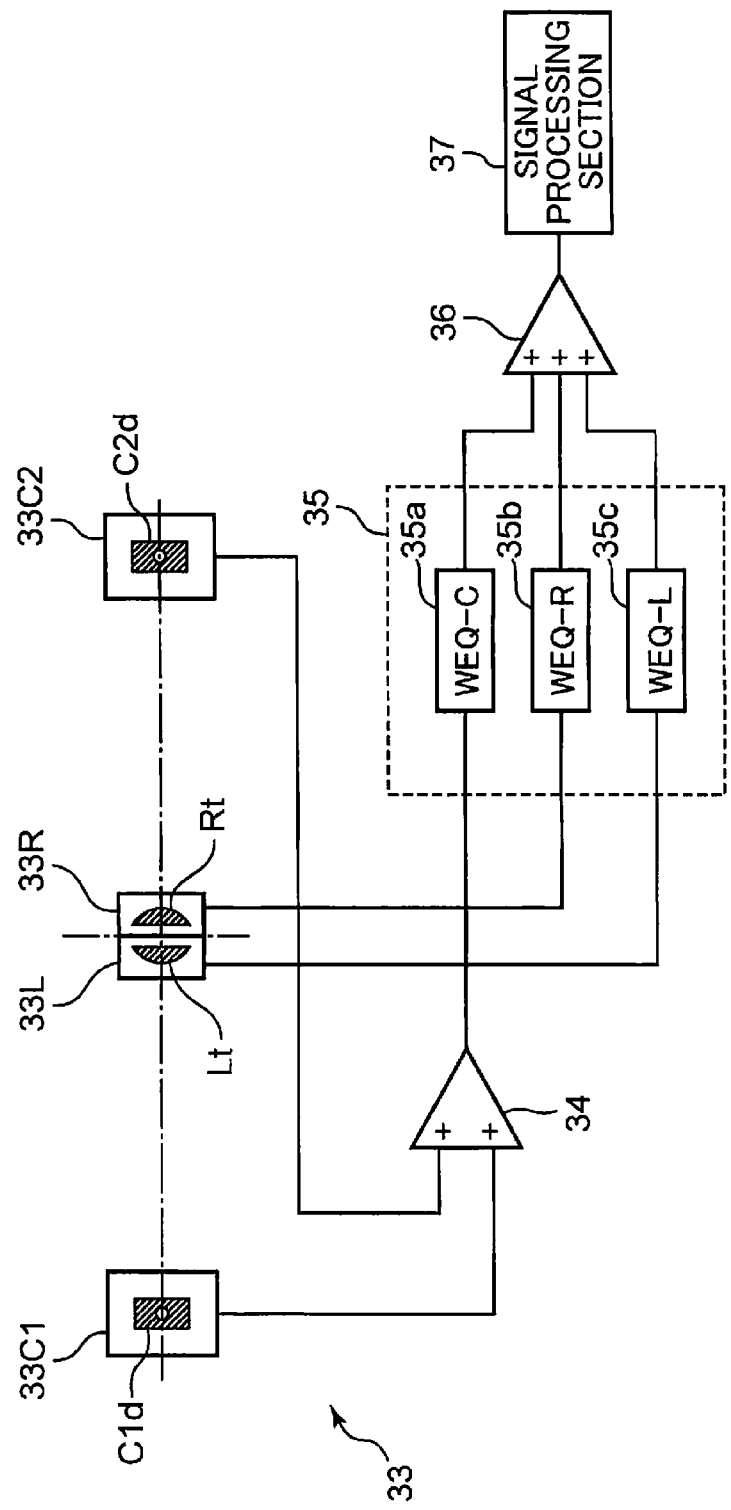
FIG. 3 is a diagram showing a configuration of an RF light receiving element according to the first embodiment of the present disclosure.

FIG. 3 is a diagram showing a configuration of an RF light receiving element according to the present first embodiment of the present disclosure. Moreover, in FIG. 3, an intersection of dashed-dotted lines represents an optical axis position of 0 order light (transmitted light).

The RF light receiving element 33 receives a plurality of luminous fluxes split by the RF hologram 31 and outputs a plurality of signals in accordance with light intensities of the plurality of received luminous fluxes. The RF light receiving element 33 includes a first central portion light receiving section 33C1, a second central portion light receiving section 33C2, a first end portion light receiving section 33R, and a second end portion light receiving section 33L.

+1 order diffracted light C1$d$ and −1 order diffracted light C2$d$ having been diffracted by the central region 31C respectively enter the first central portion light receiving section 33C1 and the second central portion light receiving section 33C2 on the RF light receiving element 33. 0 order light Rt transmitted through the first end portion region 31R and 0 order light Lt transmitted through the second end portion region 31L respectively enter the first end portion light receiving section 33R and the second end portion light receiving section 33L on the RF light receiving element 33. The RF light receiving element 33 outputs signals in accordance with light intensities of diffracted light C1$d$, C2$d$, Rt, and Lt received by the respective light receiving sections 33C1, 33C2, 33R, and 33L.

The first central portion light receiving section 33C1 outputs a signal to an adder 34 and the second central portion light receiving section 33C2 outputs a signal to the adder 34. The first end portion light receiving section 33R outputs a signal to a gain controller 35 and the second end portion light receiving section 33L outputs a signal to the gain controller 35.

The adder 34 adds up the signal output from the first central portion light receiving section 33C1 and the signal output from the second central portion light receiving section 33C2 and outputs the added signal to the gain controller 35.

The gain controller 35 includes a first waveform equalizer (WEQ-C) 35$a$, a second waveform equalizer (WEQ-R) 35$b$, and a third waveform equalizer (WEQ-L) 35$c$. The first to third waveform equalizers 35$a$ to 35$c$ impart different gains to the plurality of signals output from the RF light receiving element 33 in accordance with a frequency component of each signal. After being subjected to waveform equalization by the first to third waveform equalizers 35$a$ to 35$c$ of the gain controller 35, each signal is output to an adder 36. The first waveform equalizer 35$a$ performs waveform equalization on a signal output from the adder 34. The second waveform equalizer 35$b$ performs waveform equalization on a signal output from the first end portion light receiving section 33R. The third waveform equalizer 35$c$ performs waveform equalization on a signal output from the second end portion light receiving section 33L.

The adder 36 adds up the plurality of signals output from the first to third waveform equalizers 35$a$ to 35$c$ and outputs the added signal as an information signal. The information signal output from the adder 36 is a signal in which crosstalk that is leakage of a signal from an adjacent track has been suppressed. Therefore, a signal processing section 37 reproduces the information signal at a low error rate. The signal processing section 37 processes the information signal.

Moreover, 0 order light Rt transmitted through the first end portion region 31R and 0 order light Lt transmitted through the second end portion region 31L are detected respectively separated from one another by the first end portion light receiving section 33R and the second end portion light receiving section 33L on the RF light receiving element 33. Therefore, it should be noted that a detected spot on the RF light receiving element 33 is in a state where the detected spot is not completely converged or, in other words, a state where the detected spot is slightly out of focus.

Moreover, the optical disc apparatus (optical information apparatus) according to the present embodiment includes the optical pickup 100 shown in FIG. 1, the adder 34, the gain controller 35, the adder 36, and the signal processing section 37.

Figure 4:
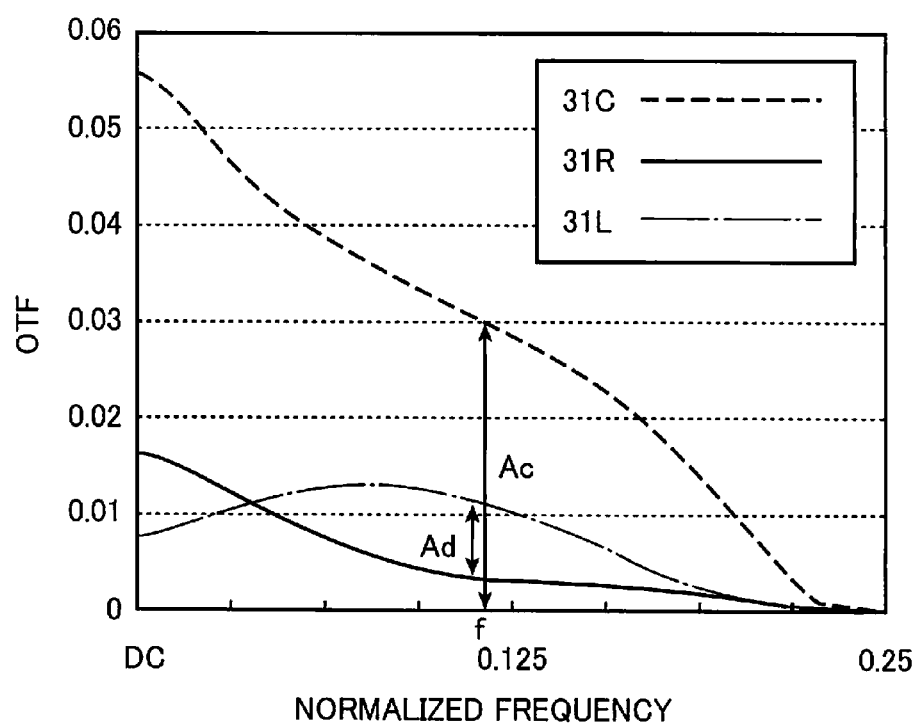
FIG. 4 is a diagram showing an amplitude of an optical transfer function (OTF) of an adjacent track of each region of an RF hologram in a case where information is reproduced from a high-density optical disc.
Figure 5:
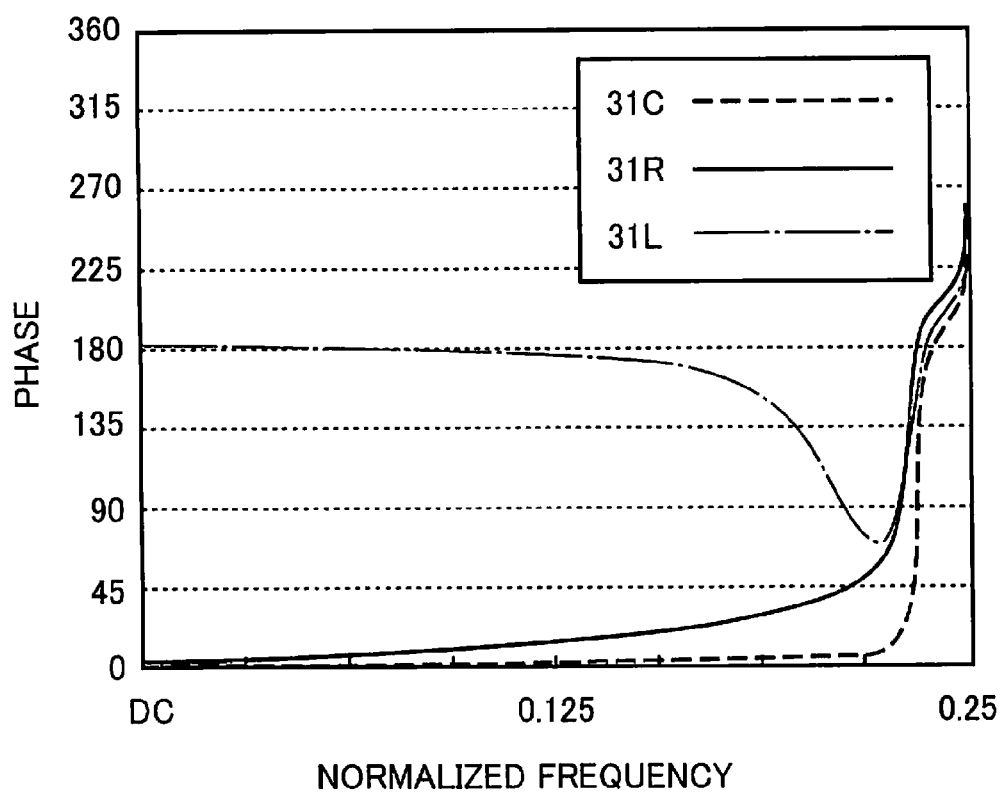
FIG. 5 is a diagram showing a phase of an OTF of an adjacent track of each region of an RF hologram in a case where information is reproduced from a high-density optical disc.

FIG. 4 is a diagram showing an amplitude of an optical transfer function (OTF) of an adjacent track of each region of the RF hologram 31 in a case where information is reproduced from a high-density optical disc, and FIG. 5 is a diagram showing a phase of the OTF of an adjacent track of each region of the RF hologram 31 in a case where information is reproduced from a high-density optical disc.

With a high-density optical disc, information can be recorded in both a land portion and a groove portion of an information track. In addition, a groove pitch of a high-density optical disc is 0.48 μm (a spacing between a land portion and a groove portion is 0.24 μm), a ratio of a width of a land portion to a width of a groove portion is 1:1, a depth of a groove is 0.03λ, and a mark width is 0.16 μm. FIGS. 4 and 5 show an optical transfer function (OTF) of an adjacent track of each region in a far field when this optical disc is reproduced by an optical disc apparatus with a numerical aperture of 0.85 and a laser light wavelength λ of 405 nm.

Specifically, in the RF hologram 31 shown in FIG. 2, a reproduced signal at a position being off-track by 0.24 μm from a reproduced track (in other words, a reproduced signal on an adjacent track) is calculated for each region (the central region 31C, the first end portion region 31R, and the second end portion region 31L) in a case where a width of the central region 31C in a radial direction is set to 35% of a luminous flux diameter. In addition, the OTF is calculated by performing a Fourier transform on each reproduced signal. FIG. 4 shows amplitude and FIG. 5 shows phase.

In FIGS. 4 and 5, horizontal axes represent normalized frequency. In this case, 1T denotes a value obtained by normalizing an assumed mark string of 55.87 nm by a frequency corresponding to a period of 55.87 nm. In other words, a normalized frequency 0.25 corresponds to a frequency equivalent to a period of 4T (a repetition of a 2T mark and a 2T space). A period of an optical cutoff of an optical system is λ/(2·NA)=238.2 nm and corresponds to 0.2345 when expressed as a normalized frequency.

Moreover, a vertical axis in FIG. 4 represents an arbitrary unit and a vertical axis in FIG. 5 represents a phase.

In the OTF on an adjacent track shown in FIGS. 4 and 5, a phase of one of the two end portion regions, namely, the second end portion region 31L is inverted by 180 degrees and has a polarity that differs from those of other regions. In addition, it is shown that the amplitude of the other end portion region, namely, the first end portion region 31R is particularly small at middle-range frequencies.

Crosstalk cancellation is computed by adding up, for a prescribed frequency f, an amplitude Ac of a crosstalk component detected in the central region 31C and a difference Ad between amplitudes of crosstalk components detected in the first end portion region 31R and the second end portion region 31L. Since a polarity of the amplitude Ac and a polarity of the difference Ad differ from each other, the amplitude Ac and the difference Ad can cancel each other out by being added up.

In consideration thereof, the present inventors found that, by increasing a gain (increasing a ratio of light intensity) of the first end portion region 31R and the second end portion region 31L with respect to the central region 31C, crosstalk from an adjacent track can be effectively reduced.

Specifically, a new finding was made in that, in FIG. 4, an average gain of the first end portion region 31R and the second end portion region 31L is desirably set to around several times an average gain of the central region 31C and, in an optical system of an optical pickup, a loss in light intensity of the first end portion region 31R and the second end portion region 31L which contribute significantly to an amplitude of an information signal is desirably minimized.

In other words, the plurality of waveform equalizers (the first to third waveform equalizers 35a to 35c) of the gain controller 35 favorably perform waveform equalization so that energy of a signal detected in the first end portion region 31R and the second end portion region 31L is greater than energy of a signal detected in the central region 31C. In consideration thereof, the plurality of waveform equalizers 35a to 35c impart gains to a plurality of signals output from the RF light receiving element 33 so that energy of a signal in accordance with light intensity of laser light incident on the first end portion region 31R and the second end portion region 31L is greater than energy of a signal in accordance with light intensity of laser light incident on the central region 31C.

In the RF hologram 31 according to the present first embodiment shown in FIG. 2, the central region 31C is formed by a binary simple diffraction grating, generates +1 order diffracted light C1d and −1 order diffracted light C2d from a luminous flux incident on the central region 31C, and causes the +1 order diffracted light C1d and the −1 order diffracted light C2d to respectively enter the first central portion light receiving section 33C1 and the second central portion light receiving section 33C2 on the RF light receiving element 33. At this point, diffraction efficiencies of the +1 order diffracted light C1d and the −1 order diffracted light C2d (including an AR coating for reducing reflection) are respectively around 35% (70% when combined). Moreover, favorably, the diffraction efficiencies of the +1 order diffracted light C1d and the −1 order diffracted light C2d are, respectively, substantially 30% or higher (60% or higher when combined).

On the other hand, diffraction gratings are not formed in the first end portion region 31R and the second end portion region 31L. The first end portion region 31R and the second end portion region 31L respectively convert an incident luminous flux into 0 order light Rt and 0 order light Lt and cause the 0 order light Rt and the 0 order light Lt to enter the first end portion light receiving section 33R and the second end portion light receiving section 33L on the RF light receiving element 33. At this point, taking AR coating for reducing reflection into consideration, transmittances of the first end portion region 31R and the second end portion region 31L with respect to the 0 order light Rt and the 0 order light Lt are around 97%. Moreover, the transmittances of the first end portion region 31R and the second end portion region 31L are favorably substantially 90% or higher and more favorably substantially 95% or higher.

Therefore, since a loss in light intensity of the first end portion region 31R and the second end portion region 31L which contribute significantly to an amplitude of an information signal is approximately zero, an information signal with a high signal-to-noise intensity ratio (S/N) can be obtained.

Moreover, with respect to an optical disc in which wobbling (meandering) is applied to information tracks, by reading information recorded in a wobble signal, any address on the optical disc can be accessed and information can be recorded and/or reproduced.

Generally, a wobble signal is obtained by splitting a luminous flux reflected by an information recording surface of an optical disc into two in a radial direction of the optical disc (a perpendicular direction to an information track) and calculating a difference signal (a push-pull signal) thereof.

The optical disc apparatus according to the present first embodiment may further include a wobble signal generating section that generates a wobble signal by calculating a difference signal (a push-pull signal) between a signal detected from 0 order light Rt which is transmitted through the first end portion region 31R of the RF hologram 31 and which is incident on the first end portion light receiving section 33R on the RF light receiving element 33 and a signal detected from 0 order light Lt which is transmitted through the second end portion region 31L of the RF hologram 31 and which is incident on the second end portion light receiving section 33L on the RF light receiving element 33.

Since the high-density optical disc 200 according to the present embodiment is a multilayered optical disc, stray light reflected by an information recording surface that differs from an information recording surface that is a recording or reproducing object is incident on the RF hologram 31.

Figure 6:
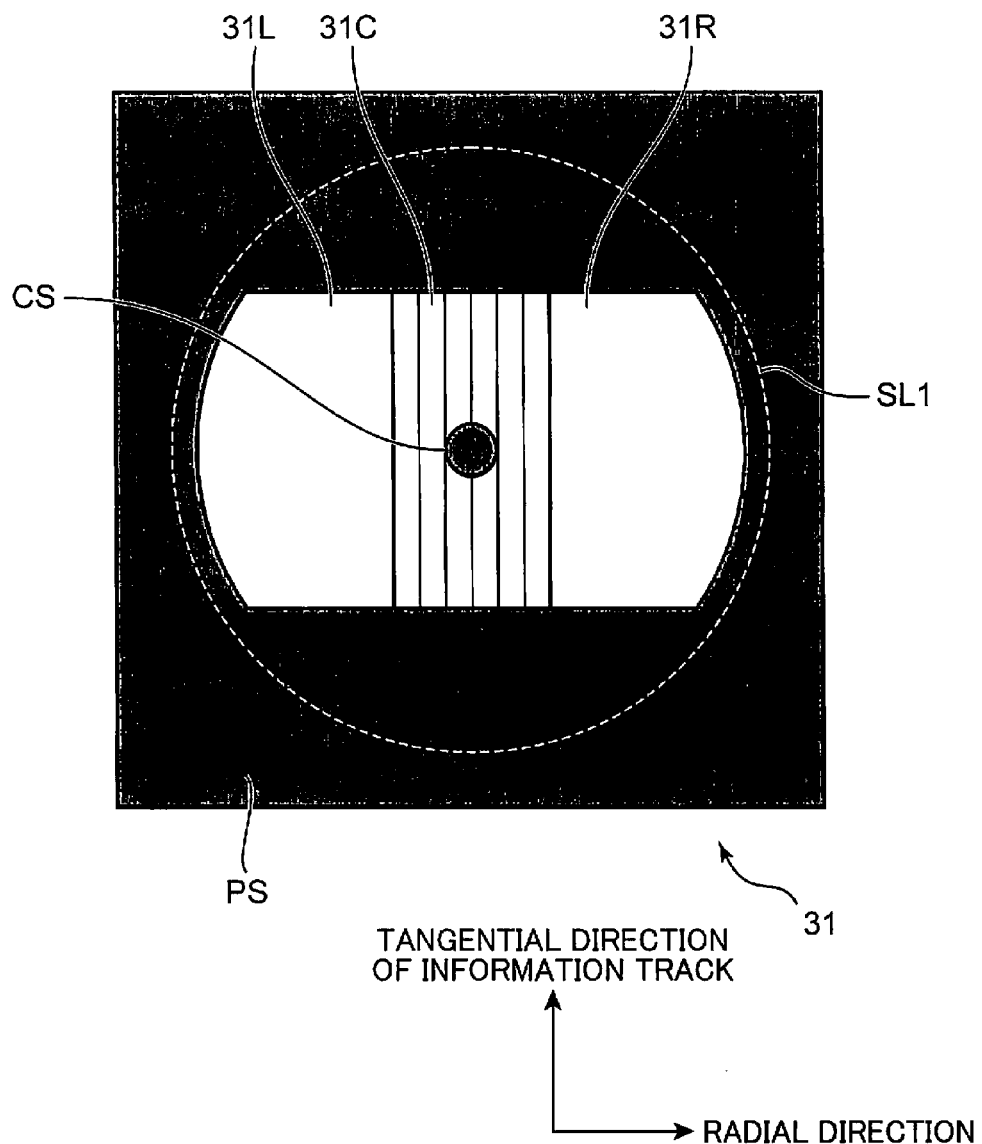
FIG. 6 is a diagram for explaining stray light reflected by an information recording surface positioned on a light incidence surface side relative to an information recording surface that is a recording or reproducing object in an RF hologram.
Figure 7:
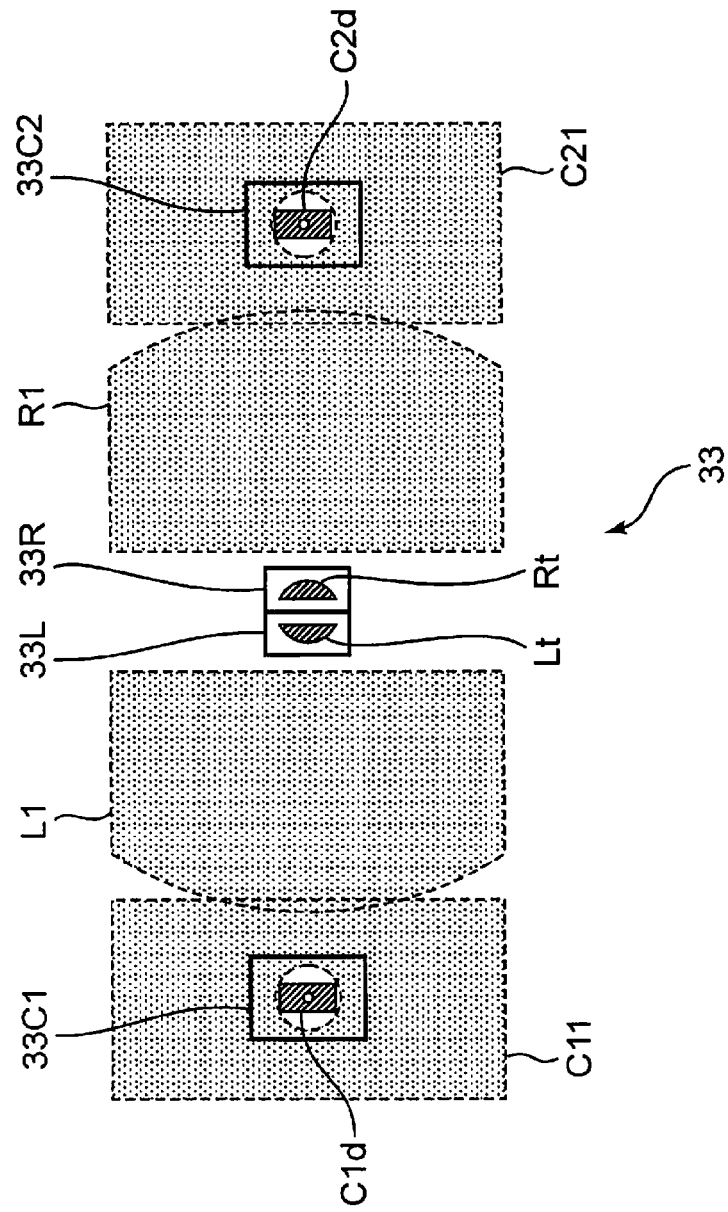
FIG. 7 is a diagram for explaining stray light reflected by an information recording surface positioned on a light incidence surface side relative to an information recording surface that is a recording or reproducing object in an RF light receiving element.

FIG. 6 is a diagram for explaining stray light reflected by an information recording surface positioned on a light incidence surface side relative to an information recording surface that is a recording or reproducing object in an RF hologram, and FIG. 7 is a diagram for explaining stray light reflected by an information recording surface positioned on a light incidence surface side relative to the information recording surface that is a recording or reproducing object in an RF light receiving element.

First another layer-reflected stray light SL1 reflected by an information recording surface that is, for example, positioned 40 μm in front (on a light incidence surface side) of an information recording surface that is a recording or reproducing object is incident on the RF hologram 31 in a shape depicted by a dashed line in FIG. 6. The first another layer-reflected stray light SL1 becomes larger than a luminous flux LF reflected by the information recording surface that is a recording or reproducing object and a part of the first another layer-reflected stray light SL1 is shielded by the central shielding section CS and the peripheral shielding section PS. The first another layer-reflected stray light SL1 incident on the central region 31C of the RF hologram 31 enters the RF light receiving element 33 as +1 order diffracted light C11 and −1 order diffracted light C12. Meanwhile, the first another layer-reflected stray light SL1 incident on the first end portion region 31R and the second end portion region 31L of the RF hologram 31 enters the RF light receiving element 33 as 0 order light R1 and 0 order light L1 which are respectively transmitted light.

However, as shown in FIG. 7, none of the +1 order diffracted light C11, the −1 order diffracted light C21, the 0 order light R1, and the 0 order light L1 overlaps on the RF light receiving element 33 with signal light C1$d$, C2$d$, Rt, and Lt reflected by the information recording surface that is a recording or reproducing object.

Figure 8:
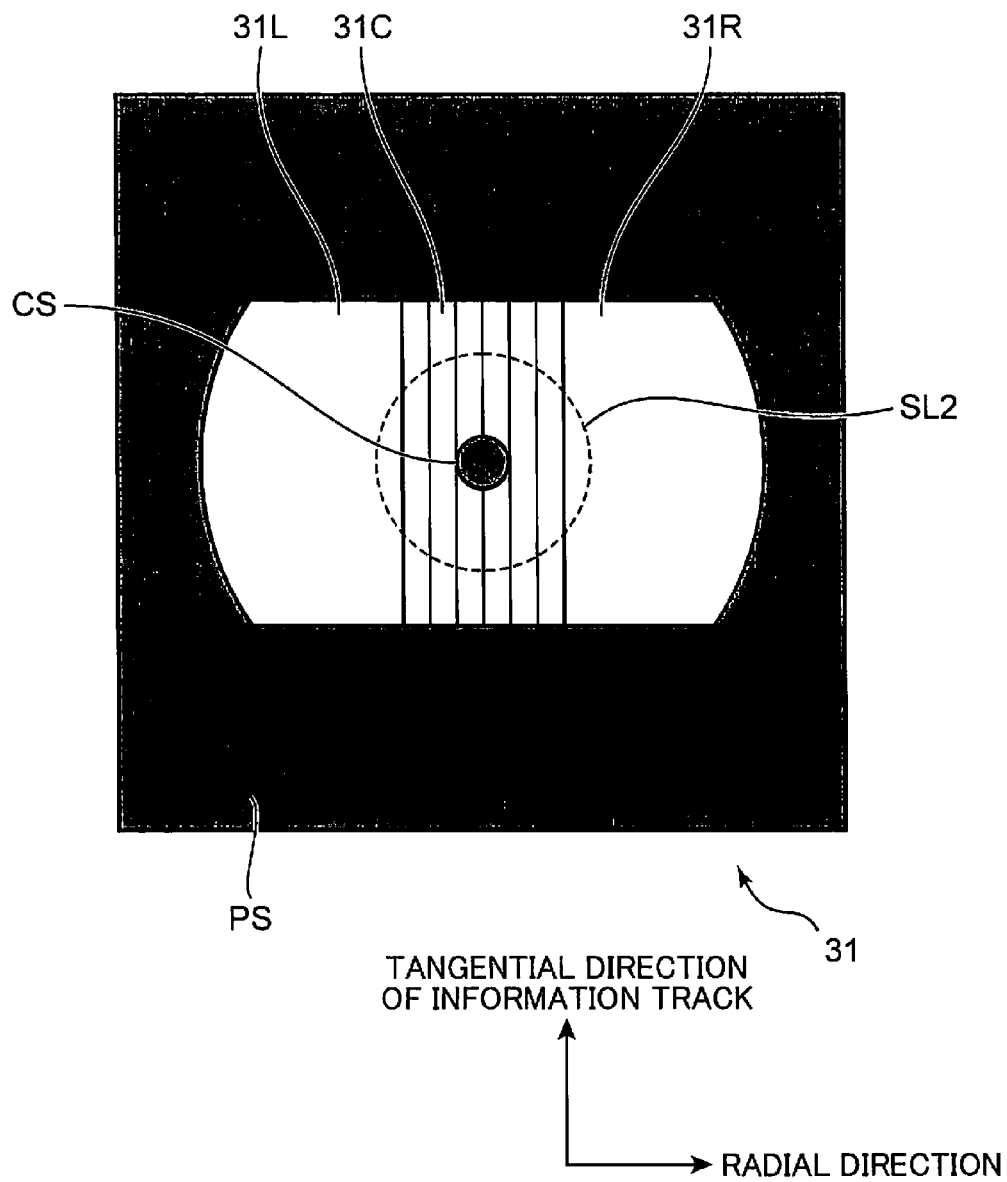
FIG. 8 is a diagram for explaining stray light reflected by an information recording surface positioned on a side of a surface opposite to a light incidence surface side relative to an information recording surface that is a recording or reproducing object in an RF hologram.
Figure 9:
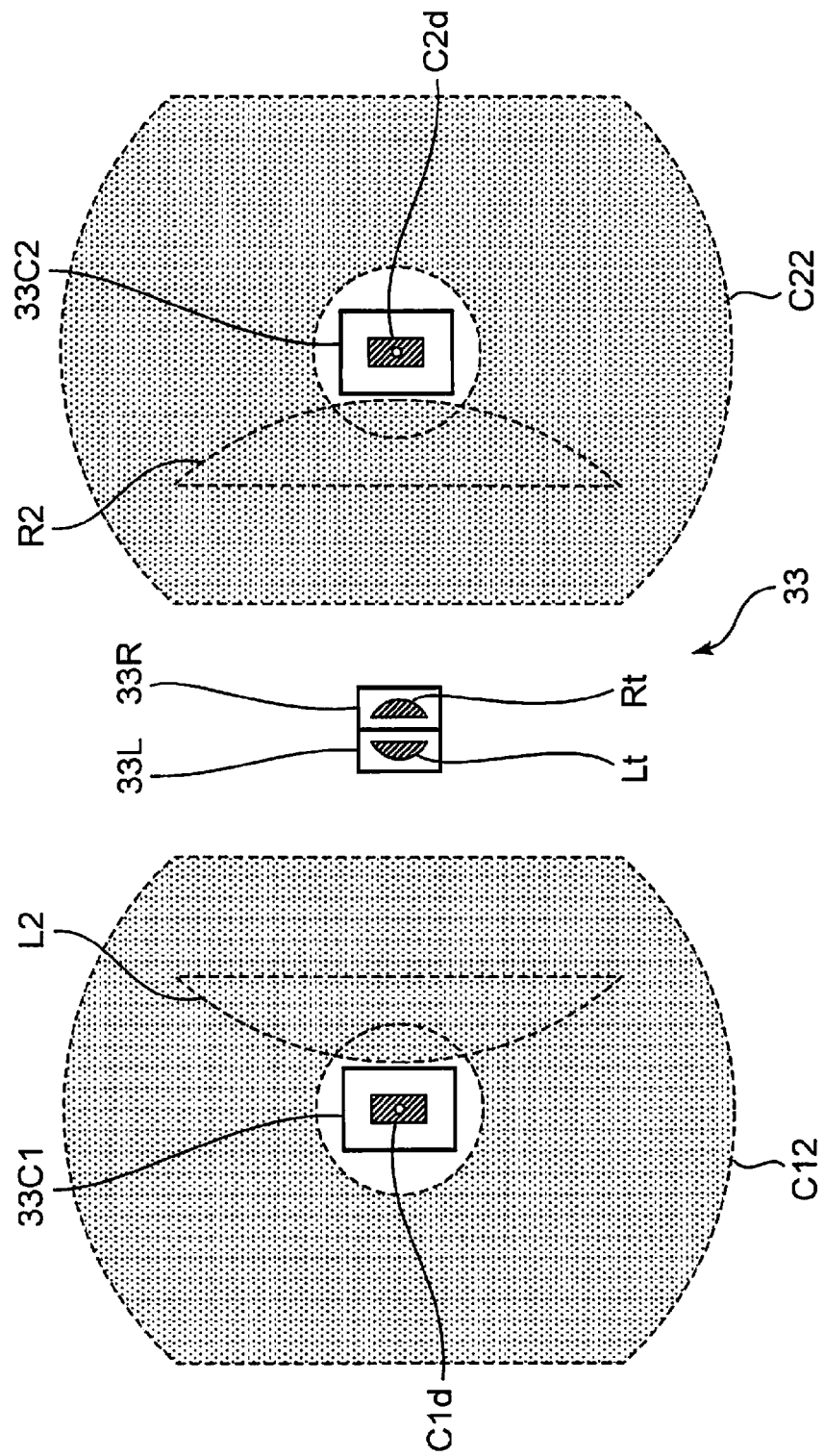
FIG. 9 is a diagram for explaining stray light reflected by an information recording surface positioned on a side of a surface opposite to a light incidence surface side relative to an information recording surface that is a recording or reproducing object in an RF light receiving element.

FIG. 8 is a diagram for explaining stray light reflected by an information recording surface positioned on a side of a surface opposite to a light incidence surface side relative to an information recording surface that is a recording or reproducing object in an RF hologram, and FIG. 9 is a diagram for explaining stray light reflected by an information recording surface positioned on a side of a surface opposite to a light incidence surface side relative to the information recording surface that is a recording or reproducing object in an RF light receiving element.

Second another layer-reflected stray light SL2 reflected by an information recording surface that is, for example, positioned 40 μm to the back (on a side of a surface opposite to the light incidence surface side) of an information recording surface that is a recording or reproducing object is incident on the RF hologram 31 in a shape depicted by a dashed line in FIG. 8. The second another layer-reflected stray light SL2 becomes smaller than the luminous flux LF reflected by the information recording surface that is a recording or reproducing object and a part of the second another layer-reflected stray light SL2 is shielded by the central shielding section CS. The second another layer-reflected stray light SL2 incident on the central region 31C of the RF hologram 31 enters the RF light receiving element 33 as +1 order diffracted light C12 and −1 order diffracted light C22. Meanwhile, the second another layer-reflected stray light SL2 incident on the first end portion region 31R and the second end portion region 31L of the RF hologram 31 enters the RF light receiving element 33 as 0 order light R2 and 0 order light L2 which are respectively transmitted light.

However, as shown in FIG. 9, none of the +1 order diffracted light C12, the −1 order diffracted light C22, the 0 order light R2, and the 0 order light L2 overlaps on the RF light receiving element 33 with signal light C1$d$, C2$d$, Rt, and Lt reflected by the information recording surface that is a recording or reproducing object.

In the present embodiment, the first another layer-reflected stray light SL1 reflected by an information recording surface positioned 40 μm in front of an information recording surface that is a recording or reproducing object and the second another layer-reflected stray light SL2 reflected by an information recording surface positioned 40 μm to the back of the information recording surface that is a recording or reproducing object are exemplified to show that the first another layer-reflected stray light SL1 and the second another layer-reflected stray light SL2 incident on the RF hologram 31 do not overlap on the RF light receiving element 33 with signal light reflected by the information recording surface that is a recording or reproducing object. However, spacing between an information recording surface that is a recording or reproducing object and another information recording surface is not limited to ±40 μm, and another layer-reflected stray light incident on the RF hologram 31 and reflected by another information recording surface does not overlap on the RF light receiving element 33 with signal light reflected by the information recording surface that is a recording or reproducing object.

In addition, surface-reflected stray light reflected by the surface of a high-density optical disc and incident on the RF hologram 31 also does not overlap on the RF light receiving element 33 with signal light reflected by the information recording surface that is a recording or reproducing object.

Therefore, while the optical pickup 100 according to the present embodiment includes the RF hologram 31 which only causes a significantly small loss in light intensity of the first end portion region 31R and the second end portion region 31L which contribute significantly to an amplitude of an information signal or, in other words, the RF hologram 31 suitable for crosstalk cancellation, another layer-reflected stray light and surface-reflected stray light incident on the RF hologram 31 do not overlap on the RF light receiving element 33 with signal light reflected by the information recording surface that is a recording or reproducing object. Therefore, signal light and stray light do not interfere with each other. As a result, stable signal detection can be realized when recording or reproducing information on or from a high-density optical disc having been multilayered and having attained a narrow track pitch.

Moreover, an RF hologram and an RF light receiving element shown in the present embodiment are not limited to the configurations shown in FIGS. 2 and 3.

Figure 10:
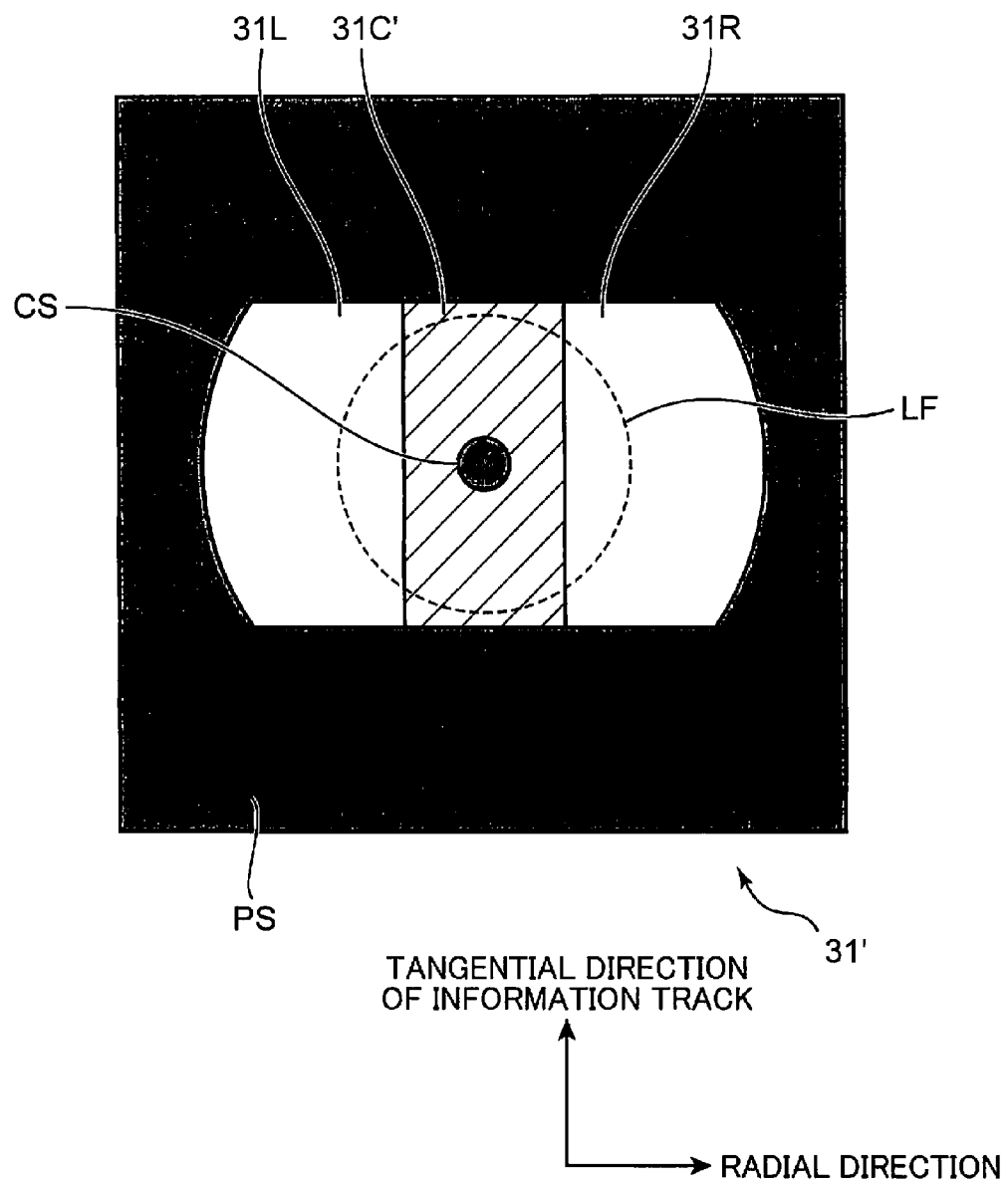
FIG. 10 is a diagram showing another example of an RF hologram according to the first embodiment of the present disclosure.
Figure 11:
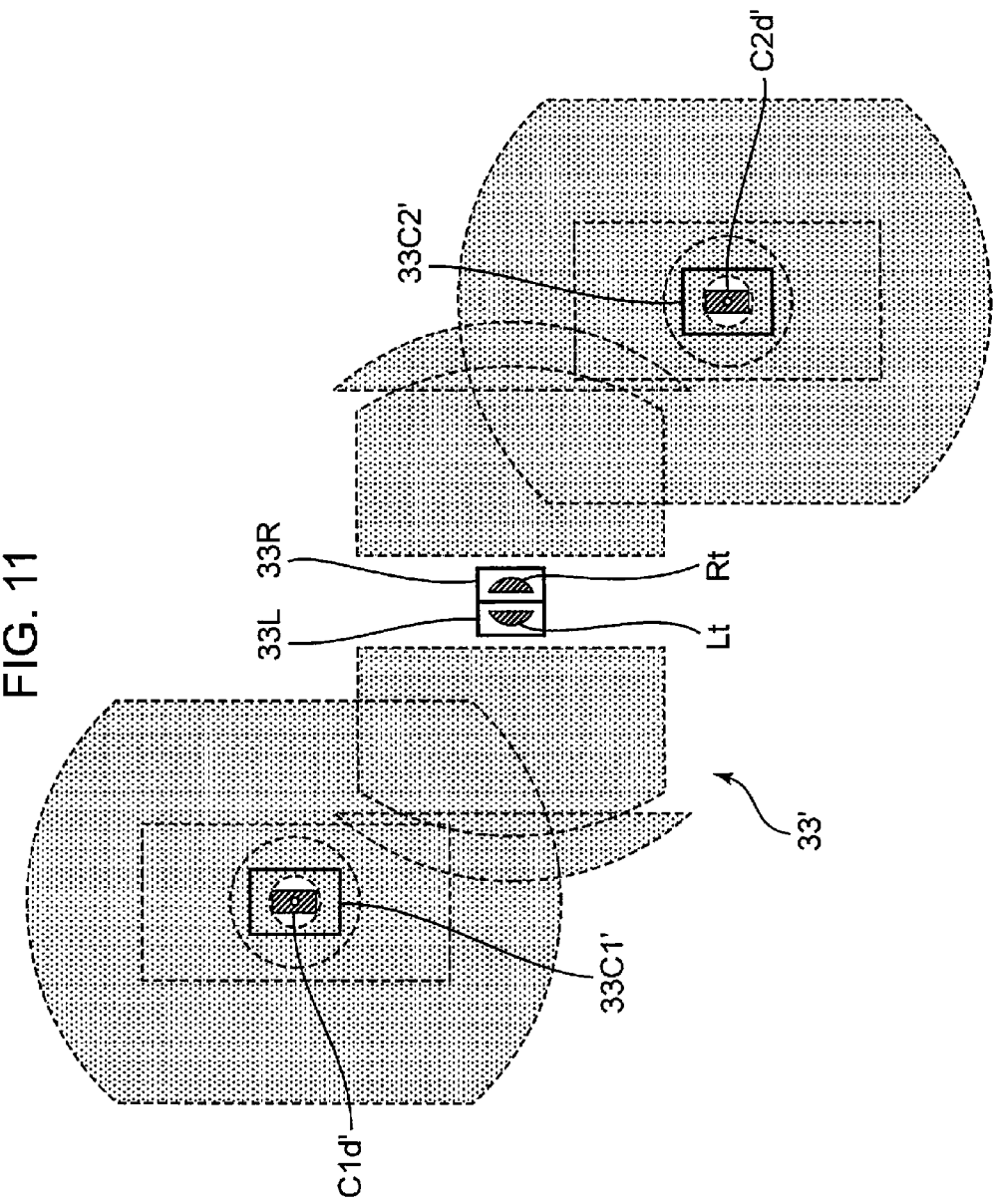
FIG. 11 is a diagram for explaining stray light reflected by an information recording surface positioned on a light incidence surface side relative to an information recording surface that is a recording or reproducing object in an RF light receiving element and stray light reflected by an information recording surface positioned on a side of a surface opposite to a light incidence surface side relative to the information recording surface that is a recording or reproducing object in the RF light receiving element.

FIG. 10 is a diagram showing another example of an RF hologram according to the first embodiment of the present disclosure, and FIG. 11 is a diagram for explaining stray light reflected by an information recording surface positioned on a light incidence surface side relative to an information recording surface that is a recording or reproducing object in an RF light receiving element and stray light reflected by an information recording surface positioned on a side of a surface opposite to a light incidence surface side relative to the information recording surface that is a recording or reproducing object in the RF light receiving element.

For example, in an RF hologram 31' shown in FIG. 10, a central region 31C' is formed by a binary simple diffraction grating that respectively diffracts +1 order diffracted light C1$d'$ and −1 order diffracted light C2$d'$ in a lower right direction and an upper left direction. The +1 order diffracted light C1$d'$ and the −1 order diffracted light C2$d'$ respectively enter a first central portion light receiving section 33C1' and a second central portion light receiving section 33C2' on an RF light receiving element 33' shown in FIG. 11.

As shown in FIG. 11, stray light reflected by an information recording surface positioned 40 μm in front (on a light incidence surface side) of an information recording surface that is a recording or reproducing object and stray light reflected by an information recording surface positioned 40 μm to the back (on a side of a surface opposite to the light incidence surface side) of the information recording surface that is a recording or reproducing object are incident on the RF light receiving element 33'. Another layer-reflected stray light and surface-reflected stray light incident on the RF hologram 31' do not overlap on the RF light receiving element 33' with signal light C1$d'$, C2$d'$, Rt, and Lt reflected by the information recording surface that is a recording or reproducing object. Therefore, signal light and stray light do not interfere with each other. As a result, even with the configuration described above, stable signal detection can be realized when recording or reproducing information on or from a high-density optical disc having been multilayered and having attained a narrow track pitch.

Second Embodiment

In the present second embodiment, components in common with the first embodiment will be denoted by the same reference characters and a description thereof will be omitted.

Figure 12:
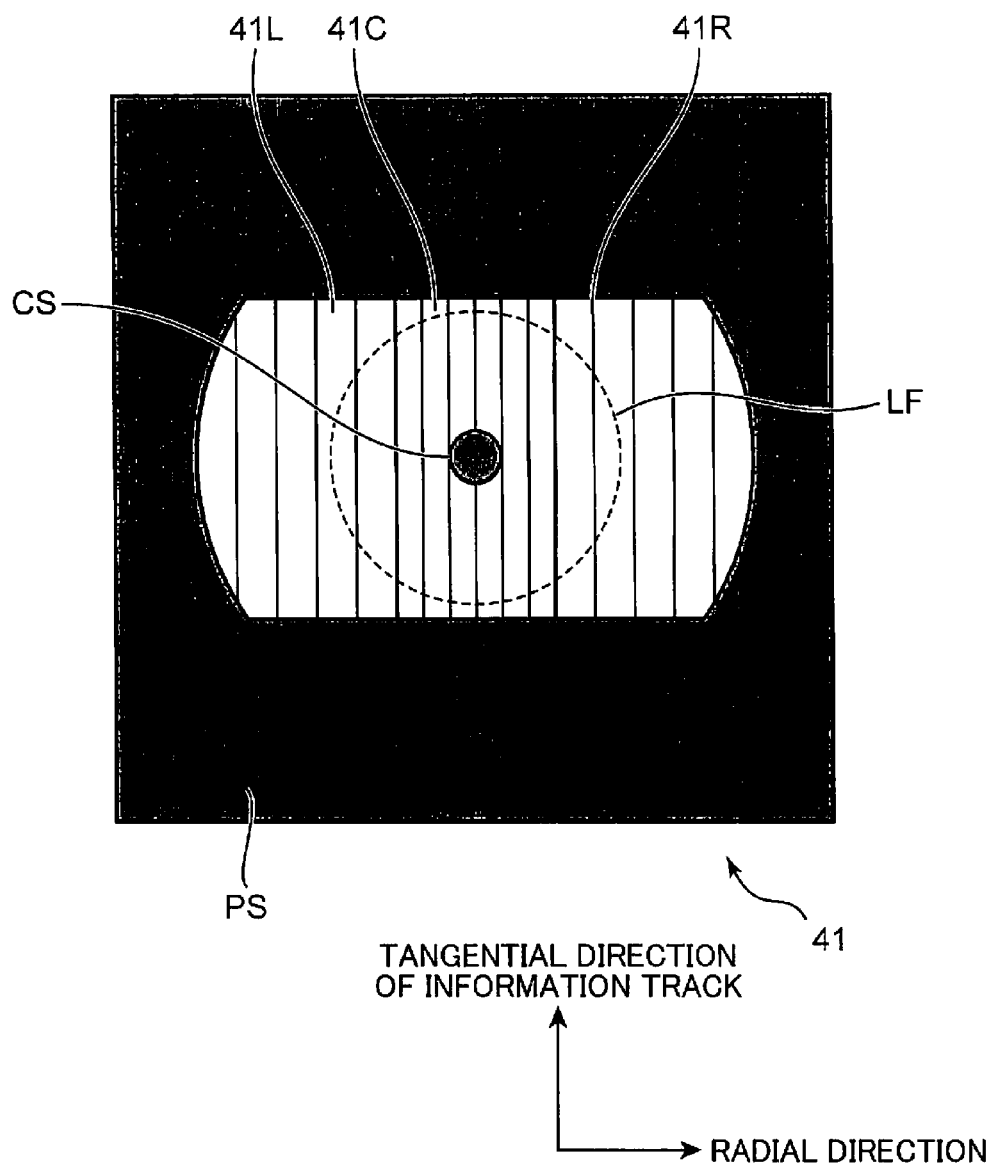
FIG. 12 is a diagram showing a configuration of an RF hologram according to a second embodiment of the present disclosure.

FIG. 12 is a diagram showing a configuration of an RF hologram according to the second embodiment of the present disclosure.

As shown in FIG. 12, an RF hologram 41 according to the present second embodiment is divided into three in a radial direction of the high-density optical disc 200 (a direction perpendicular to a tangent line of an information track), and includes a central region 41C including an optical axis of laser light as well as a first end portion region 41R and a second end portion region 41L which sandwich the central region 41C. In addition, a central shielding section CS which does not transmit blue-violet laser light or which has lower transmittance relative to the central region 41C is formed at a center of the central region 41C. Furthermore, a peripheral shielding section PS which does not transmit blue-violet laser light or which has lower transmittance relative to the central region 41C, the first end portion region 41R, and the second end portion region 41L is formed at a periphery of the central region 41C, the first end portion region 41R, and the second end portion region 41L.

A luminous flux LF (depicted by a dashed line) incident on each region of the RF hologram 41 is diffracted and enters a corresponding light receiving section on an RF light receiving element 43.

Figure 13:
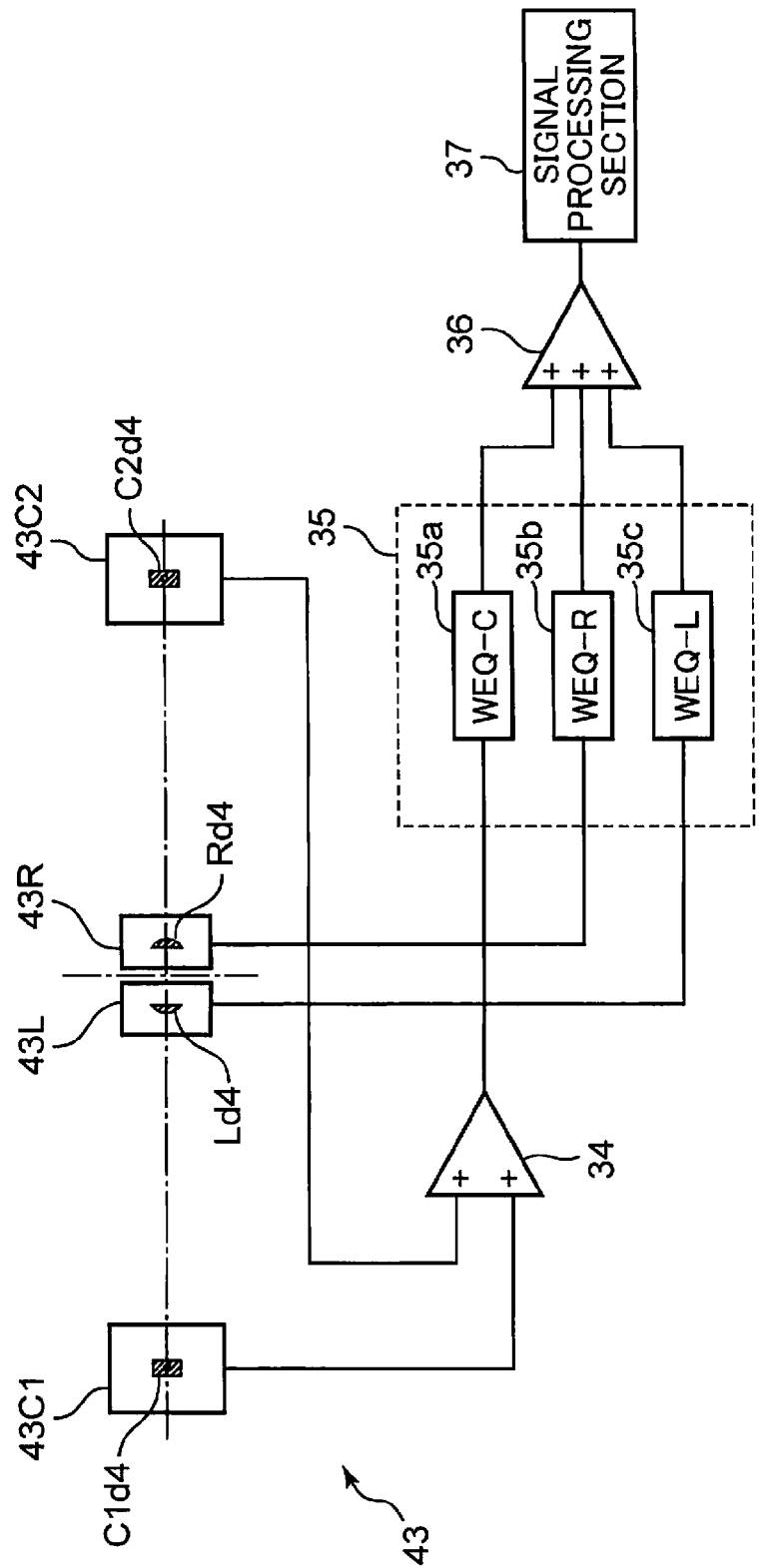
FIG. 13 is a diagram showing a configuration of an RF light receiving element according to the second embodiment of the present disclosure.

FIG. 13 is a diagram showing a configuration of an RF light receiving element according to the present second embodiment of the present disclosure. Moreover, in FIG. 13, an intersection of dashed-dotted lines represents an optical axis position of 0 order light (transmitted light).

The RF light receiving element 43 receives a plurality of luminous fluxes split by the RF hologram 41 and outputs a plurality of signals in accordance with light intensities of the plurality of received luminous fluxes. The RF light receiving element 43 receives +1 order diffracted light C1$d$4 and −1 order diffracted light C2$d$4 generated by the central region 41C, +1 order diffracted light Rd4 generated by the first end portion region 41R, and +1 order diffracted light Ld4 generated by the second end portion region 41L. The RF light receiving element 43 includes a first central portion light receiving section 43C1, a second central portion light receiving section 43C2, a first end portion light receiving section 43R, and a second end portion light receiving section 43L.

+1 order diffracted light C1$d$4 and −1 order diffracted light C2$d$4 having been diffracted by the central region 41C respectively enter the first central portion light receiving section 43C1 and the second central portion light receiving section 43C2 on the RF light receiving element 43. +1 order diffracted light Rd4 having been diffracted by the first end portion region 41R and +1 order light Ld4 having been diffracted by the second end portion region 41L respectively enter the first end portion light receiving section 43R and the second end portion light receiving section 43L on the RF light receiving element 43. The RF light receiving element 43 outputs signals in accordance with light intensities of diffracted light C1$d$4, C2$d$4, Rd4, and Ld4 received by the respective light receiving sections 43C1, 43C2, 43R, and 43L.

The first central portion light receiving section 43C1 outputs a signal to the adder 34 and the second central portion light receiving section 43C2 outputs a signal to the adder 34. The first end portion light receiving section 43R outputs a signal to the gain controller 35 and the second end portion light receiving section 43L outputs a signal to the gain controller 35.

The adder 34 adds up the signal output from the first central portion light receiving section 43C1 and the signal output from the second central portion light receiving section 43C2 and outputs the added signal to the gain controller 35.

After being subjected to waveform equalization by the first to third waveform equalizers 35$a$ to 35$c$ of the gain controller 35, each signal is output to the adder 36.

An information signal output from the adder 36 is a signal in which crosstalk that is leakage of a signal from an adjacent track has been suppressed. Therefore, the signal processing section 37 reproduces the information signal at a low error rate.

In the RF hologram 41 according to the present second embodiment shown in FIG. 12, the central region 41C is formed by a binary simple diffraction grating, generates +1 order diffracted light C1$d$4 and −1 order diffracted light C2$d$4 from a luminous flux incident on the central region 41C, and causes the +1 order diffracted light C1$d$4 and the −1 order diffracted light C2$d$4 to respectively enter the first central portion light receiving section 43C1 and the second central portion light receiving section 43C2 on the RF light receiving element 43. At this point, diffraction efficiencies of the +1 order diffracted light C1$d$4 and the −1 order diffracted light C2$d$4 (including an AR coating for reducing reflection) are respectively around 35% (70% when combined). Moreover, favorably, the diffraction efficiencies of the +1 order diffracted light C1$d$4 and the −1 order diffracted light C2$d$4 are, respectively, substantially 30% or higher (60% or higher when combined).

On the other hand, the first end portion region 41R and the second end portion region 41L are formed by blazed diffraction gratings, respectively generate +1 order light Rd4 and +1 order light Ld4 from luminous fluxes incident on the first end portion region 41R and the second end portion region 41L, and respectively cause the +1 order light Rd4 and the +1 order light Ld4 to enter the first end portion light receiving section 43R and the second end portion light receiving section 43L on the RF light receiving element 43. At this point, taking an AR coating for reducing reflection into consideration, diffraction efficiencies of the +1 order light Rd4 and the +1 order light Ld4 are around 85%. Moreover, favorably, the diffraction efficiencies of the first end portion region 41R and the second end portion region 41L are substantially 80% or higher.

Therefore, since a loss in light intensity at the first end portion region 41R and the second end portion region 41L which contribute significantly to an amplitude of an information signal is small, an information signal with a high signal-to-noise intensity ratio (S/N) can be obtained.

In addition, the optical disc apparatus according to the present second embodiment may further include a wobble signal generating section that generates a wobble signal by calculating a difference signal (a push-pull signal) between a signal detected from +1 order diffracted light Rd4 which is diffracted by the first end portion region 41R of the RF hologram 41 and which is incident on the first end portion light receiving section 43R on the RF light receiving element 43 and a signal detected from +1 order diffracted light Ld4 which is diffracted by the second end portion region 41L of the RF hologram 41 and which is incident on the second end portion light receiving section 43L on the RF light receiving element 43.

With the RF hologram 41 according to the present second embodiment, since blazed diffraction gratings are formed in the first end portion region 41R and the second end portion region 41L, +1 order light Rd4 and +1 order light Ld4 can be generated from luminous fluxes incident on the first end portion region 41R and the second end portion region 41L, and the +1 order light Rd4 and +1 order light Ld4 can be caused to be diffracted and incident on arbitrary positions on the RF light receiving element 43.

Therefore, +1 order light Rd4 transmitted through the first end portion region 41R and +1 order light Ld4 transmitted through the second end portion region 41L are detected respectively separated from one another by the first end portion light receiving section 43R and the second end portion light receiving section 43L on the RF light receiving element 43. As a result, a detected spot on the RF light receiving element 43 can be caused to virtually converge without the need to offset focus as is the case of a detected spot on the RF light receiving element 33 according to the first embodiment.

By adopting such a configuration, since a size of a detected spot becomes relatively smaller than a size of a light receiving section of the RF light receiving element 43, a margin with respect to displacement between a luminous flux and the RF light receiving element 43 increases. As a result, stable signal detection with higher reliability can be realized.

Alternatively, the blazed diffraction gratings of the first end portion region 41R and the second end portion region 41L may be created by approximation using a stepped diffraction grating (for example, with 8 levels). In this case, if a diffraction pitch is small, a line width (a width of 1 level; in the case of an 8-level diffraction grating, ⅛ of the diffraction pitch) of the stepped diffraction grating becomes significantly small and makes it difficult to create the stepped diffraction grating and to obtain high diffraction efficiency. A line width of a diffraction grating represents a width of 1 step level. In the case of a diffraction grating having 8 step levels, the line width is equivalent to ⅛ of the diffraction pitch.

However, as shown in FIG. 13, the first end portion light receiving section 43R and the second end portion light receiving section 43L corresponding to the first end portion region 41R and the second end portion region 41L of the RF hologram 41 according to the present second embodiment are arranged in a vicinity of an optical axis (an intersection of dashed-dotted lines) of 0 order light (transmitted light) with respect to the first central portion light receiving section 43C1 and the second central portion light receiving section 43C2 corresponding to the central region 41C. This indicates that diffraction angles of the first end portion region 41R and the second end portion region 41L in which blazed diffraction gratings are formed are significantly smaller than a diffraction angle of the central region 41C in which a binary simple diffraction grating is formed or, in other words, diffraction pitches of the first end portion region 41R and the second end portion region 41L are significantly large. In other words, the diffraction pitches of the blazed diffraction gratings formed in the first end portion region 41R and the second end portion region 41L are larger than the diffraction pitch of the binary diffraction grating formed in the central region 41C.

Therefore, even in a case where a blazed diffraction grating is created by approximation using a stepped diffraction grating, since a line width of the stepped diffraction grating is sufficiently large, the stepped diffraction grating can be readily created and, at the same time, sufficiently high diffraction efficiency can be secured. Therefore, since a loss in light intensity of the first end portion region 41R and the second end portion region 41L which contribute significantly to an amplitude of an information signal is small, an information signal with a high signal-to-noise intensity ratio (S/N) can be obtained.

Figure 14:
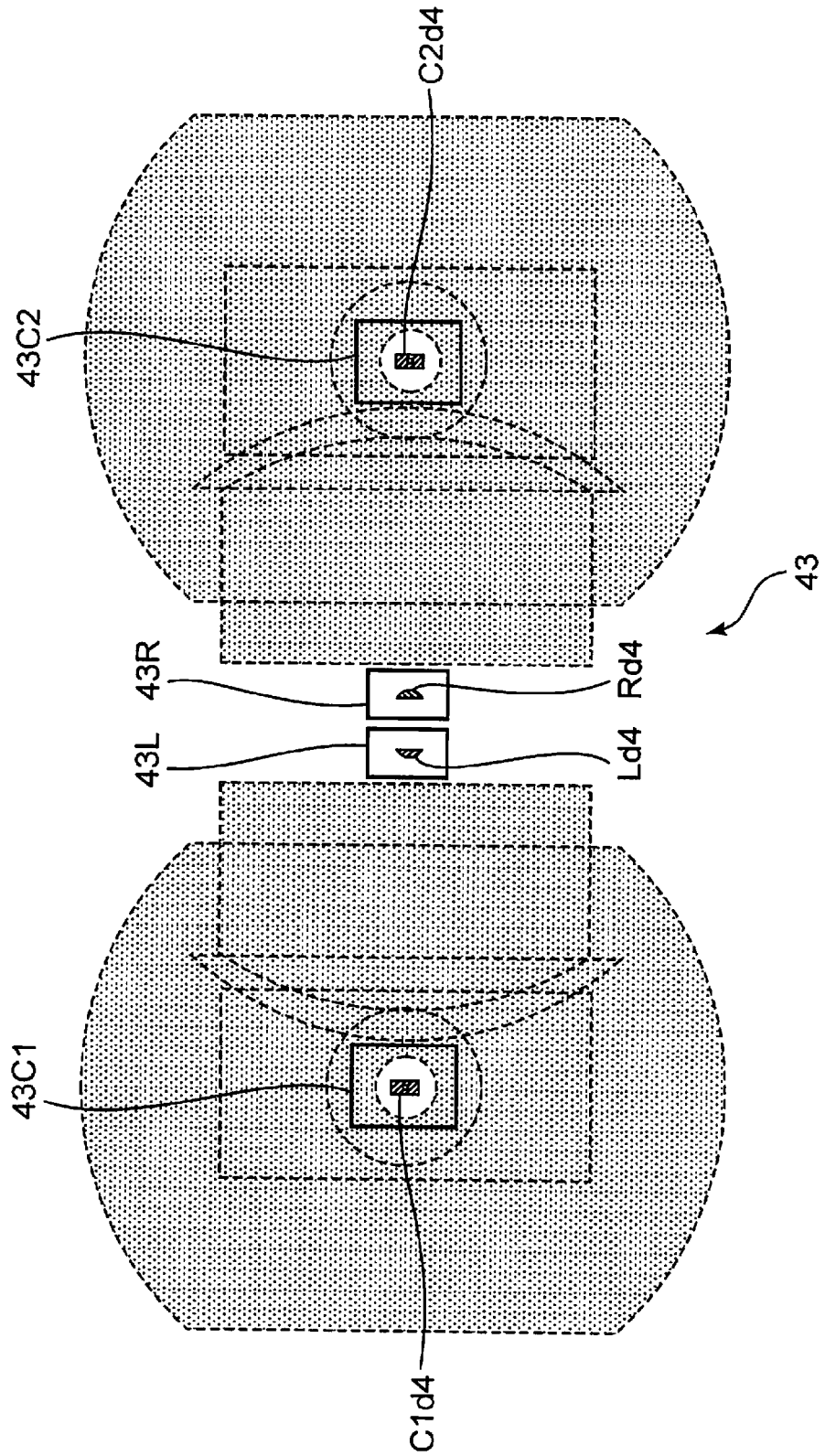
FIG. 14 is a diagram for explaining stray light reflected by an information recording surface positioned on a light incidence surface side relative to an information recording surface that is a recording or reproducing object in an RF light receiving element and stray light reflected by an information recording surface positioned on a side of a surface opposite to a light incidence surface side relative to the information recording surface that is a recording or reproducing object in the RF light receiving element.

FIG. 14 is a diagram for explaining stray light reflected by an information recording surface positioned on a light incidence surface side relative to an information recording surface that is a recording or reproducing object in an RF light receiving element and stray light reflected by an information recording surface positioned on a side of a surface opposite to a light incidence surface side relative to the information recording surface that is a recording or reproducing object in the RF light receiving element.

In FIG. 14, stray light reflected by an information recording surface positioned 40 μm in front (on a light incidence surface side) of an information recording surface that is a recording or reproducing object and stray light reflected by an information recording surface positioned 40 μm to the back (on a side of a surface opposite to the light incidence surface side) of the information recording surface that is a recording or reproducing object overlap each other. Another layer-reflected stray light and surface-reflected stray light incident on the RF hologram 41 do not overlap on the RF light receiving element 43 with signal light C1d4, C2d4, Rd4, and Ld4 reflected by the information recording surface that is a recording or reproducing object. Therefore, signal light and stray light do not interfere with each other. As a result, even with the configuration described above, stable signal detection can be realized when recording or reproducing information on or from a high-density optical disc having been multilayered and having attained a narrow track pitch.

Figure 15:
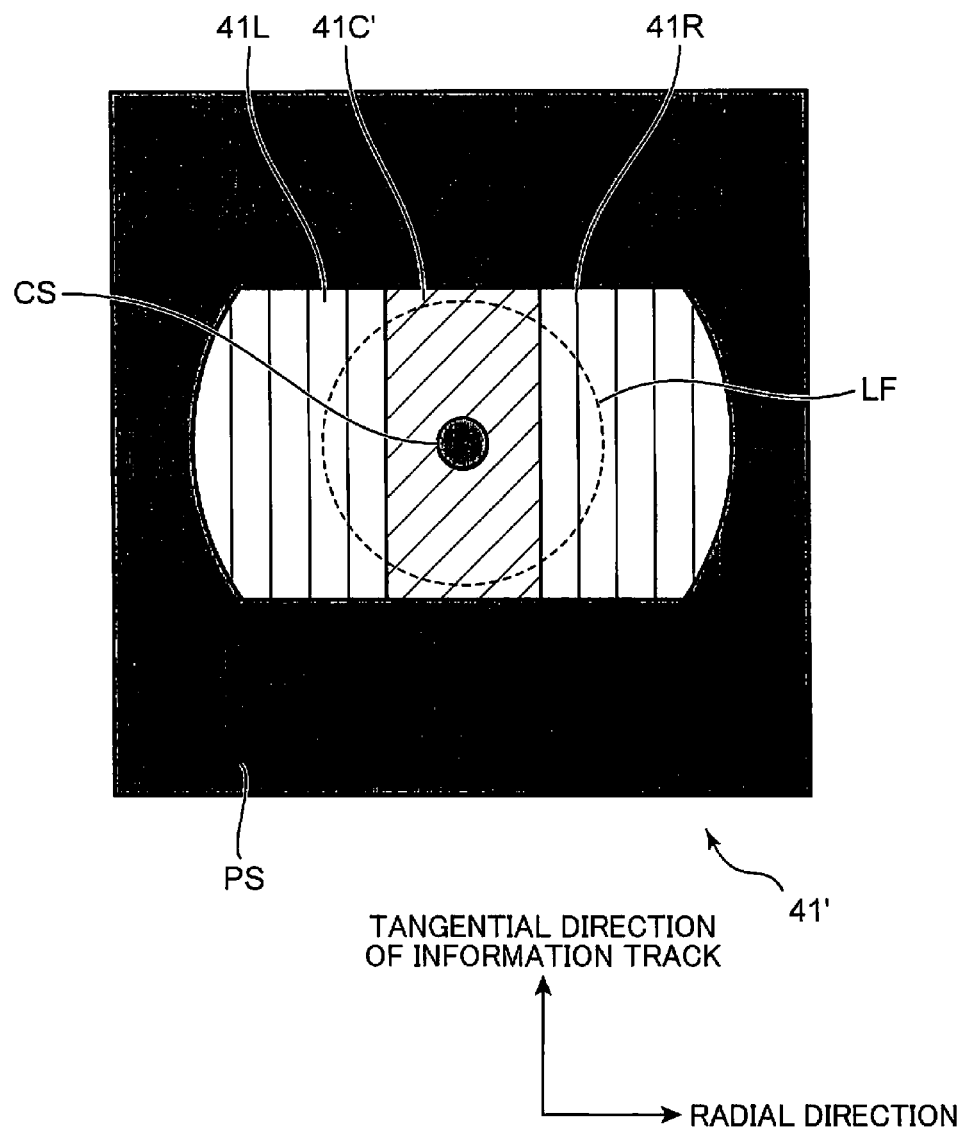
FIG. 15 is a diagram showing another example of an RF hologram according to the second embodiment of the present disclosure.
Figure 16:
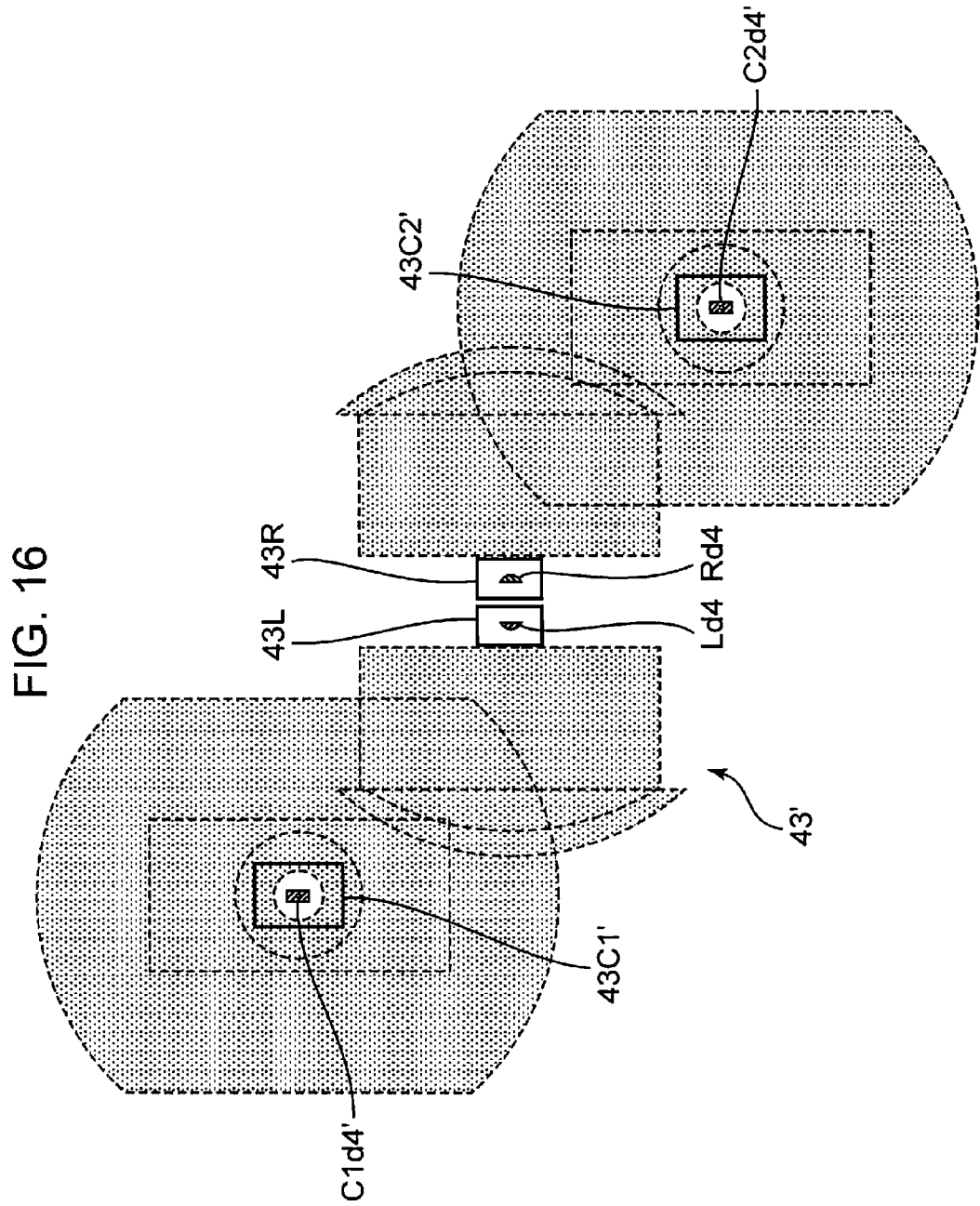
FIG. 16 is a diagram for explaining stray light reflected by an information recording surface positioned on a light incidence surface side relative to an information recording surface that is a recording or reproducing object in an RF light receiving element and stray light reflected by an information recording surface positioned on a side of a surface opposite to a light incidence surface side relative to the information recording surface that is a recording or reproducing object in the RF light receiving element.

FIG. 15 is a diagram showing another example of an RF hologram according to the second embodiment of the present disclosure, and FIG. 16 is a diagram for explaining stray light reflected by an information recording surface positioned on a light incidence surface side relative to an information recording surface that is a recording or reproducing object in an RF light receiving element and stray light reflected by an information recording surface positioned on a side of a surface opposite to a light incidence surface side relative to the information recording surface that is a recording or reproducing object in the RF light receiving element.

For example, in an RF hologram 41' shown in FIG. 15, a central region 41C' is formed by a binary simple diffraction grating that respectively diffracts +1 order diffracted light C1d4' and −1 order diffracted light C2d4' in a lower right direction and an upper left direction. The +1 order diffracted light C1d4' and the −1 order diffracted light C2d4' respectively enter a first central portion light receiving section 43C1' and a second central portion light receiving section 43C2' on an RF light receiving element 43' shown in FIG. 16.

As shown in FIG. 16, stray light reflected by an information recording surface positioned 40 μm in front (on a light incidence surface side) of an information recording surface that is a recording or reproducing object and stray light reflected by an information recording surface positioned 40 μm to the back (on a side of a surface opposite to the light incidence surface side) of the information recording surface that is a recording or reproducing object overlap each other. Another layer-reflected stray light and surface-reflected stray light incident on the RF hologram 41' do not overlap on the RF light receiving element 43' with signal light C1d4', C2d4', Rd4, and Ld4 reflected by the information recording surface that is a recording or reproducing object. Therefore, signal light and stray light do not interfere with each other. As a result, even with the configuration described above, stable signal detection can be realized when recording or reproducing information on or from a high-density optical disc having been multilayered and having attained a narrow track pitch.

Third Embodiment

In the present third embodiment, components in common with the first and second embodiments will be denoted by the same reference characters and a description thereof will be omitted.

Figure 17:
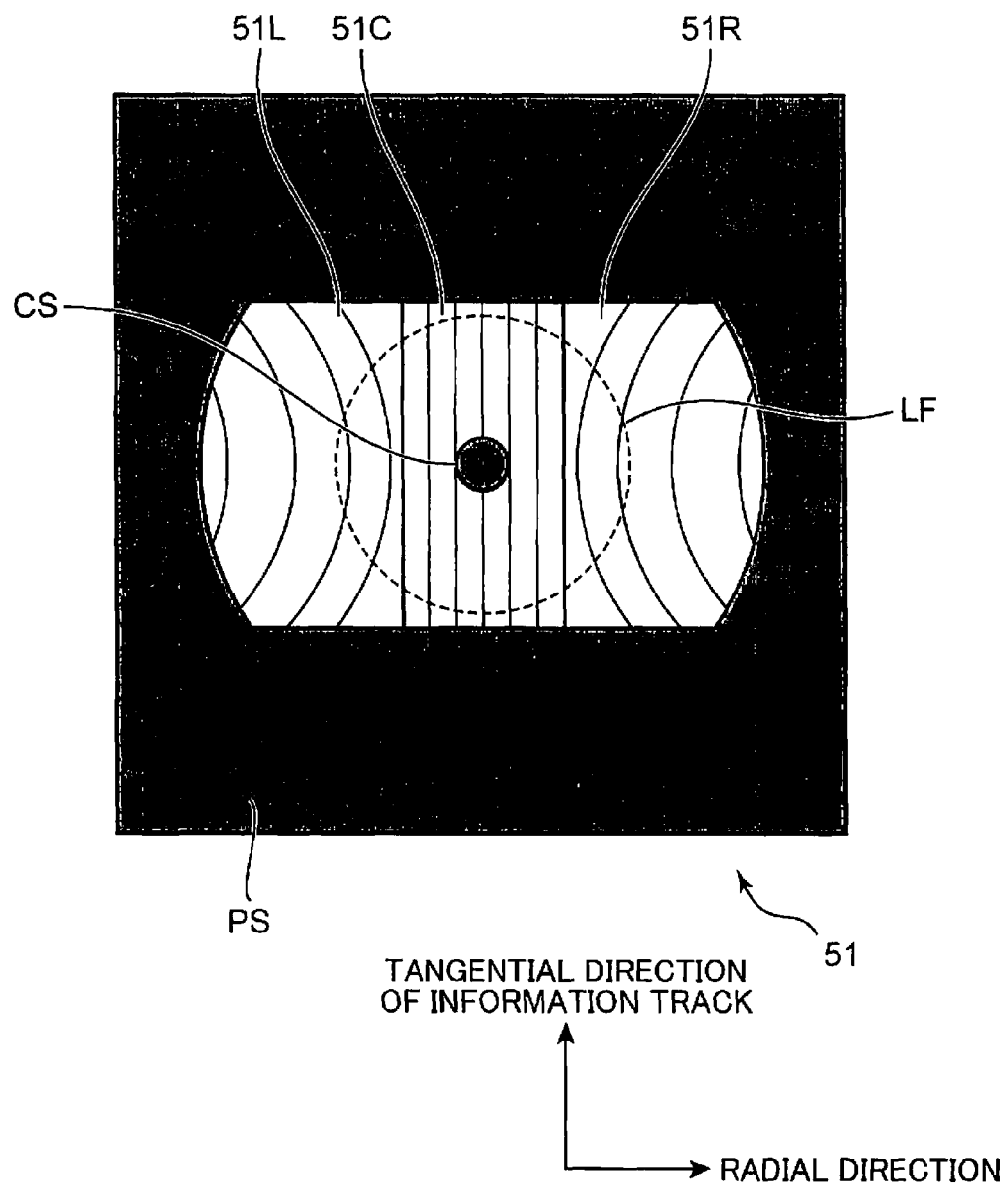
FIG. 17 is a diagram showing a configuration of an RF hologram according to a third embodiment of the present disclosure.

FIG. 17 is a diagram showing a configuration of an RF hologram according to the third embodiment of the present disclosure.

As shown in FIG. 17, an RF hologram 51 according to the present third embodiment is divided into three in a radial direction of the high-density optical disc 200 (a direction perpendicular to a tangent line of an information track), and includes a central region 51C including an optical axis of laser light as well as a first end portion region 51R and a second end portion region 51L which sandwich the central region 51C. In addition, a central shielding section CS which does not transmit blue-violet laser light or which has lower transmittance relative to the central region 51C is formed at a center of the central region 51C. Furthermore, a peripheral shielding section PS which does not transmit blue-violet laser light or which has lower transmittance relative to the central region 51C, the first end portion region 51R, and the second end portion region 51L is formed at a periphery of the central region 51C, the first end portion region 51R, and the second end portion region 51L.

A luminous flux LF (depicted by a dashed line) incident on each region of the RF hologram 51 is diffracted and enters a corresponding light receiving section on an RF light receiving element 53.

Figure 18:
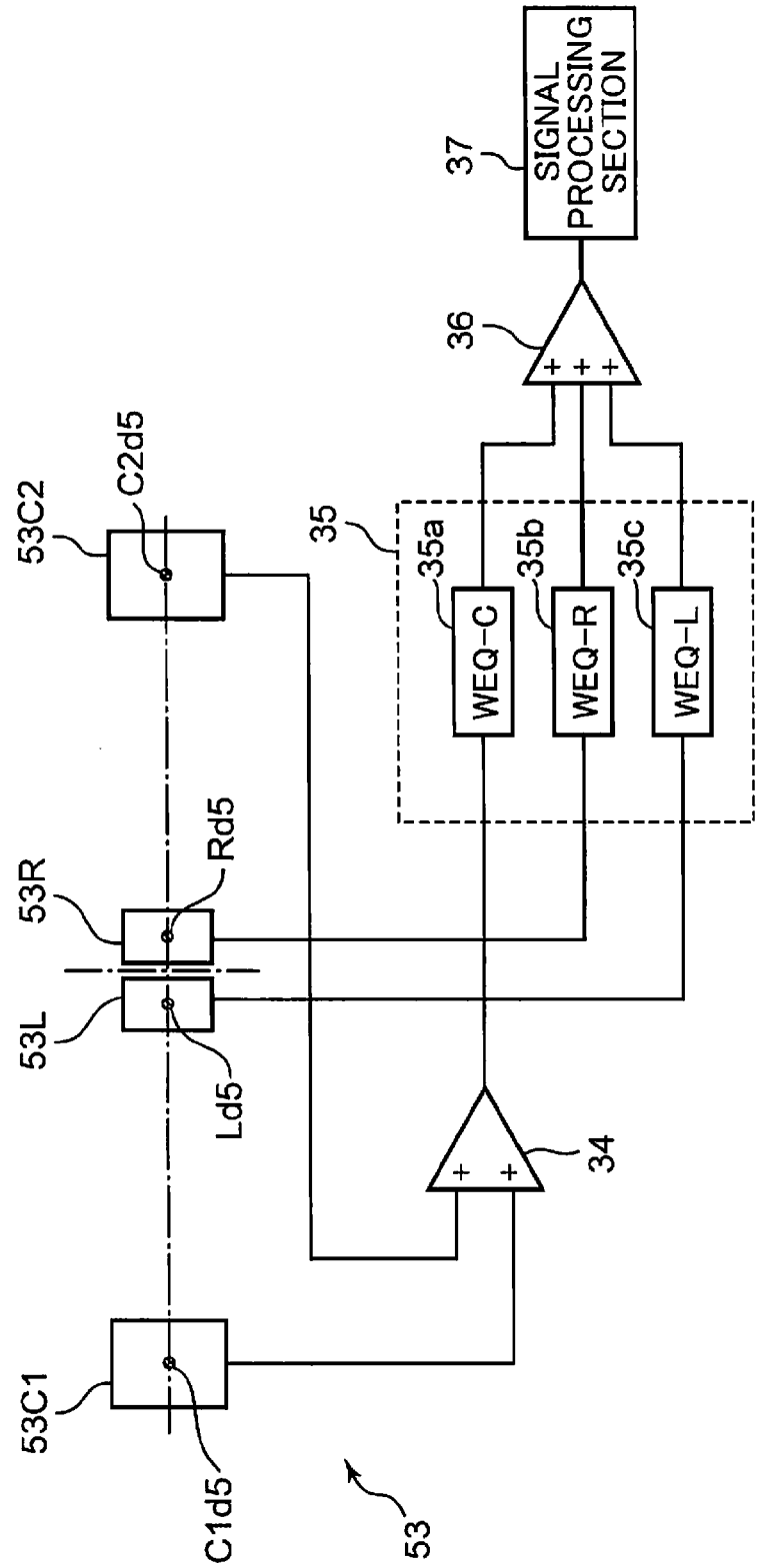
FIG. 18 is a diagram showing a configuration of an RF light receiving element according to the third embodiment of the present disclosure.

FIG. 18 is a diagram showing a configuration of an RF light receiving element according to the present third embodiment of the present disclosure. Moreover, in FIG. 18, an intersection of dashed-dotted lines represents an optical axis position of 0 order light (transmitted light).

The RF light receiving element 53 receives a plurality of luminous fluxes split by the RF hologram 51 and outputs a plurality of signals in accordance with light intensities of the plurality of received luminous fluxes. The RF light receiving element 53 receives +1 order diffracted light C1$d$5 and −1 order diffracted light C2$d$5 generated by the central region 51C, +1 order diffracted light Rd5 generated by the first end portion region 51R, and +1 order diffracted light Ld5 generated by the second end portion region 51L. The RF light receiving element 53 includes a first central portion light receiving section 53C1, a second central portion light receiving section 53C2, a first end portion light receiving section 53R, and a second end portion light receiving section 53L.

+1 order diffracted light C1$d$5 and −1 order diffracted light C2$d$5 having been diffracted by the central region 51C respectively enter the first central portion light receiving section 53C1 and the second central portion light receiving section 53C2 on the RF light receiving element 53. +1 order diffracted light Rd5 having been diffracted by the first end portion region 51R and +1 order light Ld5 having been diffracted by the second end portion region 51L respectively enter the first end portion light receiving section 53R and the second end portion light receiving section 53L on the RF light receiving element 53. The RF light receiving element 53 outputs signals in accordance with light intensities of diffracted light C1$d$5, C2$d$5, Rd5, and Ld5 received by the respective light receiving sections 53C1, 53C2, 53R, and 53L.

The first central portion light receiving section 53C1 outputs a signal to the adder 34 and the second central portion light receiving section 53C2 outputs a signal to the adder 34. The first end portion light receiving section 53R outputs a signal to the gain controller 35 and the second end portion light receiving section 53L outputs a signal to the gain controller 35.

The adder 34 adds up the signal output from the first central portion light receiving section 53C1 and the signal output from the second central portion light receiving section 53C2 and outputs the added signal to the gain controller 35.

After being subjected to waveform equalization by the first to third waveform equalizers 35$a$ to 35$c$ of the gain controller 35, each signal is output to the adder 36.

An information signal output from the adder 36 is a signal in which crosstalk that is leakage of a signal from an adjacent track has been suppressed. Therefore, the signal processing section 37 reproduces the information signal at a low error rate.

In the RF hologram 51 according to the present third embodiment shown in FIG. 17, the central region 51C is formed by a binary simple diffraction grating, generates +1 order diffracted light C1$d$5 and −1 order diffracted light C2$d$5 from a luminous flux incident on the central region 51C, and causes the +1 order diffracted light C1$d$5 and the −1 order diffracted light C2$d$5 to respectively enter the first central portion light receiving section 53C1 and the second central portion light receiving section 53C2 on the RF light receiving element 53. At this point, diffraction efficiencies of the +1 order diffracted light C1$d$5 and the −1 order diffracted light C2$d$5 (including an AR coating for reducing reflection) are respectively around 35% (70% when combined). Moreover, favorably, the diffraction efficiencies of the +1 order diffracted light C1$d$5 and the −1 order diffracted light C2$d$5 are, respectively, substantially 30% or higher (60% or higher when combined).

On the other hand, the first end portion region 51R and the second end portion region 51L are formed by blazed diffraction gratings, respectively generate +1 order light Rd5 and +1 order light Ld5 from luminous fluxes incident on the first end portion region 51R and the second end portion region 51L, and respectively cause the +1 order light Rd5 and the +1 order light Ld5 to enter the first end portion light receiving section 53R and the second end portion light receiving section 53L on the RF light receiving element 53. At this point, taking an AR coating for reducing reflection into consideration, transmittances of the +1 order light Rd5 and the +1 order light Ld5 are around 85%. Moreover, favorably, the transmittances of the first end portion light receiving section 53R and the second end portion light receiving section 53L are substantially 80% or higher.

Therefore, since a loss in light intensity of the first end portion region 51R and the second end portion region 51L which contribute significantly to an amplitude of an information signal is small, an information signal with a high signal-to-noise intensity ratio (S/N) can be obtained.

In addition, the optical disc apparatus according to the present third embodiment may further include a wobble signal generating section that generates a wobble signal by calculating a difference signal (a push-pull signal) between a signal detected from +1 order diffracted light Rd5 which is diffracted by the first end portion region 51R of the RF hologram 51 and which is incident on the first end portion light receiving section 53R on the RF light receiving element 53 and a signal detected from +1 order diffracted light Ld5 which is diffracted by the second end portion region 51L of the RF hologram 51 and which is incident on the second end portion light receiving section 53L on the RF light receiving element 53.

With the RF hologram 51 according to the present third embodiment, since blazed diffraction gratings are formed in the first end portion region 51R and the second end portion region 51L, +1 order light Rd5 and +1 order light Ld5 can be generated from luminous fluxes incident on the first end portion region 51R and the second end portion region 51L, and the +1 order light Rd5 and +1 order light Ld5 can be caused to be diffracted and incident on arbitrary positions on the RF light receiving element 53.

Furthermore, the blazed diffraction gratings formed in the first end portion region 51R and the second end portion region 51L each have power of a convex lens.

Figure 19:
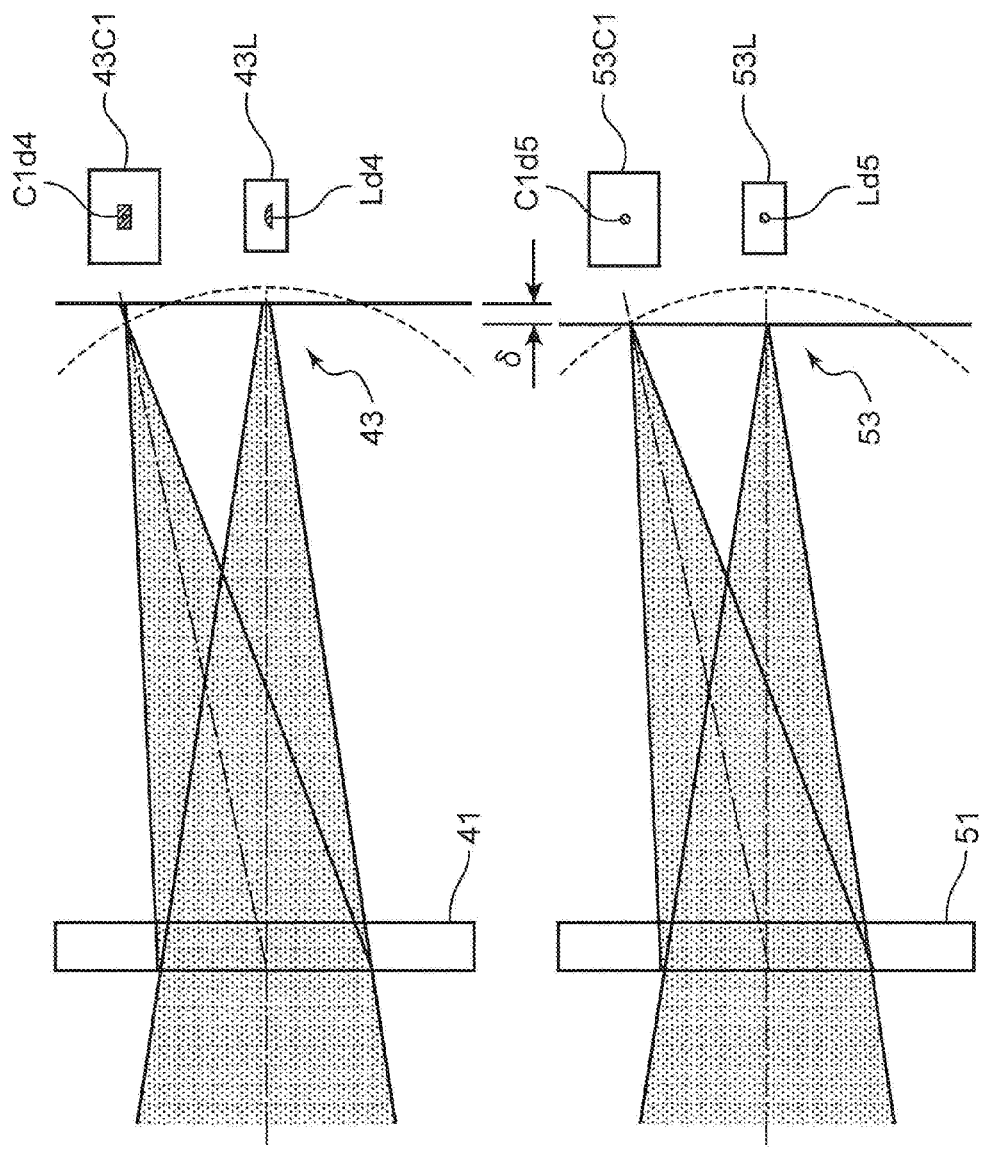
FIG. 19 is a diagram for explaining a difference between an RF hologram according to the second embodiment and an RF hologram according to the present third embodiment.

FIG. 19 is a diagram for explaining a difference between the RF hologram 41 according to the second embodiment and the RF hologram 51 according to the present third embodiment. It should be noted that, for the sake of simplicity, one of the +1 order diffracted light and the −1 order diffracted light which have been diffracted by the central region and the +1 order light diffracted by one of the two end portion regions have been omitted.

In the RF hologram 41 according to the second embodiment shown in an upper part of FIG. 19, the blazed diffraction gratings formed in the first end portion region 41R and the second end portion region 41L have a single pitch and do not have a lens effect. Therefore, a best image point position (a position of the RF light receiving element 43 where a detected spot becomes minimum) of the +1 order light Rd4 and the +1 order light Ld4 which are diffracted by the first end portion region 41R and the second end portion region 41L differs from a best image point position of the +1 order diffracted light C1d4 and the −1 order diffracted light C2d4 which are diffracted by the central region 41C that similarly does not have a lens effect.

Therefore, technically, diameters of detected spots of both the +1 order light Rd4 and the +1 order light Ld4 which are diffracted by the first end portion region 41R and the second end portion region 41L and the +1 order diffracted light C1d4 and the −1 order diffracted light C2d4 which are diffracted by the central region 41C cannot be minimized.

On the other hand, in the RF hologram 51 according to the present third embodiment shown in a lower part of FIG. 19, a best image point position (a position of the RF light receiving element 53 where a detected spot becomes minimum) of the +1 order diffracted light C1d5 and the −1 order diffracted light C2d5 which are diffracted by the central region 51C that does not have a lens effect is closer to a side of the RF hologram 51 by δ as compared to the RF light receiving element 43 according to the second embodiment. In this case, power of a convex lens is imparted to the blazed diffraction gratings formed in the first end portion region 51R and the second end portion region 51L so that a best image point position of the +1 order diffracted light C1d5 and the −1 order diffracted light C2d5 which are diffracted by the central region 51C and a best image point position of the +1 order light Rd5 and the +1 order light Ld5 which are diffracted by the first end portion region 51R and the second end portion region 51L coincide with each other.

Therefore, the +1 order light Rd5 transmitted through the first end portion region 51R and the +1 order light Ld5 transmitted through the second end portion region 51L can be detected respectively separated from one another by the first end portion light receiving section 53R and the second end portion light receiving section 53L on the RF light receiving element 53 and, at the same time, a detected spot on the RF light receiving element 53 can be caused to completely converge.

By adopting such a configuration, since a size of a detected spot further becomes relatively smaller than a size of a light receiving section of the RF light receiving element 53, a margin with respect to displacement between a luminous flux and the RF light receiving element 53 increases. As a result, stable signal detection with even higher reliability can be realized.

Moreover, as shown in FIG. 19, the first end portion light receiving section 53R and the second end portion light receiving section 53L corresponding to the first end portion region 51R and the second end portion region 51L of the RF hologram 51 according to the present third embodiment are arranged in a vicinity of an optical axis (an intersection of dashed-dotted lines) of 0 order light (transmitted light) with respect to the first central portion light receiving section 53C1 and the second central portion light receiving section 53C2 corresponding to the central region 51C. This indicates that diffraction angles of the first end portion region 51R and the second end portion region 51L in which blazed diffraction gratings are formed are significantly smaller than a diffraction angle of the central region 51C in which a binary simple diffraction grating is formed or, in other words, diffraction pitches of the first end portion region 51R and the second end portion region 51L are significantly large. In other words, the diffraction pitches of the blazed diffraction gratings formed in the first end portion region 51R and the second end portion region 51L are larger than the diffraction pitch of the binary diffraction grating formed in the central region 51C.

Therefore, even in a case where a blazed diffraction grating is created by approximation using a stepped diffraction grating, since a line width of the stepped diffraction grating is sufficiently large, the stepped diffraction grating can be readily created and, at the same time, sufficiently high diffraction efficiency can be secured. Therefore, since a loss in light intensity of the first end portion region 51R and the second end portion region 51L which contribute significantly to an amplitude of an information signal is small, an information signal with a high signal-to-noise intensity ratio (S/N) can be obtained.

Figure 20:
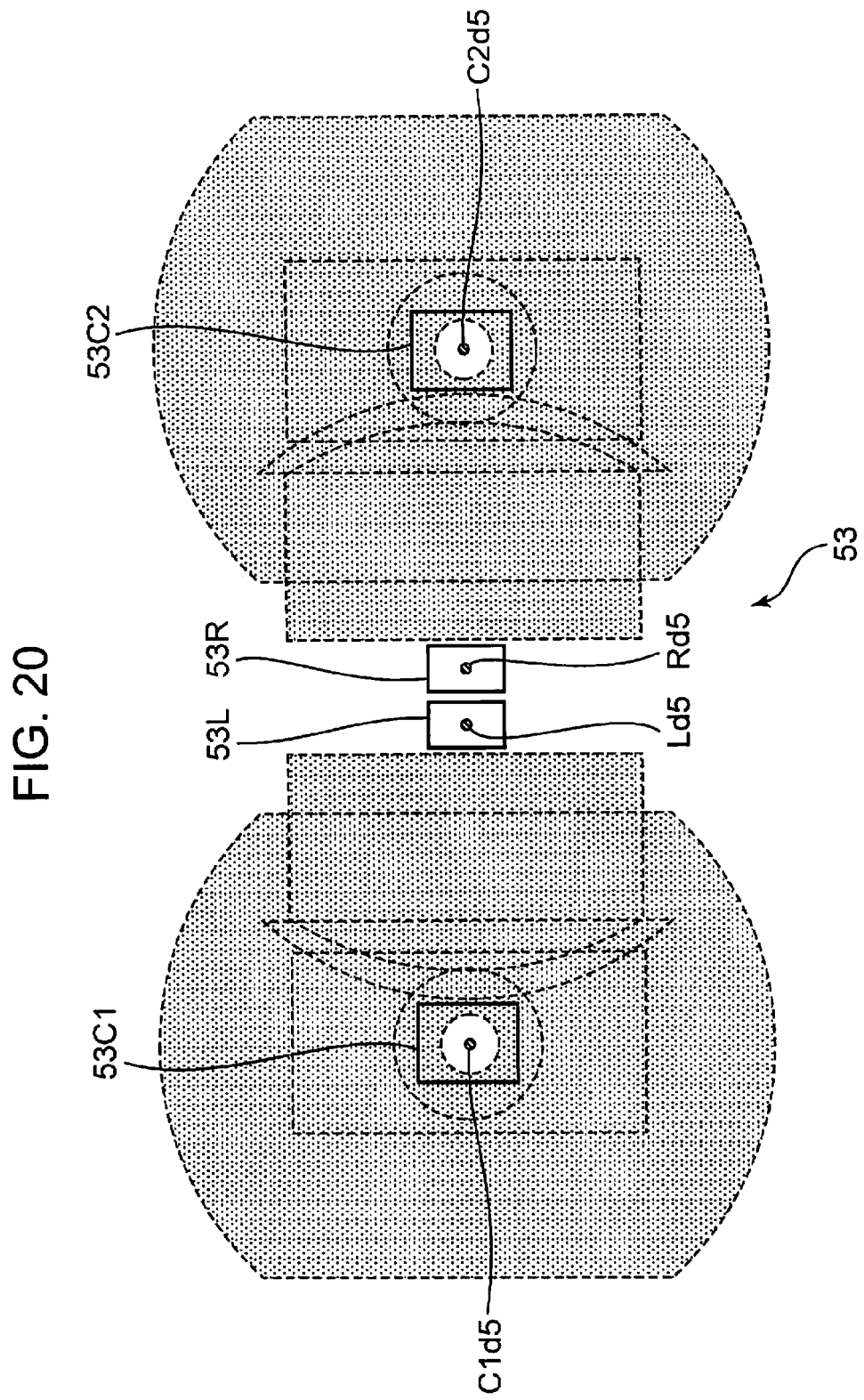
FIG. 20 is a diagram for explaining stray light reflected by an information recording surface positioned on a light incidence surface side relative to an information recording surface that is a recording or reproducing object in an RF light receiving element and stray light reflected by an information recording surface positioned on a side of a surface opposite to a light incidence surface side relative to the information recording surface that is a recording or reproducing object in the RF light receiving element.

FIG. 20 is a diagram for explaining stray light reflected by an information recording surface positioned on a light incidence surface side relative to an information recording surface that is a recording or reproducing object in an RF light receiving element and stray light reflected by an information recording surface positioned on a side of a surface opposite to a light incidence surface side relative to the information recording surface that is a recording or reproducing object in the RF light receiving element.

In FIG. 20, stray light reflected by an information recording surface positioned 40 μm in front (on a light incidence surface side) of an information recording surface that is a recording or reproducing object and stray light reflected by an information recording surface positioned 40 μm to the back (on a side of a surface opposite to the light incidence surface side) of the information recording surface that is a recording or reproducing object overlap each other. Another layer-reflected stray light and surface-reflected stray light incident on the RF hologram 51 do not overlap on the RF light receiving element 53 with signal light C1d5, C2d5, Rd5, and Ld5 reflected by the information recording surface that is a recording or reproducing object. Therefore, signal light and stray light do not interfere with each other. As a result, even with the configuration described above, stable signal detection can be realized when recording or reproducing information on or from a high-density optical disc having been multilayered and having attained a narrow track pitch.

Figure 21:
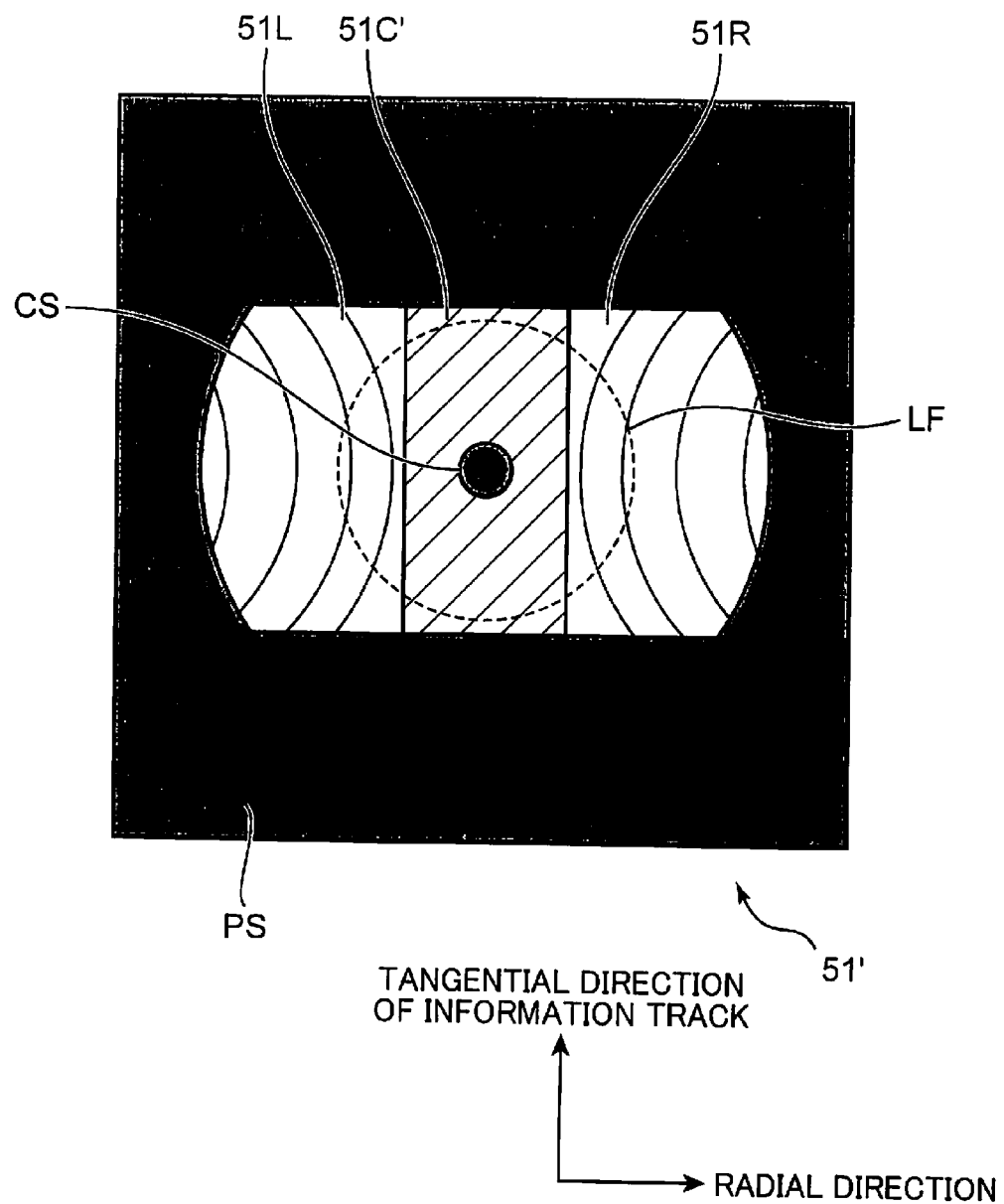
FIG. 21 is a diagram showing another example of an RF hologram according to the third embodiment of the present disclosure.
Figure 22:
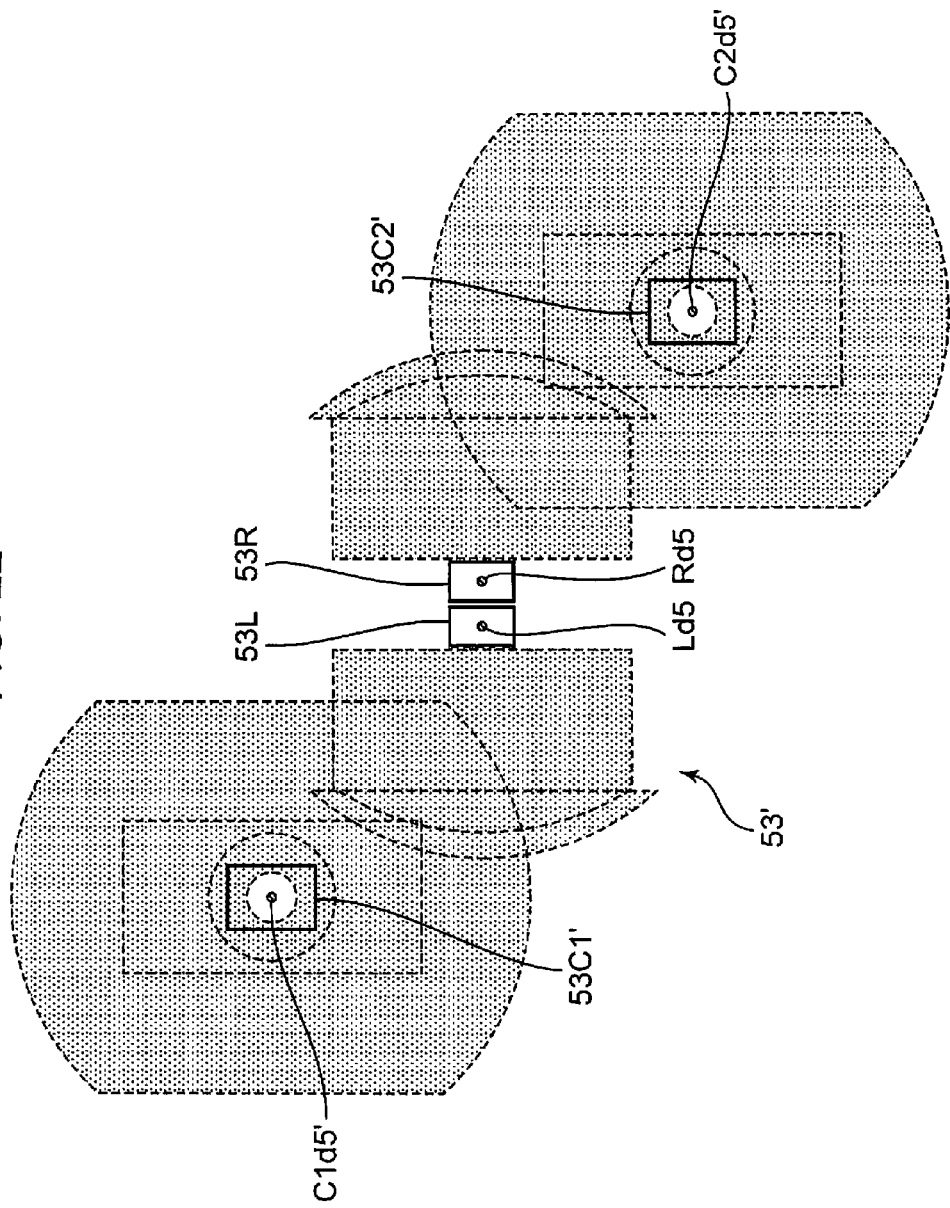
FIG. 22 is a diagram for explaining stray light reflected by an information recording surface positioned on a light incidence surface side relative to an information recording surface that is a recording or reproducing object in an RF light receiving element and stray light reflected by an information recording surface positioned on a side of a surface opposite to a light incidence surface side relative to the information recording surface that is a recording or reproducing object in the RF light receiving element.

FIG. 21 is a diagram showing another example of an RF hologram according to the third embodiment of the present disclosure, and FIG. 22 is a diagram for explaining stray light reflected by an information recording surface positioned on a light incidence surface side relative to an information recording surface that is a recording or reproducing object in an RF light receiving element and stray light reflected by an information recording surface positioned on a side of a surface opposite to a light incidence surface side relative to the information recording surface that is a recording or reproducing object in the RF light receiving element.

For example, in an RF hologram 51' shown in FIG. 21, a central region 51C' is formed by a binary simple diffraction grating that respectively diffracts +1 order diffracted light C1d5' and −1 order diffracted light C2d5' in a lower right direction and an upper left direction. The +1 order diffracted light C1d5' and the −1 order diffracted light C2d5' respectively enter a first central portion light receiving section 53C1' and a second central portion light receiving section 53C2' on an RF light receiving element 53' shown in FIG. 22.

As shown in FIG. 22, stray light reflected by an information recording surface positioned 40 μm in front (on a light incidence surface side) of an information recording surface that is a recording or reproducing object and stray light reflected by an information recording surface positioned 40 μm to the back (on a side of a surface opposite to the light incidence surface side) of the information recording surface that is a recording or reproducing object overlap each other. Another layer-reflected stray light and surface-reflected stray light incident on the RF hologram 51' do not overlap on the RF light receiving element 53' with signal light C1d5', C2d5', Rd5, and Ld5 reflected by the information recording surface that is a recording or reproducing object. Therefore, signal light and stray light do not interfere with each other. As a result, even with the configuration described above, stable signal detection can be realized when recording or reproducing information on or from a high-density optical disc having been multilayered and having attained a narrow track pitch.

Fourth Embodiment

In the present fourth embodiment, components in common with the first to third embodiments will be denoted by the same reference characters and a description thereof will be omitted.

Figure 23:
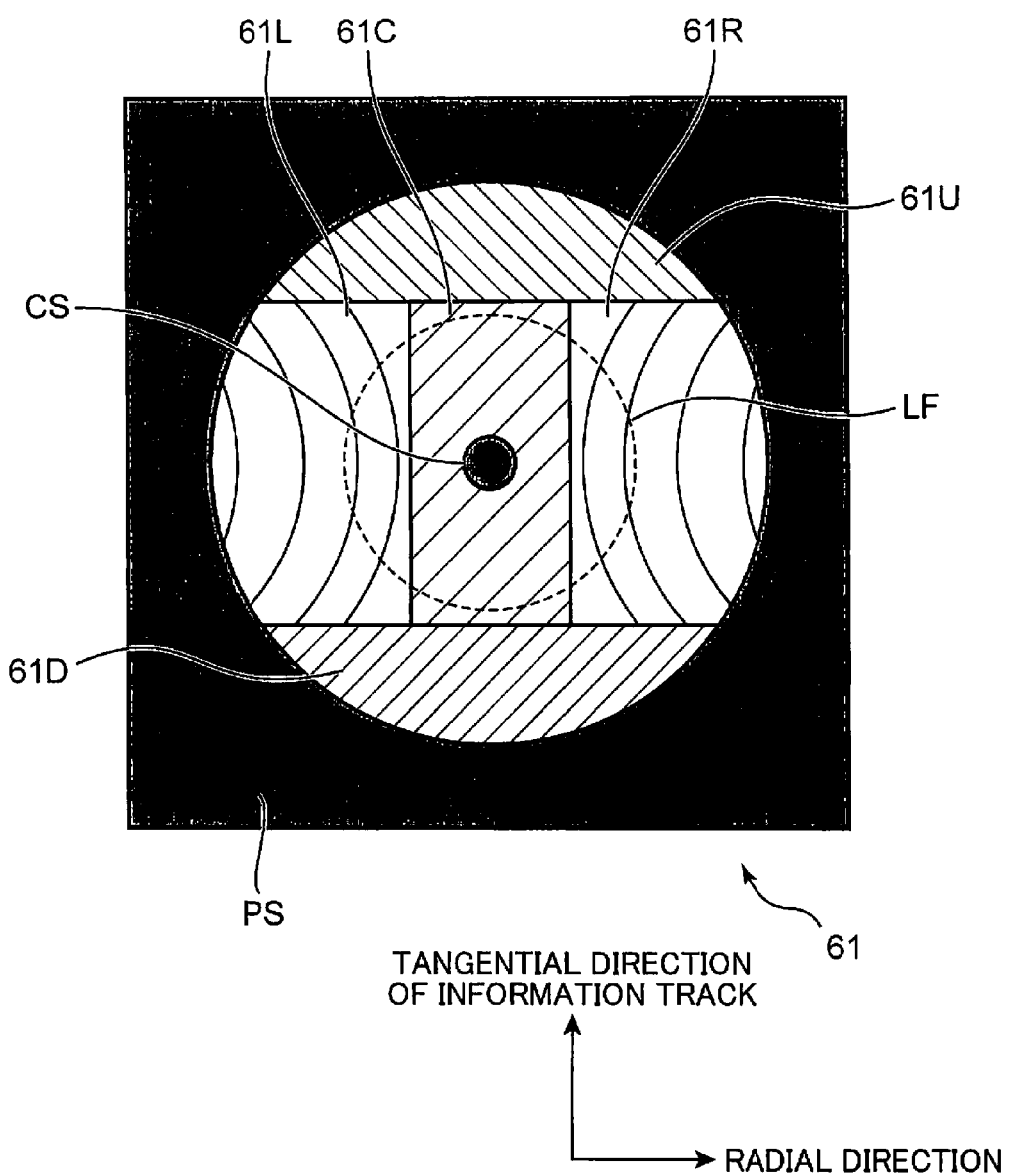
FIG. 23 is a diagram showing a configuration of an RF hologram according to a fourth embodiment of the present disclosure.

FIG. 23 is a diagram showing a configuration of an RF hologram according to the fourth embodiment of the present disclosure.

As shown in FIG. 23, an RF hologram 61 according to the present fourth embodiment is divided into three in a radial direction of the high-density optical disc 200 (a direction perpendicular to a tangent line of an information track) and further divided into three in a tangential direction of an information track, and includes a central region 61C including an optical axis of laser light, a first end portion region 61R and a second end portion region 61L which sandwich the central region 61C, and a first adjustment region 61U and a second adjustment region 61D which sandwich the central region 61C, the first end portion region 61R, and the second end portion region 61L. In addition, a central shielding section CS which does not transmit blue-violet laser light or which has lower transmittance relative to the central region 61C is formed at a center of the central region 61C. Furthermore, a peripheral shielding section PS which does not transmit blue-violet laser light or which has lower transmittance relative to the central region 61C, the first end portion region 61R, the second end portion region 61L, the first adjustment region 61U, and the second adjustment region 61D is formed at a periphery of the central region 61C, the first end portion region 61R, the second end portion region 61L, the first adjustment region 61U, and the second adjustment region 61D.

The RF hologram 61 further splits laser light reflected by any of the information recording surfaces of the high-density optical disc 200 into a luminous flux diffracted by the first adjustment region 61U and a luminous flux diffracted by the second adjustment region 61D.

A luminous flux LF (depicted by a dashed line) incident on each region of the RF hologram 61 is diffracted and enters a corresponding light receiving section on an RF light receiving element 63.

Figure 24:
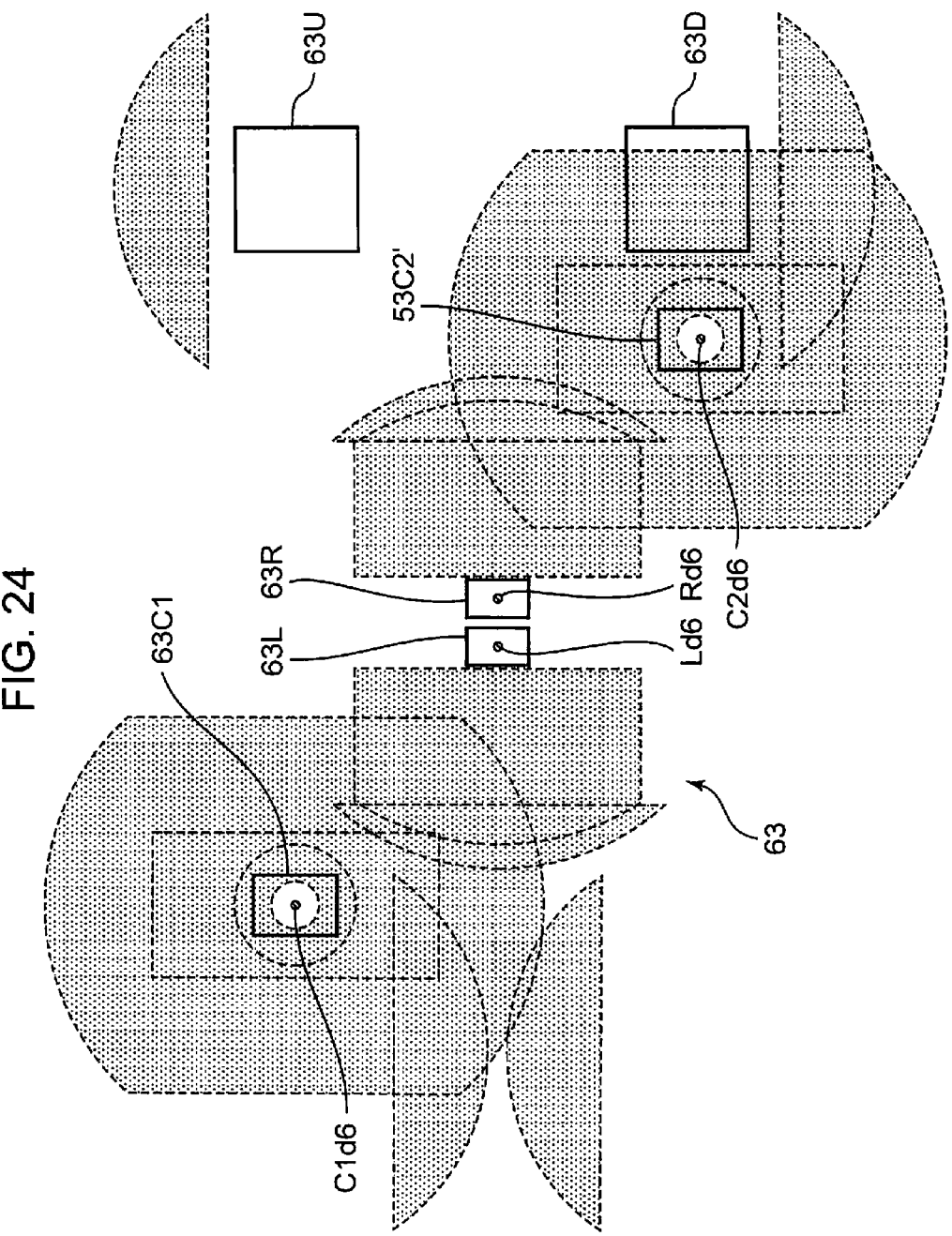
FIG. 24 is a diagram showing a configuration of an RF light receiving element according to the fourth embodiment of the present disclosure.

FIG. 24 is a diagram showing a configuration of an RF light receiving element according to the present fourth embodiment of the present disclosure.

The RF light receiving element 63 receives a plurality of luminous fluxes split by the RF hologram 61 and outputs a plurality of signals in accordance with light intensities of the plurality of received luminous fluxes. The RF light receiving element 63 receives +1 order diffracted light C1d6 and −1 order diffracted light C2d6 generated by the central region 61C, +1 order diffracted light Rd6 generated by the first end portion region 61R, +1 order diffracted light Ld6 generated by the second end portion region 61L, at least one of the ±1 order diffracted light generated by the first adjustment region 61U, and at least one of the ±1 order diffracted light generated by the second adjustment region 61D. The RF light receiving element 63 includes a first central portion light receiving section 63C1, a second central portion light receiving section 63C2, a first end portion light receiving section 63R, a second end portion light receiving section 63L, a first adjustment light receiving section 63U, and a second adjustment light receiving section 63D.

+1 order diffracted light C1d6 and −1 order diffracted light C2d6 having been diffracted by the central region 61C respectively enter the first central portion light receiving section 63C1 and the second central portion light receiving section 63C2 on the RF light receiving element 63. +1 order diffracted light Rd6 having been diffracted by the first end portion region 61R and +1 order light Ld6 having been diffracted by the second end portion region 61L respectively enter the first end portion light receiving section 63R and the second end portion light receiving section 63L on the RF light receiving element 63. The RF light receiving element 63 outputs signals in accordance with light intensities of diffracted light C1d6, C2d6, Rd6, and Ld6 received by the respective light receiving sections 63C1, 63C2, 63R, and 63L. The signals output from the respective light receiving sections 63C1, 63C2, 63R, and 63L are subjected to waveform equalization and subsequently added up, and are reproduced as an information signal at a low error rate in a similar manner to the first to third embodiments.

In the RF hologram 61 according to the present fourth embodiment shown in FIG. 23, the central region 61C is formed by a binary simple diffraction grating, generates +1 order diffracted light C1d6 and −1 order diffracted light C2d6 from a luminous flux incident on the central region 61C, and causes the +1 order diffracted light C1d6 and the −1 order diffracted light C2d6 to respectively enter the first central portion light receiving section 63C and the second central portion light receiving section 63C2 on the RF light receiving element 63. At this point, diffraction efficiencies of the +1 order diffracted light C1d6 and the −1 order diffracted light C2d6 (including an AR coating for reducing reflection) are respectively around 35% (70% when combined). Moreover, favorably, the diffraction efficiencies of the +1 order diffracted light C1d6 and the −1 order diffracted light C2d6 are, respectively, substantially 30% or higher (60% or higher when combined).

On the other hand, the first end portion region 61R and the second end portion region 61L are formed by blazed diffraction gratings, respectively generate +1 order light Rd6 and +1 order light Ld6 from luminous fluxes incident on the first end portion region 61R and the second end portion region 61L, and respectively cause the +1 order light Rd6 and the +1 order light Ld6 to enter the first end portion light receiving section 63R and the second end portion light receiving section 63L on the RF light receiving element 63. At this point, taking an AR coating for reducing reflection into consideration, transmittances of the +1 order light Rd6 and the +1 order light Ld6 are around 85%. Moreover, favorably, the transmittances of the first end portion light receiving section 63R and the second end portion light receiving section 63L are substantially 80% or higher.

Therefore, since a loss in light intensity of the first end portion region 61R and the second end portion region 61L which contribute significantly to an amplitude of an information signal is small, an information signal with a high signal-to-noise intensity ratio (S/N) can be obtained.

In addition, the optical disc apparatus according to the present fourth embodiment may further include a wobble signal generating section that generates a wobble signal by calculating a difference signal (a push-pull signal) between a signal detected from +1 order diffracted light Rd6 which is diffracted by the first end portion region 61R of the RF hologram 61 and which is incident on the first end portion light receiving section 63R on the RF light receiving element 63 and a signal detected from +1 order diffracted light Ld6 which is diffracted by the second end portion region 61L of the RF hologram 61 and which is incident on the second end portion light receiving section 63L on the RF light receiving element 63.

A feature of the RF hologram 61 according to the present fourth embodiment is that, since blazed diffraction gratings are formed in the first end portion region 61R and the second end portion region 61L, +1 order light Rd6 and +1 order light Ld6 can be generated from luminous fluxes incident on the first end portion region 61R and the second end portion region 61L, and the +1 order light Rd6 and +1 order light Ld6 can be caused to be diffracted and incident on arbitrary positions on the RF light receiving element 63.

In addition, in a similar manner to the RF hologram 51 according to the third embodiment, power of a convex lens is imparted to the blazed diffraction gratings formed in the first end portion region 61R and the second end portion region 61L so that a best image point position (a position of the RF light receiving element 63 where a detected spot becomes minimum) of the +1 order diffracted light C1d6 and the −1 order diffracted light C2d6 which are diffracted by the central region 61C that does not have a lens effect and a best image point position of the +1 order light Rd6 and the +1 order light Ld6 which are diffracted by the first end portion region 61R and the second end portion region 61L coincide with each other.

Therefore, the +1 order light Rd6 transmitted through the first end portion region 61R and the +1 order light Ld6 transmitted through the second end portion region 61L can be detected respectively separated from one another by the first end portion light receiving section 63R and the second end portion light receiving section 63L on the RF light receiving element 63 and, at the same time, a detected spot on the RF light receiving element 63 can be caused to completely converge. As a result, a margin with respect to displacement between a luminous flux and the RF light receiving element 63 increases and stable signal detection with even higher reliability can be realized.

The first adjustment region 61U and the second adjustment region 61D are formed by a binary simple diffraction grating, respectively generate ±1 order diffracted light from luminous fluxes incident on the first adjustment region 61U and the second adjustment region 61D, and cause the ±1 order diffracted light to respectively enter the first adjustment light receiving section 63U and the second adjustment light receiving section 63D on the RF light receiving element 63.

Moreover, the first adjustment light receiving section 63U on the RF light receiving element 63 may receive both the ±1 order diffracted light having been diffracted by the first adjustment region 61U or may receive either one of the ±1 order diffracted light having been diffracted by the first adjustment region 61U. Similarly, the second adjustment light receiving section 63D on the RF light receiving element 63 may receive both the ±1 order diffracted light having been diffracted by the second adjustment region 61D or may receive either one of the ±1 order diffracted light having been diffracted by the second adjustment region 61D.

In this case, the central shielding section CS formed in the RF hologram 61 shown in FIG. 23 shields a central portion of the luminous flux LF by causing approximate coincidence with a center (optical axis) of the luminous flux LF and prevents signal light incident on the central region 61C, another layer-reflected stray light, and surface-reflected stray light from overlapping and interfering with each other on the RF light receiving element 63.

Relative positions of the luminous flux LF and the RF hologram 61 in the radial direction are favorably adjusted so that (output corresponding to) light intensities of +1 order light Rd6 and +1 order light Ld6 incident on the first end portion light receiving section 63R and the second end portion light receiving section 63L of the RF light receiving element 63 become approximately equal to each other.

On the other hand, relative positions of the luminous flux LF and the RF hologram 61 in the tangential direction of an information track can be adjusted by monitoring (output corresponding to) light intensities of ±1 order diffracted light incident on the first adjustment light receiving section 63U and the second adjustment light receiving section 63D of the RF light receiving element 63 when intentionally offsetting the luminous flux LF and the RF hologram 61 in the tangential direction of an information track.

Figure 25:
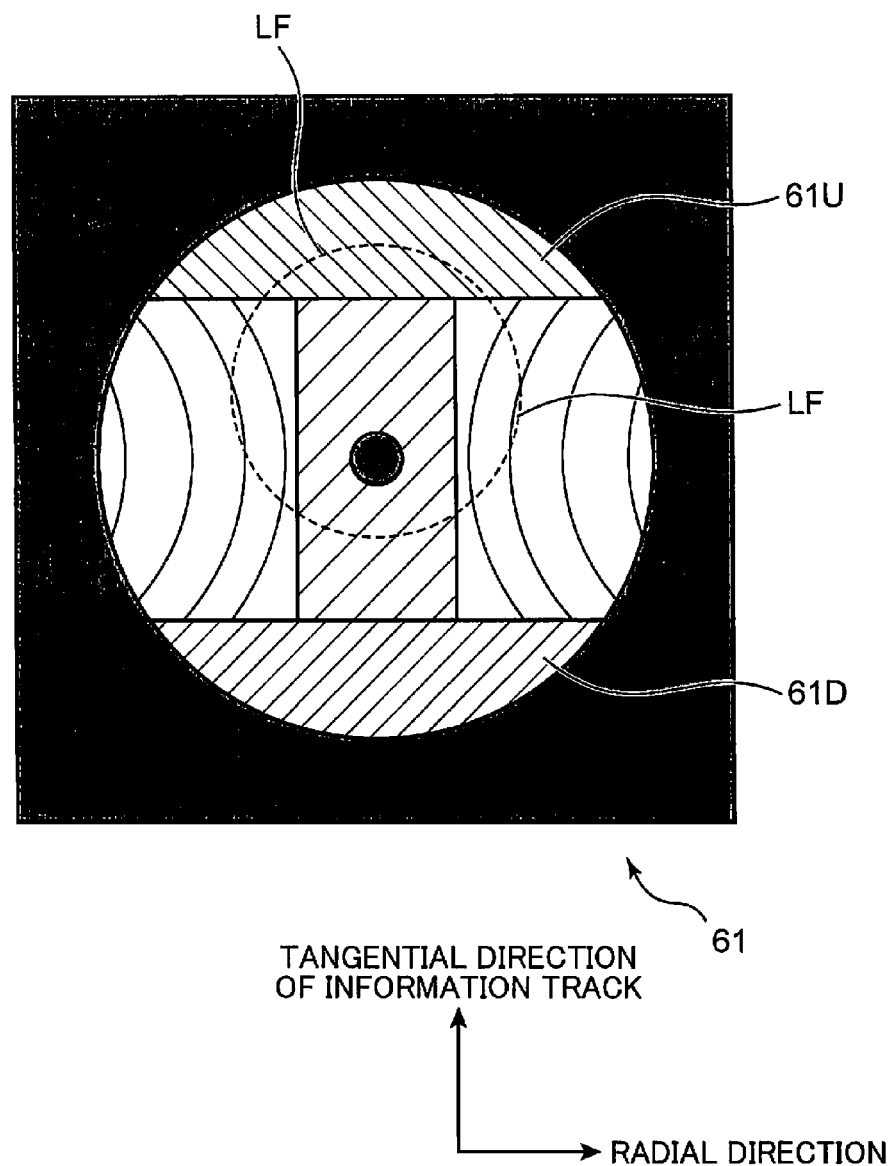
FIG. 25 is a diagram showing an example where a luminous flux is offset to a side of a first adjustment region in an RF hologram according to the present fourth embodiment.
Figure 27:
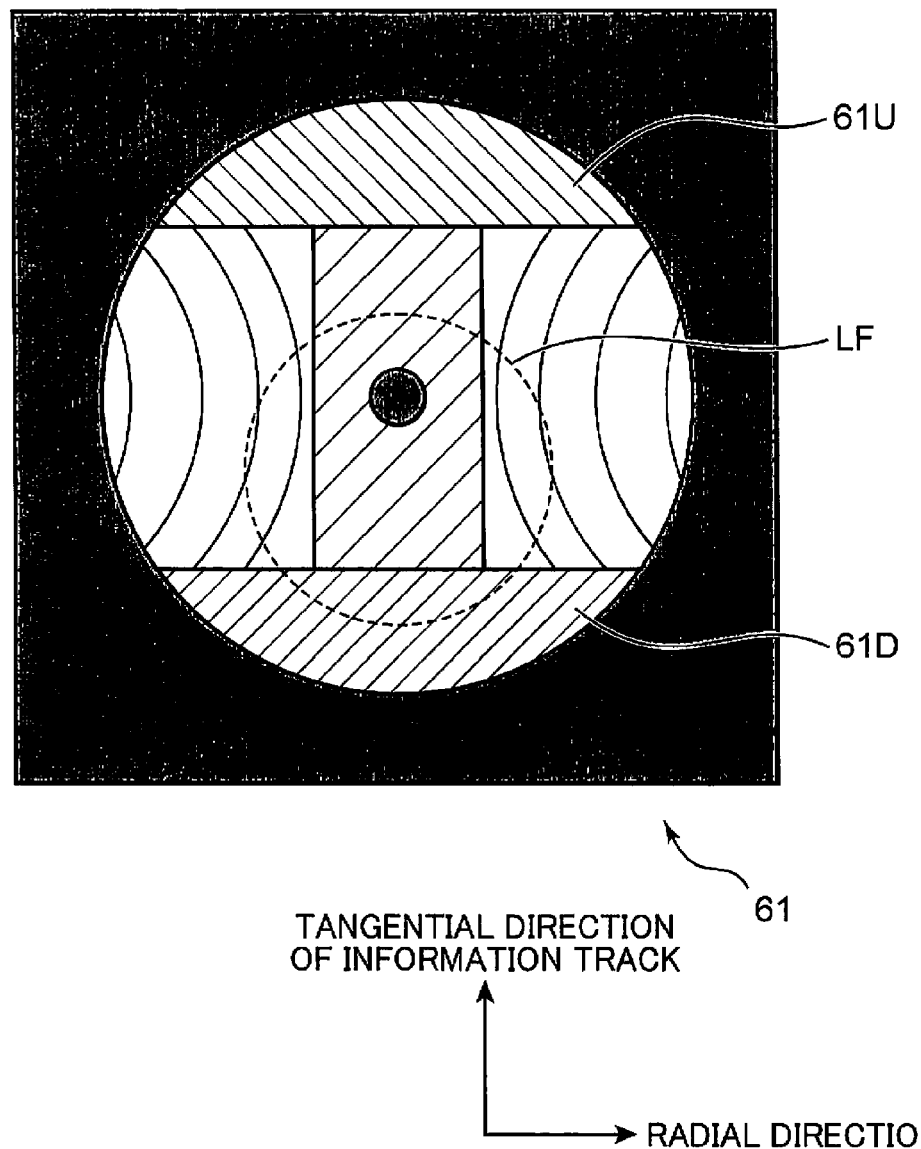
FIG. 27 is a diagram showing an example where a luminous flux is offset to a side of a second adjustment region in an RF hologram according to the present fourth embodiment.

FIG. 25 is a diagram showing an example where a luminous flux is offset to a side of the first adjustment region 61U in the RF hologram 61 according to the present fourth embodiment, and FIG. 26 is a diagram showing diffracted light incident on the RF light receiving element 63 in a case where a luminous flux is offset to a side of the first adjustment region 61U. FIG. 27 is a diagram showing an example where a luminous flux is offset to a side of the second adjustment region 61D in the RF hologram 61 according to the present fourth embodiment, and FIG. 28 is a diagram showing diffracted light incident on the RF light receiving element 63 in a case where a luminous flux is offset to a side of the second adjustment region 61D.

Specifically, as shown in FIG. 25, when the luminous flux LF is offset upward on a paper surface (to the side of the first adjustment region 61U) with respect to the RF hologram 61, +1 order diffracted light U incident on and diffracted by the first adjustment region 61U is incident on the first adjustment light receiving section 63U on the RF light receiving element 63 as shown in FIG. 26. The greater the relative displacement of the luminous flux LF and the RF hologram 61 in the tangential direction of an information track, the greater the light intensity of the +1 order diffracted light U received by the first adjustment light receiving section 63U.

Figure 28:
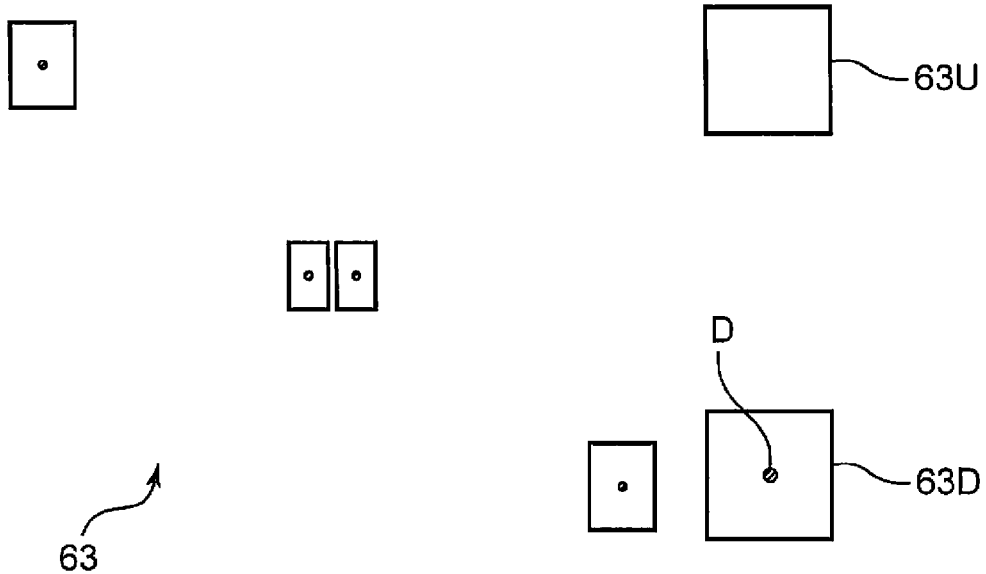
FIG. 28 is a diagram showing diffracted light incident on an RF light receiving element in a case where a luminous flux is offset to a side of a second adjustment region.

Meanwhile, as shown in FIG. 27, when the luminous flux LF is offset downward on the paper surface (to the side of the second adjustment region 61D) with respect to the RF hologram 61, +1 order diffracted light D incident on and diffracted by the second adjustment region 61D is incident on the second adjustment light receiving section 63D on the RF light receiving element 63 as shown in FIG. 28. The greater the relative displacement of the luminous flux LF and the RF hologram 61 in the tangential direction of an information track, the greater the light intensity of the +1 order diffracted light D received by the second adjustment light receiving section 63D.

Furthermore, when there is no relative displacement of the luminous flux LF and the RF hologram 61 in the tangential direction of an information track, the light intensity of the +1 order diffracted light U received by the first adjustment light receiving section 63U and the light intensity of the +1 order diffracted light D received by the second adjustment light receiving section 63D are both zero.

Relative positions of the luminous flux LF and the RF hologram 61 in the tangential direction of an information track are adjusted so that the light intensity of the +1 order diffracted light U received by the first adjustment light receiving section 63U when the luminous flux LF is offset upward on the paper surface by a prescribed amount (for example, +X μm) with respect to the RF hologram 61 is approximately equal to the light intensity of the +1 order diffracted light D received by the second adjustment light receiving section 63D when the luminous flux LF is offset downward on the paper surface by a prescribed amount (for example, −X μm) with respect to the RF hologram 61. Accordingly, relative positions of the luminous flux LF and the RF hologram 61 in the tangential direction of an information track can be adjusted more readily. Therefore, favorably, a diffraction efficiency of the first adjustment region 61U and a diffraction efficiency of the second adjustment region 61D are approximately equal to each other. In order to cause the diffraction efficiency of the first adjustment region 61U and the diffraction efficiency of the second adjustment region 61D to be approximately equal to each other, favorably, a diffraction pitch of the binary simple diffraction grating formed in the first adjustment region 61U and a diffraction pitch of the binary simple diffraction grating formed in the second adjustment region 61D are set approximately equal to each other.

Moreover, diffraction efficiencies of the ±1 order diffracted light (including an AR coating for reducing reflection) having been diffracted by the first adjustment region 61U are respectively around 35% (70% when combined). In addition, favorably, the diffraction efficiencies of the ±1 order diffracted light having been diffracted by the first adjustment region 61U are, respectively, substantially 30% or higher (60% or higher when combined).

In addition, diffraction efficiencies of the ±1 order diffracted light (including an AR coating for reducing reflection) having been diffracted by the second adjustment region 61D are respectively around 35% (70% when combined). Furthermore, favorably, the diffraction efficiencies of the ±1 order diffracted light having been diffracted by the second adjustment region 61D are, respectively, substantially 30% or higher (60% or higher when combined).

In FIG. 24, stray light reflected by an information recording surface positioned 40 μm in front (on a light incidence surface side) of an information recording surface that is a recording or reproducing object and stray light reflected by an information recording surface positioned 40 μm to the back (on a side of a surface opposite to the light incidence surface side) of the information recording surface that is a recording or reproducing object overlap each other. Another layer-reflected stray light and surface-reflected stray light incident on the RF hologram 61 including another layer-reflected stray light and surface-reflected stray light incident on the first adjustment region 61U and the second adjustment region 61D do not overlap on the RF light receiving element 63 with signal light C1d6, C2d6, Rd6, and Ld6 reflected by the information recording surface that is a recording or reproducing object. Therefore, signal light and stray light do not interfere with each other. As a result, even with the configuration described above, stable signal detection can be realized when recording or reproducing information on or from the high-density optical disc 200 having been multilayered and having attained a narrow track pitch.

Figure 29:
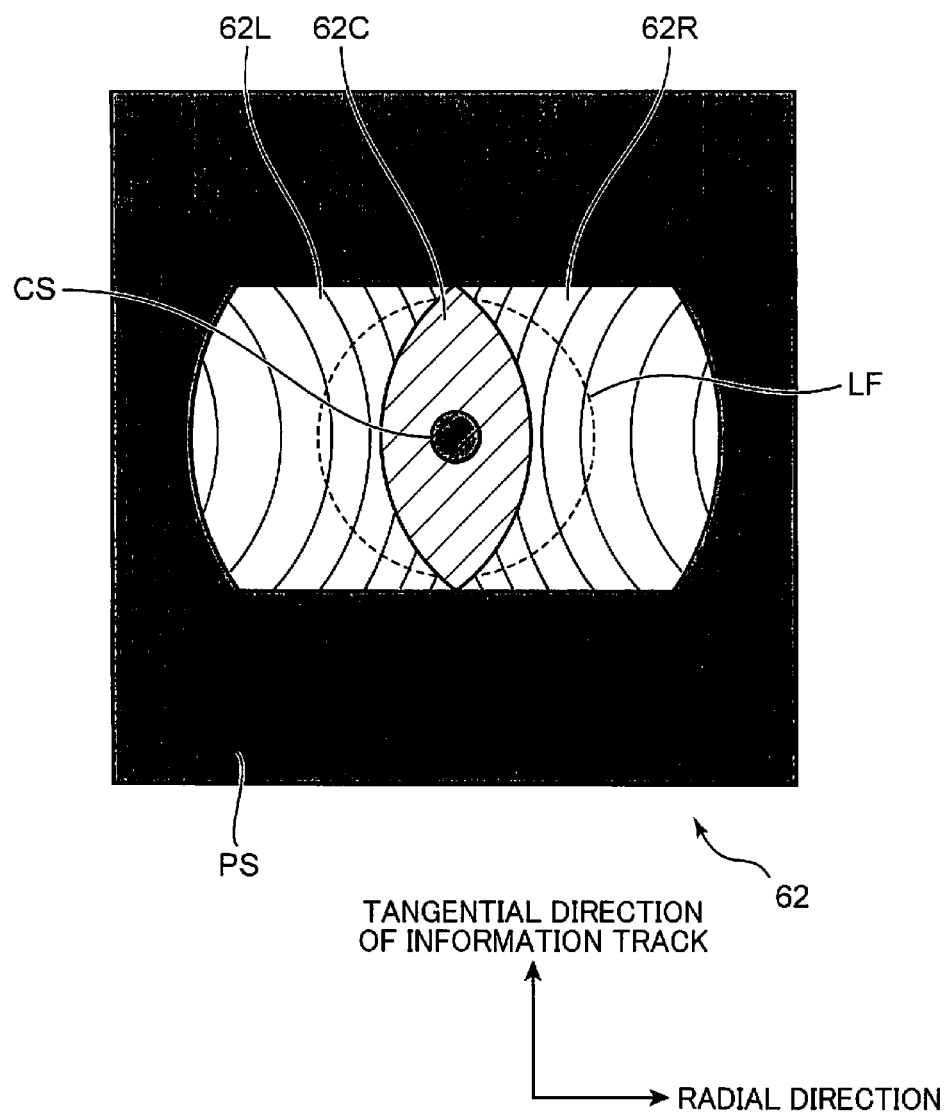
FIG. 29 is a diagram showing a configuration of an RF hologram according to a first modification of the fourth embodiment of the present disclosure.

FIG. 29 is a diagram showing a configuration of an RF hologram according to a first modification of the fourth embodiment of the present disclosure.

For example, as shown in FIG. 29, an RF hologram 62 may be divided into three by curved lines in a radial direction of the high-density optical disc 200 (a direction perpendicular to a tangent line of an information track), and may include a central region 62C including an optical axis of laser light as well as a first end portion region 62R and a second end portion region 62L which sandwich the central region 62C. In other words, favorably, a boundary line between the central region 62C and the first end portion region 62R has a curved shape and a boundary line between the central region 62C and the second end portion region 62L has a curved shape.

By adopting the configuration described above, when the luminous flux LF is offset upward or downward on a paper surface with respect to the RF hologram 62, light intensities of ±1 order diffracted light incident on and diffracted by the central region 62C decrease and light intensities of ±1 order diffracted light incident on and diffracted by the first end portion region 62R and the second end portion region 62L increase.

In other words, relative positions of the luminous flux LF and the RF hologram 62 in the tangential direction of an information track can be adjusted by monitoring (output corresponding to) light intensities of ±1 order diffracted light having been diffracted by the central region 62C and (output corresponding to) light intensities of +1 order diffracted light having been diffracted by the first end portion region 62R and the second end portion region 62L when intentionally offsetting the luminous flux LF and the RF hologram 62 in the tangential direction of an information track. In this case, there is an advantage that the first adjustment light receiving section 63U and the second adjustment light receiving section 63D for adjusting relative positions in the tangential direction of an information track shown in FIG. 24 are no longer required.

Figure 30:
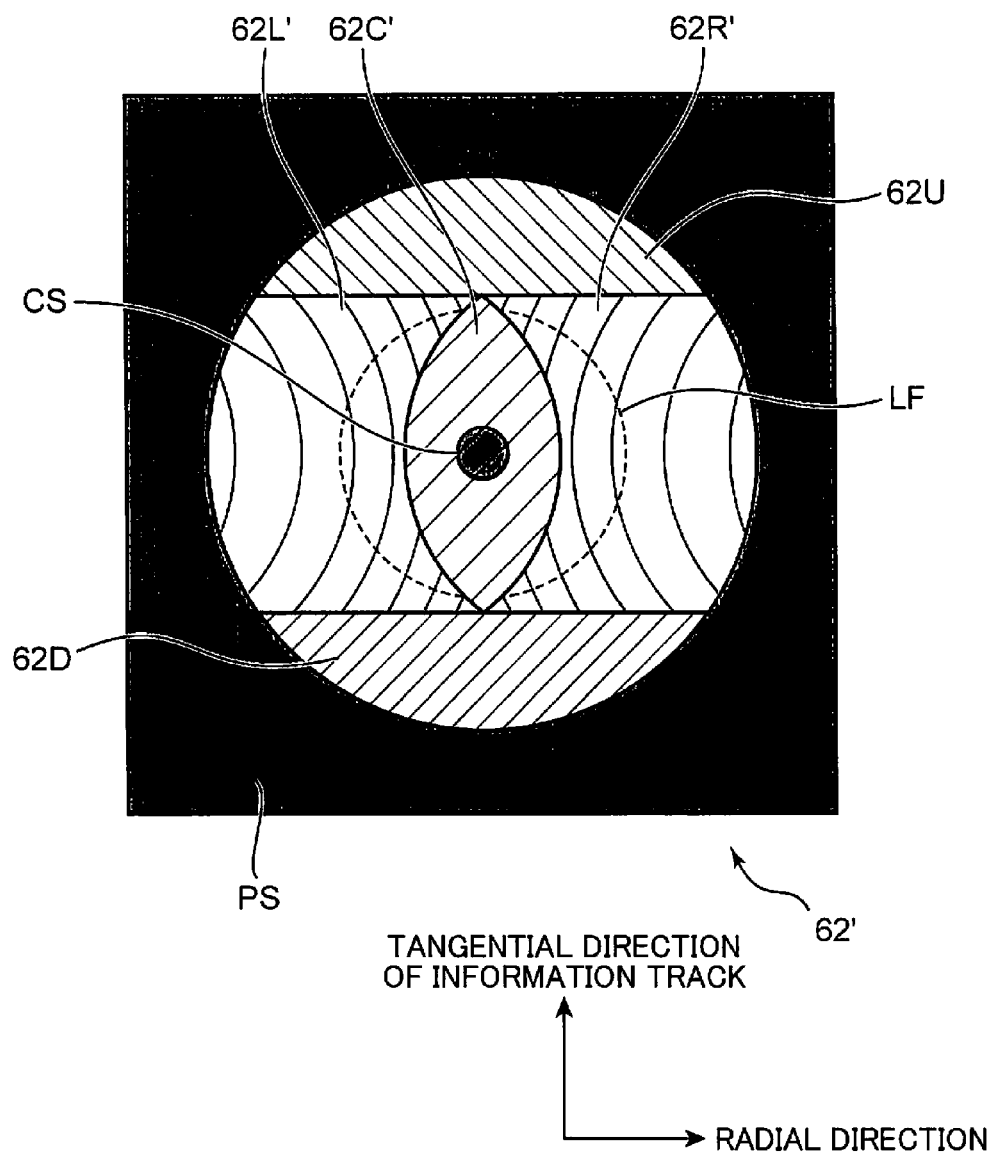
FIG. 30 is a diagram showing a configuration of an RF hologram according to a second modification of the fourth embodiment of the present disclosure.

FIG. 30 is a diagram showing a configuration of an RF hologram according to a second modification of the fourth embodiment of the present disclosure.

For example, as shown in FIG. 30, an RF hologram 62' may be divided into three by curved lines in a radial direction of the high-density optical disc 200 (a direction perpendicular to a tangent line of an information track) and further divided into three in a tangential direction of an information track, and may include a central region 62C' including an optical axis of laser light, a first end portion region 62R' and a second end portion region 62L' which sandwich the central region 62C', and a first adjustment region 62U' and a second adjustment region 62D' which sandwich the central region 62C', the first end portion region 62R', and the second end portion region 62L'. By adopting the configuration described above, relative positions of the luminous flux LF and the RF hologram 62' in the tangential direction of an information track can be adjusted more readily.

It is needless to say that, even with the configuration of the RF hologram 62 (or the RF hologram 62'), outputs in accordance with light intensities of diffracted light having been diffracted by the central region 62C, the first end portion region 62R, and the second end portion region 62L are subjected to waveform equalization, added up, and reproduced as an information signal at a low error rate in a similar manner to the first to third embodiments.

Fifth Embodiment

Figure 31:
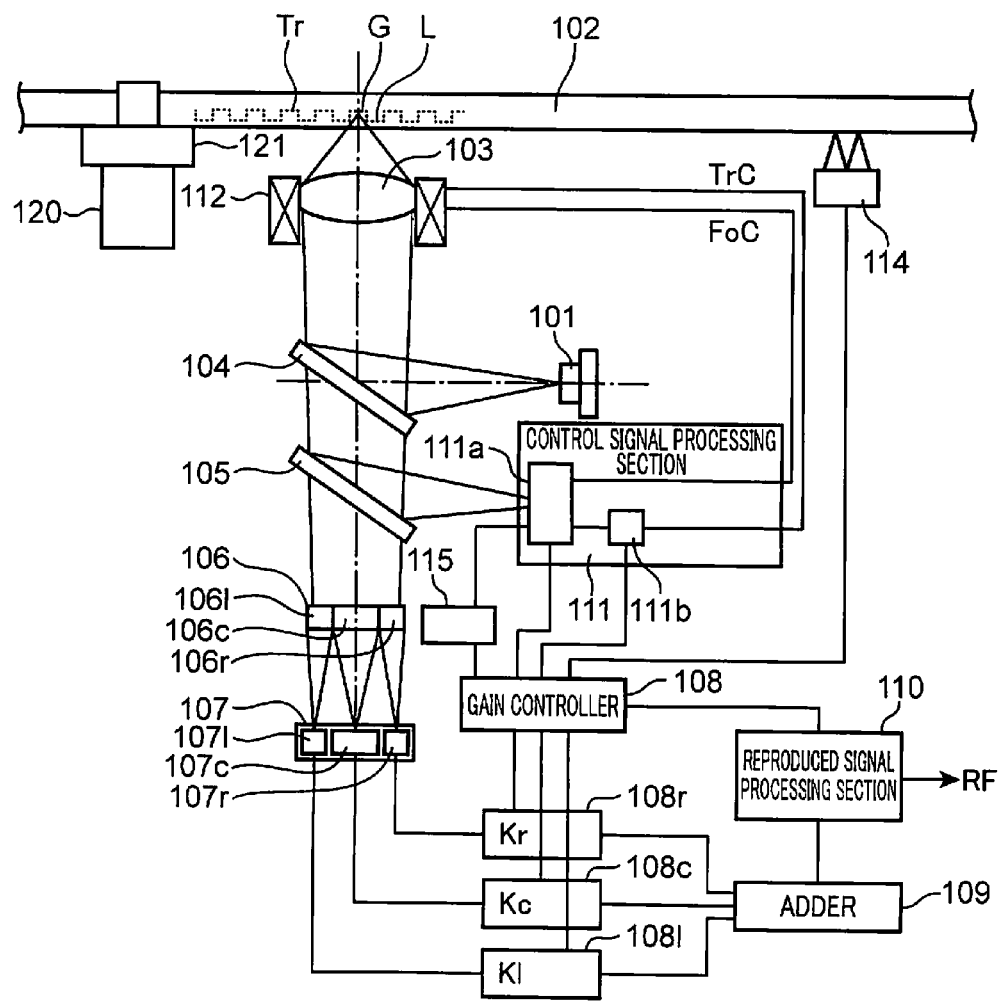
FIG. 31 is a schematic view showing a configuration of an optical disc apparatus according to a fifth embodiment of the present disclosure.
Figure 32:
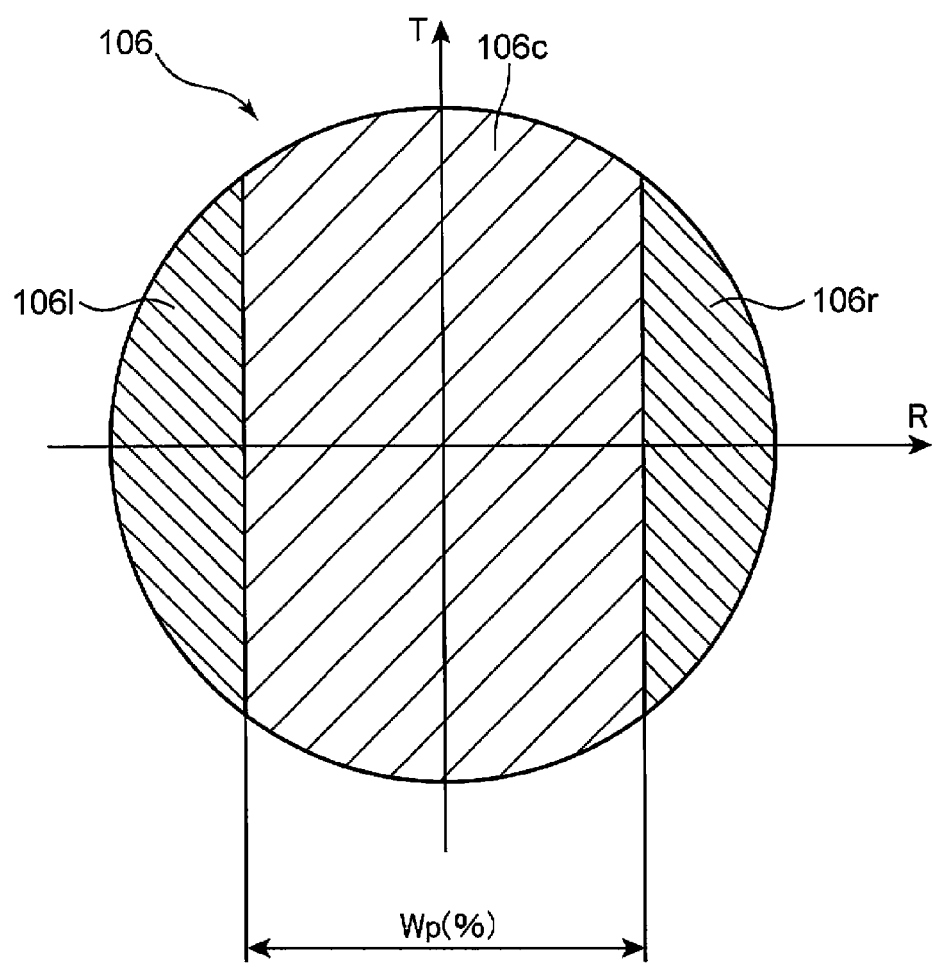
FIG. 32 is a schematic view showing a divided structure of a splitting element of an optical disk apparatus according to the fifth embodiment of the present disclosure.

FIG. 31 is a schematic view showing a configuration of an optical disk apparatus according to a fifth embodiment of the present disclosure, and FIG. 32 is a schematic view showing a divided structure of a splitting element of an optical disk apparatus according to the fifth embodiment of the present disclosure.

In FIG. 31, the optical disc apparatus includes a blue semiconductor laser unit 101, an objective lens 103, a laser mirror 104, a beam splitter 105, a splitting element 106, a light detector 107, a gain controller 108, amplifiers 108c, 108r, and 108l, an adder 109, a reproduced signal processing section 110, a control signal processing section 111, an objective lens actuator 112, a tilt detector 114, a lens shift detector 115, a spindle motor 120, and a turntable 121.

The control signal processing section 111 includes a control signal generating section 111a and a tracking switching device 111b. The splitting element 106 has a central portion region 106c and two end portion regions 106r and 106l. The light detector 107 has three light receiving sections 107c, 107r, and 107l.

In addition, a crosstalk canceller that cancels out crosstalk from an adjacent track of an optical disc 102 is constituted by the splitting element 106, the light detector 107, the gain controller 108, the amplifiers 108c, 108r, and 108l, the adder 109, and the like. Moreover, configurations of the gain controller and the amplifiers are not particularly limited to the examples shown in the drawing and, for example, a variable-gain amplifier circuit including a gain controller and at least three amplifiers may be used.

The blue semiconductor laser unit 101 is a laser light source that emits a luminous flux with a wavelength of λ. The wavelength λ of light emitted from the blue semiconductor laser unit 101 ranges from 400 nm to 415 nm. For example, in the present embodiment, the blue semiconductor laser unit 101 is configured so as to emit a light beam (luminous flux) with a wavelength of approximately 405 nm.

The optical disc 102 is mounted on the turntable 121 and rotates as the spindle motor 120 causes the turntable 121 to rotate. In addition, the optical disc 102 has groove-like tracks and enables information to be recorded in a land portion and a groove portion of the grooves. When a groove interval is denoted by Gp, Gp satisfies the following expression.

$$(Gp/2) < (1.2 \cdot \lambda)/(2 \cdot NA)$$

In the present embodiment, for example, the groove interval Gp=0.46 μm, and Gp/2 or, in other words, a track pitch Tp=0.23 μm. Accordingly, Gp/2 is under $(1.2 \cdot \lambda)/(2 \cdot NA) = (1.2 \times 0.405)/(2 \times 0.85) = 0.286$ μm.

Once again referring to FIG. 31, the objective lens 103 is an objective lens with a numerical aperture NA which condenses luminous fluxes emitted from the blue semiconductor laser unit 101 and forms a condensed light spot on the optical disc 102. For example, in the present embodiment, the objective lens 103 is configured so as to condense a light beam with a wavelength of approximately 405 nm at a numerical aperture of 0.85.

In this case, since the track pitch Tp of the optical disc 102 is reduced to 0.23 μm as compared to a track pitch of a BD of 0.32 μm, an increase in recording density by a factor of approximately 2.0 can be expected.

A light beam emitted from the blue semiconductor laser unit 101 is reflected by the laser mirror 104 and is directed toward the objective lens 103. The blue light beam condensed by the objective lens 103 is converged and irradiated on, for example, a groove portion G (or a land portion L) on an information recording surface of the optical disc 102.

In addition, reflected light having been reflected and diffracted on an information recording surface of the optical disc 102 is transmitted through the objective lens 103 in a similar manner to a forward path, transmitted through the laser mirror 104 and the beam splitter 105, and reaches the splitting element 106. The splitting element 106 is a diffraction element in which fine grooves are formed on a glass surface and which is manufactured so as to function as a diffraction grating.

As shown in FIG. 32, for example, the splitting element 106 is divided into three along a direction corresponding to a radial direction R of the optical disc 102 (a radial direction of the optical disc 102 which is a direction perpendicular to a tangential direction T) into a central portion region 106c as well as two end portion regions 106r and 106l which sandwich the central portion region 106c. A light beam having been transmitted through each region is separated into different directions by a diffraction grating of each region. In the present embodiment, for example, a width Wp of the central portion region 106c in the radial direction R of the splitting element 106 is set to approximately 45% of a diameter of a light beam.

Subsequently, the separated light beam is respectively incident on three different light receiving sections 107c, 107r, and 107l of the light detector 107. In other words, a light beam having been transmitted through the central portion region 106c is incident on the light receiving section 107c (central portion light receiving section) of the light detector 107, a light beam having been transmitted through the end portion region 106r is incident on the light receiving section 107r (end portion light receiving section) of the light detector 107, and a light beam having been transmitted through the end portion region 106l is incident on the light receiving section 107l (end portion light receiving section) of the light detector 107.

The light detector 107 respectively outputs light intensity signals in accordance with light intensities received by the light receiving sections 107c, 107r, and 107l. The respective light intensity signals are input to the amplifier 108c (central portion amplifier) and the amplifiers 108r and 108l (end portion amplifiers). The amplifiers 108c, 108r, and 108l are variable gain amplifiers which enable gain to be variable. The gain controller 108 controls the gains of the respective amplifiers 108c, 108r, and 108l. In other words, the gains of the amplifiers 108c, 108r, and 108l are set to optimal gains Kc, Kr, and Kl by the gain controller 108. The respective light intensity signals are amplified by the optimal gains Kc, Kr, and Kl and subsequently input to the adder 109.

The adder 109 adds up the light intensity signals amplified by the optimal gains Kc, Kr, and Kl and outputs an information signal. The reproduced signal processing section 110 processes the information signal and outputs a reproduced signal RF. As a result, since crosstalk from an adjacent track has been suppressed and an error rate has been reduced in the information signal output from the adder 109, a high-precision reproduced signal RF is reproduced by the reproduced signal processing section 110.

In addition, the reproduced signal processing section 110 generates an evaluation value of the reproduced signal RF and supplies the evaluation value to the gain controller 108. In the present embodiment, for example, it is assumed that iMLSE (Integrated-Maximum Likelihood Sequence Estimation) is to be generated as an evaluation value. iMLSE is used as an evaluation index of quality of a binarized reproduced signal and is an evaluation value representing error rate correlation.

In order to optimize a coefficient of crosstalk cancellation, the gain controller 108 controls the gains Kc, Kr, and Kl of the amplifiers 108c, 108r, and 108l using iMLSE described above as an index. Specifically, the gain controller 108 determines values of the gains Kc, Kr, and Kl so that iMLSE generated by the reproduced signal processing section 110 takes a minimum value. For example, the gain controller 108 repetitively calculates a value of iMLSE by changing values of the gains Kc, Kr, and Kl and selects values of the gains Kc, Kr, and Kl that produce a minimum iMLSE value.

In this case, since an effect of crosstalk cancellation is determined by a ratio of the gains Kc, Kr, and Kl imparted to the respective amplifiers 108c, 108r, and 108l, for the sake of simplifying calculation, the gain controller 108 determines the values of the gains Kr and Kl when the gain Kc=1. Moreover, while a certain degree of effectiveness can be secured by setting the gains Kc, Kr, and Kl to DC values, a higher effect can be produced by imparting the gains as a tap coefficient of a digital filter having frequency characteristics.

Meanwhile, the control signal generating section 111a of the control signal processing section 111 receives a light beam reflected by the beam splitter 105 and detects a focusing error signal and a tracking error signal, and generates a focusing control signal FoC and a tracking control signal TrC from the focusing error signal and the tracking error signal. The focusing control signal FoC and the tracking control signal TrC are output to the objective lens actuator 112 to cause the objective lens 103 to perform a focusing operation and a tracking operation. In the present embodiment, although the track pitch Tp is 0.23 μm and is below a diffraction limit of a light beam, since the groove interval Gp is 0.46 μm, a tracking error signal with sufficient amplitude can be obtained.

The control signal processing section 111 includes the tracking switching device 111b. The tracking switching device 111b outputs the tracking control signal TrC generated by the control signal generating section 111a to the gain controller 108. At this point, the tracking switching device 111b inverts a polarity of the tracking control signal TrC depending on whether a track scanned by a condensed light spot is a land portion L or a groove portion G of the optical disc 102.

In addition, by obtaining timing information of polarity switching of the tracking control signal from the tracking switching device 111b and information for specifying whether a track scanned by a condensed light spot is a land portion L or a groove portion G, the gain controller 108 can switch combinations of gains to be set to the amplifiers 108c, 108l, and 108r in accordance with switching between the land portion L and the groove portion G. Specifically, when the polarity of the tracking control signal is inverted, the gain controller 108 switches the gains of the amplifiers 108c, 108l, and 108r and, at the same time, sets the gain of the amplifier 108c to be substantially lower than the gain of at least one of the amplifiers 108l and 108r so that crosstalk from an adjacent track of the optical disc 102 decreases.

Therefore, while reflectance differs between the land portion L and the groove portion G, in the present embodiment, a relationship between a scanned track and an adjacent track is inverted depending on whether the scanned track is the land portion L or the groove portion G. As a result, since leakage of a signal from an adjacent track can be suppressed and an error rate can be reduced without nullifying an effect of crosstalk cancellation, recording and reproduction of an information signal can be realized with high precision.

Figure 33:
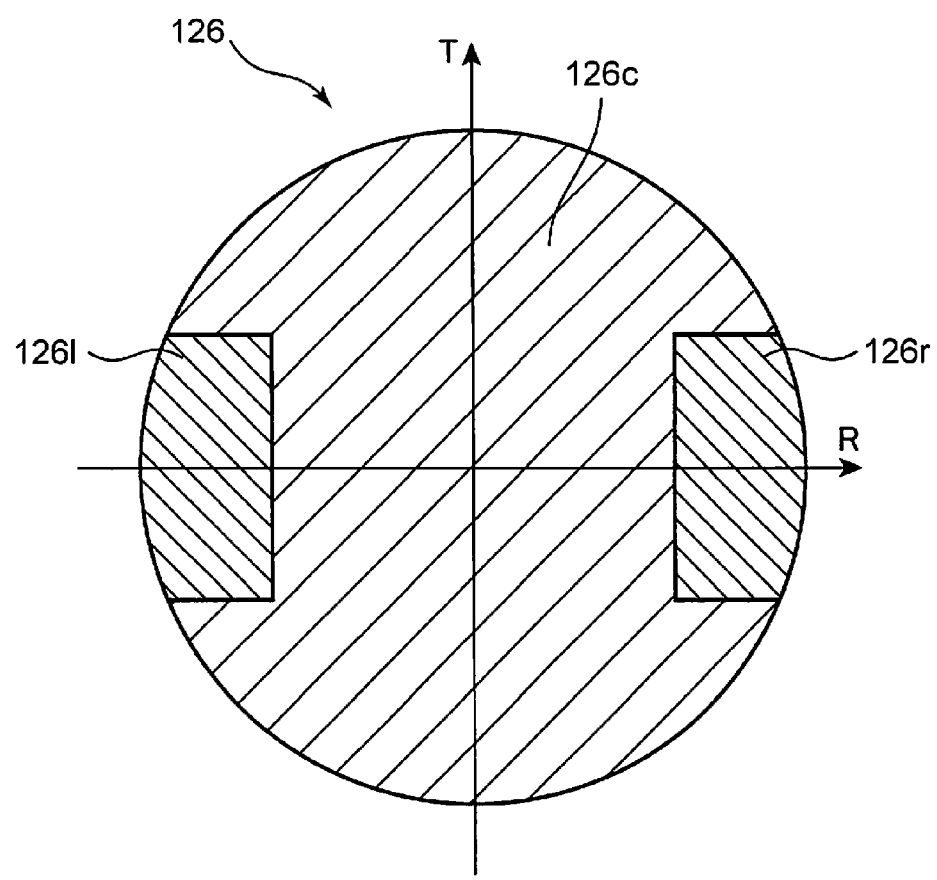
FIG. 33 is a schematic view showing a divided configuration of another splitting element used in the optical disk apparatus shown in FIG. 31.

In addition, a splitting element that can be used in the present embodiment is not particularly limited to the splitting element 106 and, for example, a splitting element described below can also be used. FIG. 33 is a schematic view showing a divided configuration of another splitting element used in the optical disc apparatus shown in FIG. 31.

A splitting element 126 shown in FIG. 33 is a diffraction element in which fine grooves are formed on a glass surface and which is manufactured so as to function as a diffraction grating. The splitting element 126 is divided into three in a direction corresponding to the radial direction R of the optical disc 102, and two end portion regions 126r and 126l are cut at upper and lower parts thereof by boundary lines parallel to the radial direction R. Therefore, the splitting element 126 has a centrally-positioned and approximately H-shaped (a shape viewed when a tangential direction T of the optical disc 102 is a horizontal direction) central portion region 126c and two rectangular (approximate rectangles with three sides being straight lines and one side being an arc) end portion regions 126r and 126l that sandwich the central portion region 126c.

A light beam having been transmitted through each region is separated into different directions by a diffraction grating of each region. Since the splitting element 126 is a three-way splitting element, in a similar manner to FIG. 31, the light detector 107 has three light receiving sections 107l, 107c, and 107r and the gain controller 108 also has three types of amplifiers 108l, 108c, and 108r and imparts gains of Kl, Kc, and Kr to the respective amplifiers 108l, 108c, and 108r.

As described above, in the present example, since correction of crosstalk is performed with a focus on a part where crosstalk from an adjacent track concentrates by dividing the splitting element 126 into three in the pattern shown in FIG. 33, the crosstalk from an adjacent track can be corrected in finer detail. Therefore, in addition to producing a similar effect to the optical disc apparatus shown in FIG. 31, since crosstalk is suppressed in finer detail and an error rate is further reduced in an information signal output from the adder 109, the reproduced signal processing section 110 can reproduce a reproduced signal RF with higher precision.

Sixth Embodiment

Figure 34:
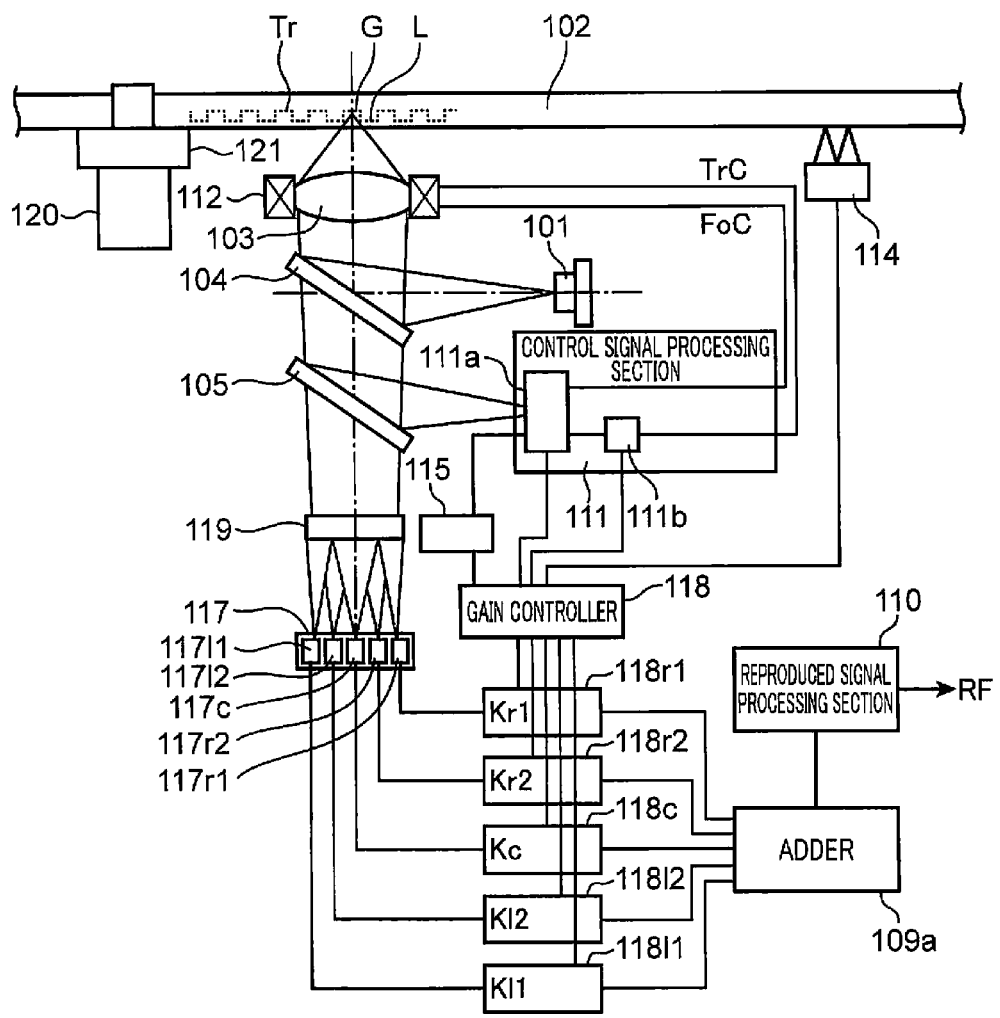
FIG. 34 is a schematic view showing a configuration of an optical disk apparatus according to a sixth embodiment of the present disclosure.
Figure 35:
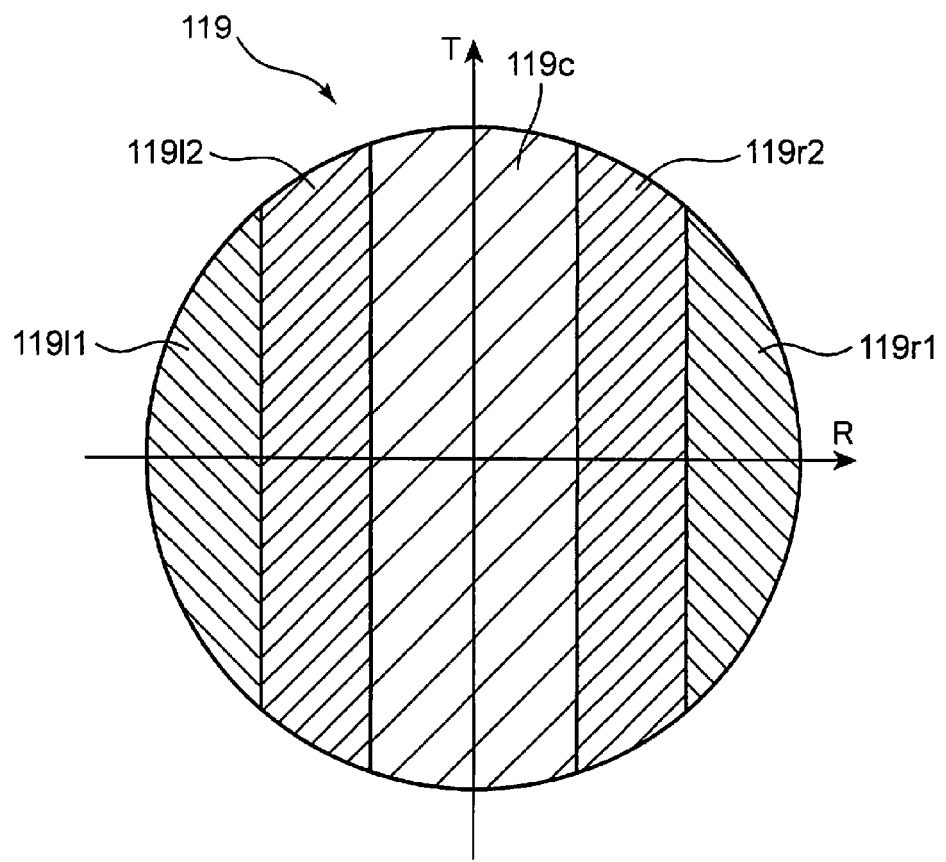
FIG. 35 is a schematic view showing a divided configuration of a splitting element of an optical disk apparatus according to the sixth embodiment of the present disclosure.

FIG. 34 is a schematic view showing a configuration of an optical disk apparatus according to a sixth embodiment of the present disclosure, and FIG. 35 is a schematic view showing a divided configuration of a splitting element of an optical disk apparatus according to the sixth embodiment of the present disclosure.

In FIG. 34, the same components as FIG. 31 will be denoted by the same reference characters and a description thereof will be omitted. FIG. 34 differs from FIG. 31 in that a splitting element 119, a light detector 117, a gain controller 118, amplifiers 118c, 118r1, 118r2, 118l1, and 118l2, and an adder 119a are used in place of the splitting element 106, the light detector 107, the gain controller 108, the amplifiers 108c, 108r, and 108l, and the adder 109.

The splitting element 119 is a diffraction element in which fine grooves are formed on a glass surface and which is manufactured so as to function as a diffraction grating. As shown in FIG. 35, the splitting element 119 is divided into five in a direction corresponding to the radial direction R of the optical disc 102 into a central portion region 119c, two end portion regions 119r2 and 119l2 that sandwich the central portion region 119c, and two end portion regions 119r1 and 119l1 that sandwich the two end portion regions 119r2 and 119l2. A light beam having been transmitted through each region is separated into different directions by a diffraction grating of each region.

In the present embodiment, widths of the respective regions of the splitting element 119 in the radial direction R are set such that, when a diameter of a light beam is assumed to be 100%, the width of the end portion region 119r1:the width of the end portion region 119r2:the width of the central portion region 119c:the width of the end portion region 119l2: the width of the end portion region 119l1=16.7%:16.7%: 33.3%:16.7%:16.7%.

Moreover, the widths of the divided regions (the central portion region 119c and the end portion regions 119r1, 119r2, 119l1, and 119l2) can be set to optimal values as appropriate depending on conditions.

In accordance with the fact that the splitting element 119 is a five-way splitting element, the light detector 117 also has five light receiving sections 117r1, 117r2, 117c, 117l2, and 117l1, and the gain controller 118 also controls five types of amplifiers 118r1, 118r2, 118c, 118l2, and 118l1 and imparts gains Kr1, Kr2, Kc, Kl2, and Kl1 to the respective amplifiers 118r1, 118r2, 118c, 118l2, and 118l1. In addition, the adder 119a adds up light intensity signals amplified by the optimal gains Kr1, Kr2, Kc, Kl2, and Kl1 and outputs an information signal to the reproduced signal processing section 110.

As described above, in the present embodiment, by configuring the splitting element 119 as a five-way splitting element, crosstalk from an adjacent track can be corrected with finer detail. Therefore, in addition to producing a similar effect to the optical disc apparatus shown in FIG. 31, since crosstalk is suppressed in finer detail and an error rate is further reduced in an information signal output from the adder 119a, the reproduced signal processing section 110 can reproduce a reproduced signal RF with higher precision.

Seventh Embodiment

Figure 36:
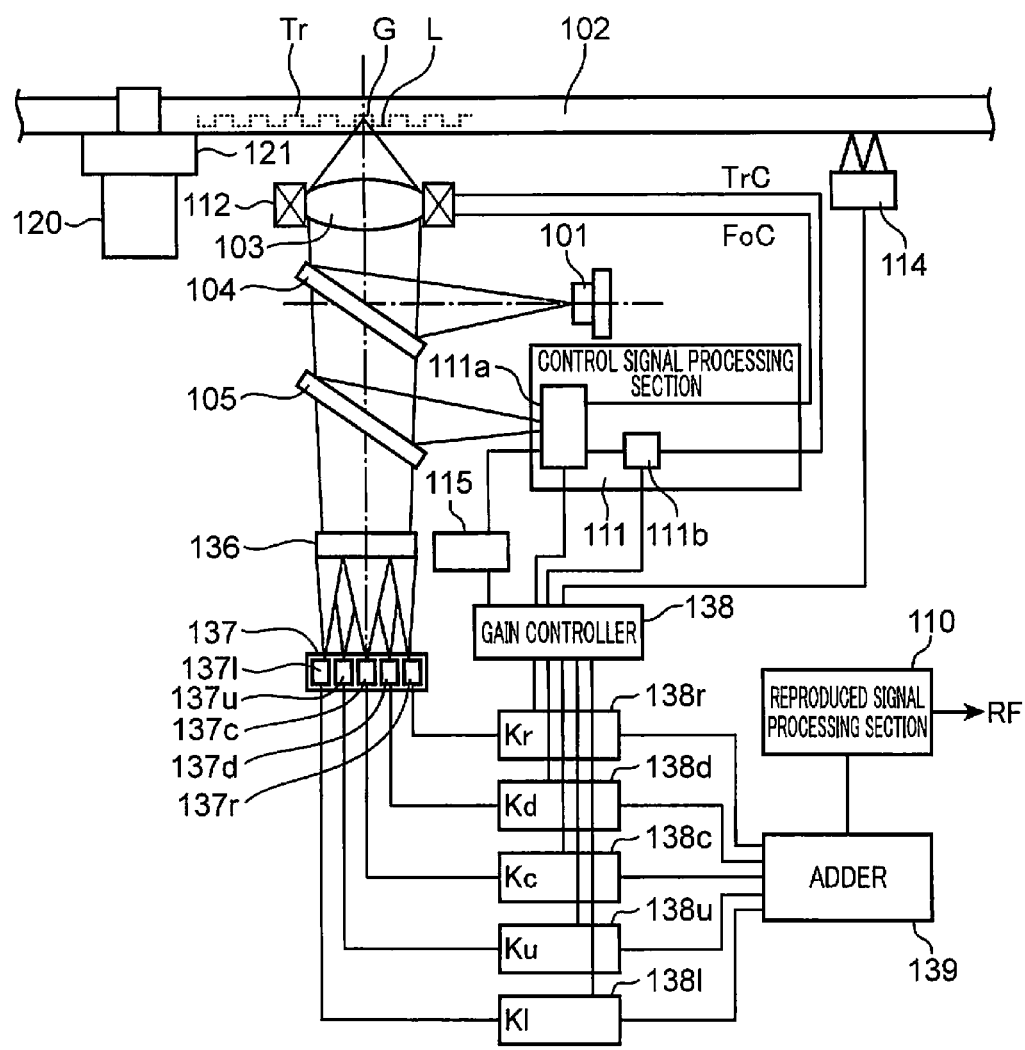
FIG. 36 is a schematic view showing a configuration of an optical disk apparatus according to a seventh embodiment of the present disclosure.
Figure 37:
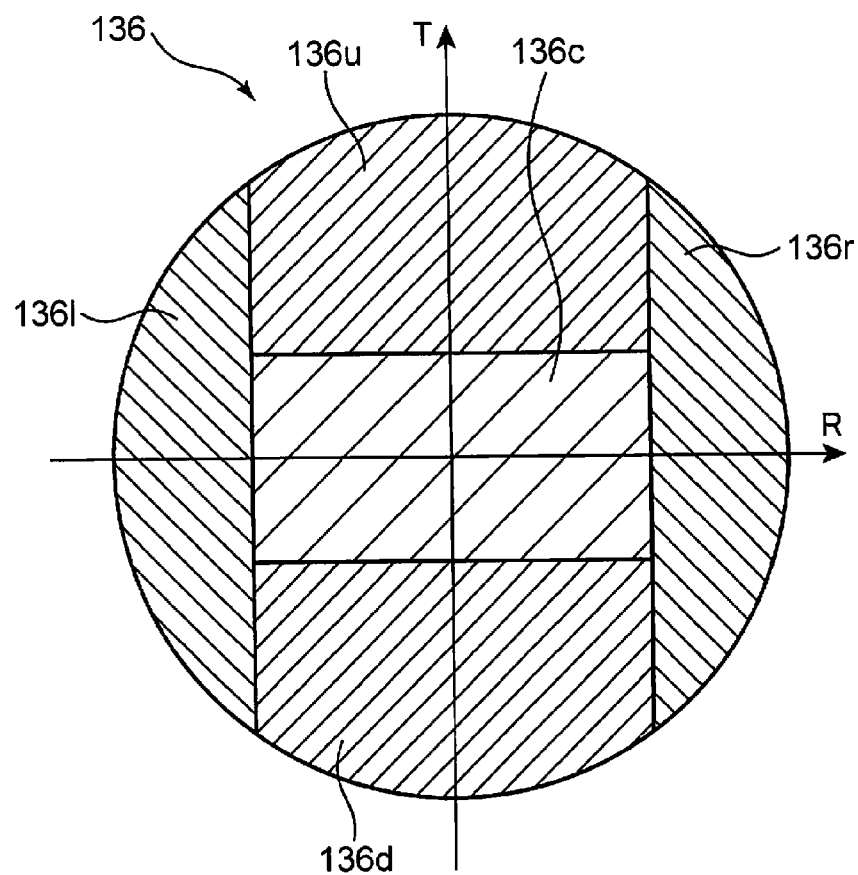
FIG. 37 is a schematic view showing a divided configuration of a splitting element of an optical disk apparatus according to the seventh embodiment of the present disclosure.

FIG. 36 is a schematic view showing a configuration of an optical disk apparatus according to a seventh embodiment of the present disclosure, and FIG. 37 is a schematic view showing a divided configuration of a splitting element of an optical disk apparatus according to the seventh embodiment of the present disclosure. In FIG. 36, the same components as FIG. 31 will be denoted by the same reference characters and a description thereof will be omitted.

FIG. 36 differs from FIG. 31 in that a splitting element 136, a light detector 137, a gain controller 138, amplifiers 138c, 138r, 138d, 138u, and 138l, and an adder 139 are used in place of the splitting element 106, the light detector 107, the gain controller 108, the amplifiers 108c, 108r, and 108l, and the adder 109.

The splitting element 136 is a diffraction element in which fine grooves are formed on a glass surface and which is manufactured so as to function as a diffraction grating. As shown in FIG. 37, the splitting element 136 is divided into three in a direction corresponding to the radial direction R of the optical disc 102 into a central portion region (a center region 136c and two end portion regions 136u and 136d) and two end portion regions 136r and 136l that sandwich the central portion region. In addition, the central portion region is divided into three in the tangential direction T into the center region 136c and the two upper and lower end portion regions 136u and 136d that sandwich the center region 136c. Accordingly, the splitting element 136 is divided into five as a whole. A light beam having been transmitted through each region is separated into different directions by a diffraction grating of each region.

In other words, the splitting element 136 is divided into three in a direction corresponding to the radial direction R of the optical disc 102 and includes the central portion region and the two end portion regions 136r and 136l, and the central portion region is divided into three in the tangential direction T of the optical disc and includes the center region 136c and the two end portion regions 136u and 136d that sandwich the center region 136c from above and below.

In accordance with the fact that the splitting element 136 is a five-way splitting element, the light detector 137 also has five light receiving sections 137r, 137d, 137c, 137u, and 137l, and the gain controller 138 also controls five types of amplifiers 138r, 138d, 138c, 138u, and 138l and imparts gains Kr, Kd, Kc, Ku, and Kl to the respective amplifiers 138r, 138d, 138c, 138u, and 138l. In addition, the adder 139 adds up the light intensity signals amplified by the optimal gains Kr, Kd, Kc, Ku, and Kl and outputs an information signal to the reproduced signal processing section 110.

As described above, the light detector 137 has the light receiving section 137c that receives a light beam of the center region 136c and the four light receiving sections 137r, 137d, 137u, and 137l that receive light beams of the four end portion regions 136r, 136d, 136u, and 136l, and outputs a light intensity signal in accordance with light intensity of each received light beam. The amplifier 138c receives a light intensity signal from the light receiving section 137c and outputs a central portion amplified signal having been amplified by the gain Kc, the amplifiers 138r and 138l receive light intensity signals from the light receiving sections 137r and 138l and output end portion amplified signals having been amplified by the gains Kr and Kl, and the amplifiers 138d and 138u receive light intensity signals from the light receiving sections 137d and 137u and output central end portion amplified signals having been amplified by the gains Kd and Ku.

The adder 139 adds up the amplified signals from the amplifiers 138r, 138d, 138c, 138u, and 138l and outputs an information signal. When the polarity of a tracking control signal is inverted, the gain controller 138 switches the gains Kr, Kd, Kc, Ku, and Kl of the amplifiers 138r, 138d, 138c, 138u, and 138l and, at the same time, sets the gain Kc of the amplifier 138c to be substantially lower than at least one of the gains Kr, Kd, Ku, and Kl of the amplifiers 138r, 138d, 138u, and 138l so that crosstalk from an adjacent track of the optical disc 102 decreases.

As described above, in the present embodiment, since correction of crosstalk is performed with a focus on a part where crosstalk from an adjacent track concentrates by dividing the splitting element 136 into five in the pattern shown in FIG. 37, the crosstalk from an adjacent track can be corrected in finer detail.

Therefore, in addition to producing a similar effect to the optical disc apparatus shown in FIG. 31, since crosstalk is suppressed in finer detail and an error rate is further reduced in an information signal output from the adder 139, the reproduced signal processing section 110 can reproduce a reproduced signal RF with higher precision.

Eighth Embodiment

Figure 38:
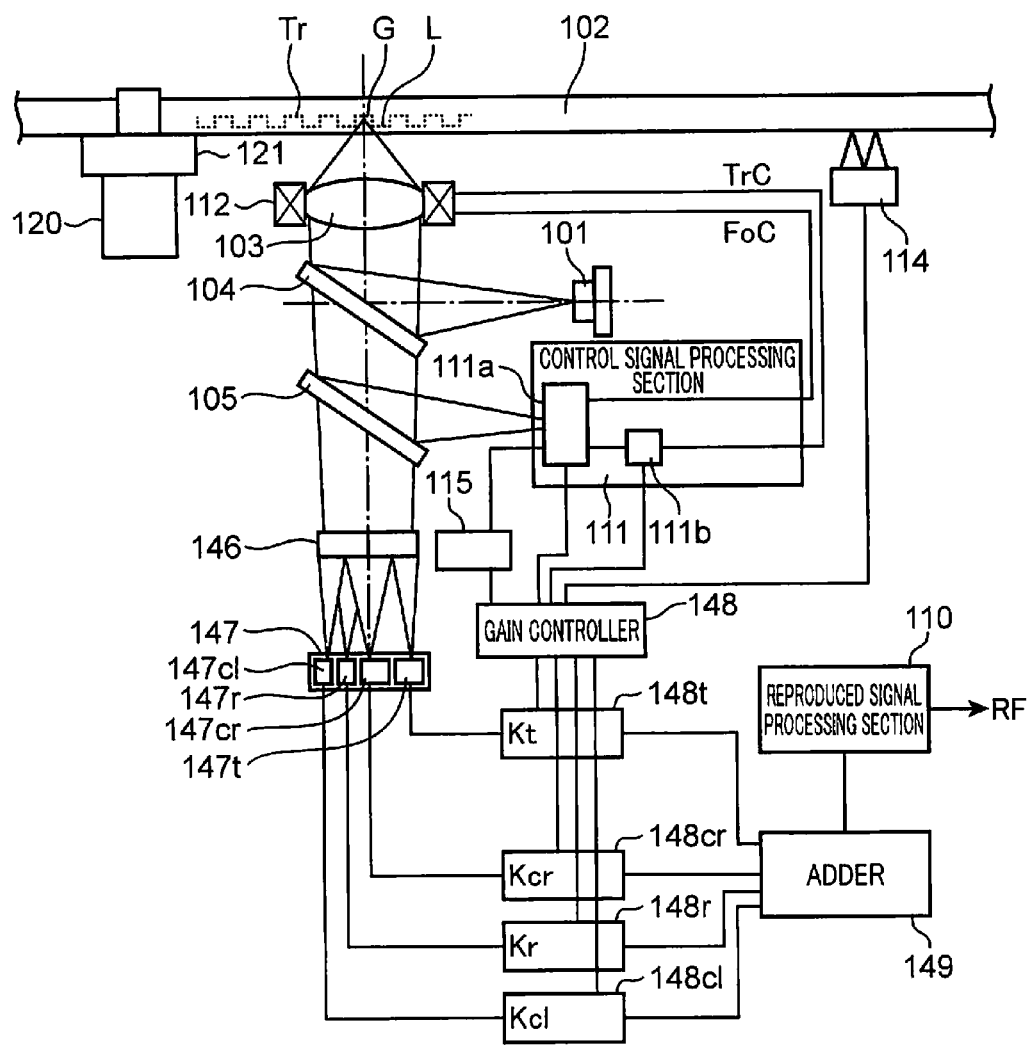
FIG. 38 is a schematic view showing a configuration of an optical disk apparatus according to an eighth embodiment of the present disclosure.
Figure 39:
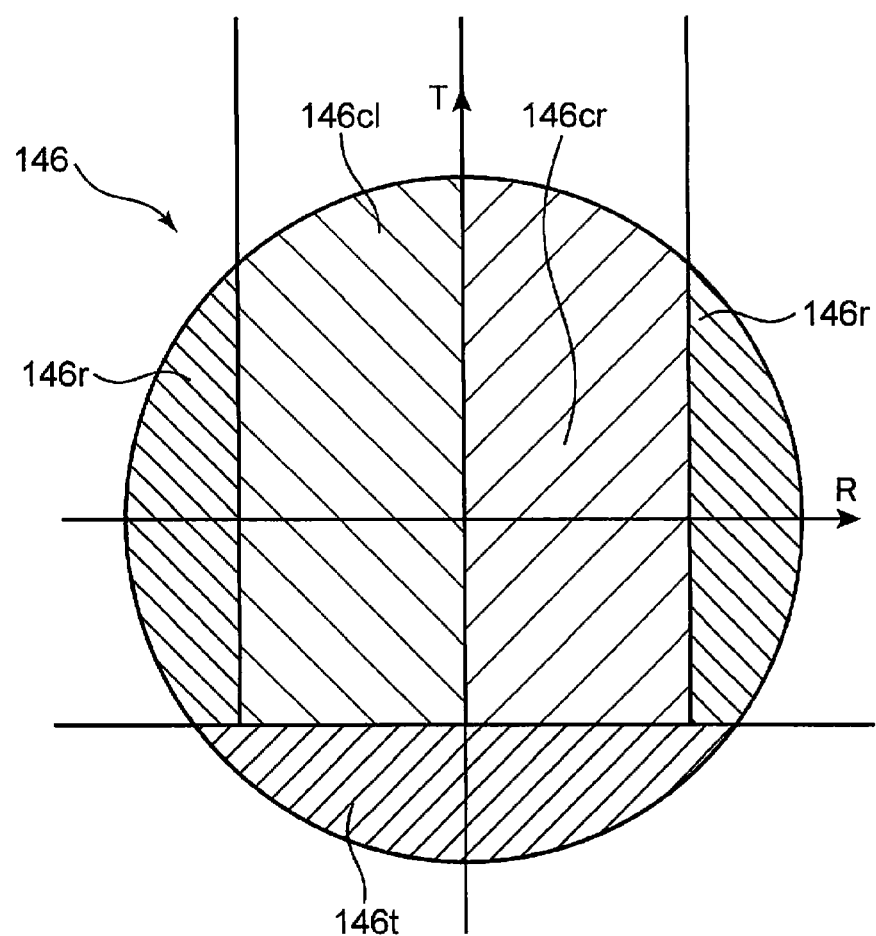
FIG. 39 is a schematic view showing a divided configuration of a splitting element of an optical disk apparatus according to the eighth embodiment of the present disclosure.

FIG. 38 is a schematic view showing a configuration of an optical disk apparatus according to an eighth embodiment of the present disclosure, and FIG. 39 is a schematic view showing a divided configuration of a splitting element of an optical disk apparatus according to the eighth embodiment of the present disclosure. In FIG. 38, the same components as FIG. 31 will be denoted by the same reference characters and a description thereof will be omitted.

FIG. 38 differs from FIG. 31 in that a splitting element 146, a light detector 147, a gain controller 148, amplifiers 148t, 148cr, 148cl, and 148r, and an adder 149 are used in place of the splitting element 106, the light detector 107, the gain controller 108, the amplifiers 108c, 108r, and 108l, and the adder 109, and that the number of light intensity signals that are independently output from the light detector 147 in order to obtain an information signal based on the light intensity signals from the light detector 147 has been changed.

The splitting element 146 is a diffraction element that is manufactured so as to function as a diffraction grating by forming fine grooves or the like on a surface made of glass, resin, or the like. As shown in FIG. 39, the splitting element 146 is divided into four in a direction corresponding to the radial direction R of the optical disc 102 (a direction perpendicular to an extending direction of a track) and a central portion region is divided in two into a divided central portion region 146cr and a divided central portion region 146cl.

While there appears to be two regions (the radial-direction end portion regions 146r) at both end portions so as to sandwich the central portion region (the divided central portion regions 146cr and 146cl) in the radial direction R, the radial-direction end portion regions 146r are a same diffraction region designed to guide diffracted light onto a same light receiving section. In addition, the tangential-direction end portion region 146t is provided only in one of the tangential directions T.

In other words, the splitting element 146 is divided into two in a direction corresponding to the tangential direction T of the optical disc 102 and includes a divided region and the tangential-direction end portion region 146t. The divided region is divided into four in a direction corresponding to the radial direction R of the optical disc 102 and a central portion region of the splitting element 146 includes the two divided central portion regions 146cr and 146cl that are positioned at a central portion of the divided region. The end portion region of the splitting element 146 includes the two radial-direction end portion regions 146r that sandwich the divided central portion regions 146cr and 146 and the tangential-direction end portion region 146t. A light beam having been transmitted through each region is diffracted in different directions by a diffraction grating of each region.

In addition, a circle shown in FIG. 39 represents an effective diameter of a light beam in an ideal state. Furthermore, while hatchings in the respective regions of the splitting element 146 only depict the inside of the effective diameter of a light beam, division lines of the respective regions are being extended beyond the circle representing the effective diameter of a light beam. Therefore, even when there is a change in the effective diameter, a lens shift, an assembly error of the apparatus, and the like, a light beam is diffracted. Moreover, while extensions of division lines have been omitted and are not shown in the respective embodiments described earlier, the division lines of the respective regions may be extended in a similar manner to FIG. 39. This also applies to other embodiments described later.

In the present embodiment, with respect to types of diffraction regions, the number of divisions of the splitting element 146 is four. Therefore, the light detector 147 also has the four light receiving sections (the divided central portion light receiving sections 147cr and 147cl and the end portion light receiving sections 147r and 147t) described above. The light detector 147 includes two divided central portion light receiving sections 147cr and 147cl which receive light beams having been transmitted through the two divided central portion regions 146cr and 146cl as central portion light receiving sections, and includes the end portion light receiving section 147r that receives a light beam having been transmitted through the two radial-direction end portion regions 146r and the end portion light receiving section 147t that receives a light beam having been transmitted through the tangential-direction end portion region 146t as end portion light receiving sections.

The gain controller 148 also includes four types of amplifiers 148t, 148cr, 148cl, and 148r and imparts gains Kt, Kcr, Kcl, and Kr to the respective amplifiers 148t, 148cr, 148cl, and 148r. In addition, the adder 149 adds up the light intensity signals amplified by the optimal gains Kt, Kcr, Kcl, and Kr and outputs an information signal to the reproduced signal processing section 110.

In this case, even with the splitting element 136 according to the seventh embodiment shown in FIG. 37, by providing a diffraction region in the tangential direction T, an effect of making quality of a reproduced signal more favorable can be produced. Furthermore, with the splitting element 146 according to the present embodiment, by dividing a central region with a division line that approximately passes a vicinity of an optical axis, an effect is produced in that a deterioration in performance with respect to stress in a case where, for example, the objective lens 103 moves in the radial direction R (a direction perpendicular to an extending direction of grooves of a track) in order to follow a groove-like track Tr of the optical disc 102 can be prevented and a margin can be secured.

Ninth Embodiment

In recent years, the increasing practical use of blue-violet semiconductor lasers has led to the practical application of the Blu-ray Disc (hereinafter, also referred to as BD) which is a high-density, large-capacity optical information recording medium (hereinafter, also referred to as an optical disc) with the same size as CDs (Compact Discs) and DVDs. A BD is an optical disc for recording or reproducing information on or from an information recording surface having an approximately 0.1 mm-thick light transmission layer, by using a blue-violet laser light source that emits a blue-violet light beam with a wavelength of approximately 400 nm and an objective lens with a numerical aperture (hereinafter, also referred to as an NA) of 0.85.

In addition, attempts are being made to further increase capacity of optical discs while maintaining a same size as a conventional optical disc by providing a plurality of recording layers, increasing recording density in a recording layer, or the like. Furthermore, optical pickups are being considered for recording or reproducing information on or from such optical discs.

Meanwhile, multilayering and improving recording density of an optical disc require that signals smaller than conventional signals be read with highest possible quality. For example, a light detector that detects reflected light from an optical disc in an optical pickup is required to detect a reproduced signal (RF signal) of the optical disc at a high signal-to-noise intensity ratio (S/N). In addition, it is also required that a stable control signal (servo signal) be obtained in order to perform focusing control on an information recording surface of an optical disc and perform tracking control on a recording track of the optical disc in a stable manner.

Figure 40:
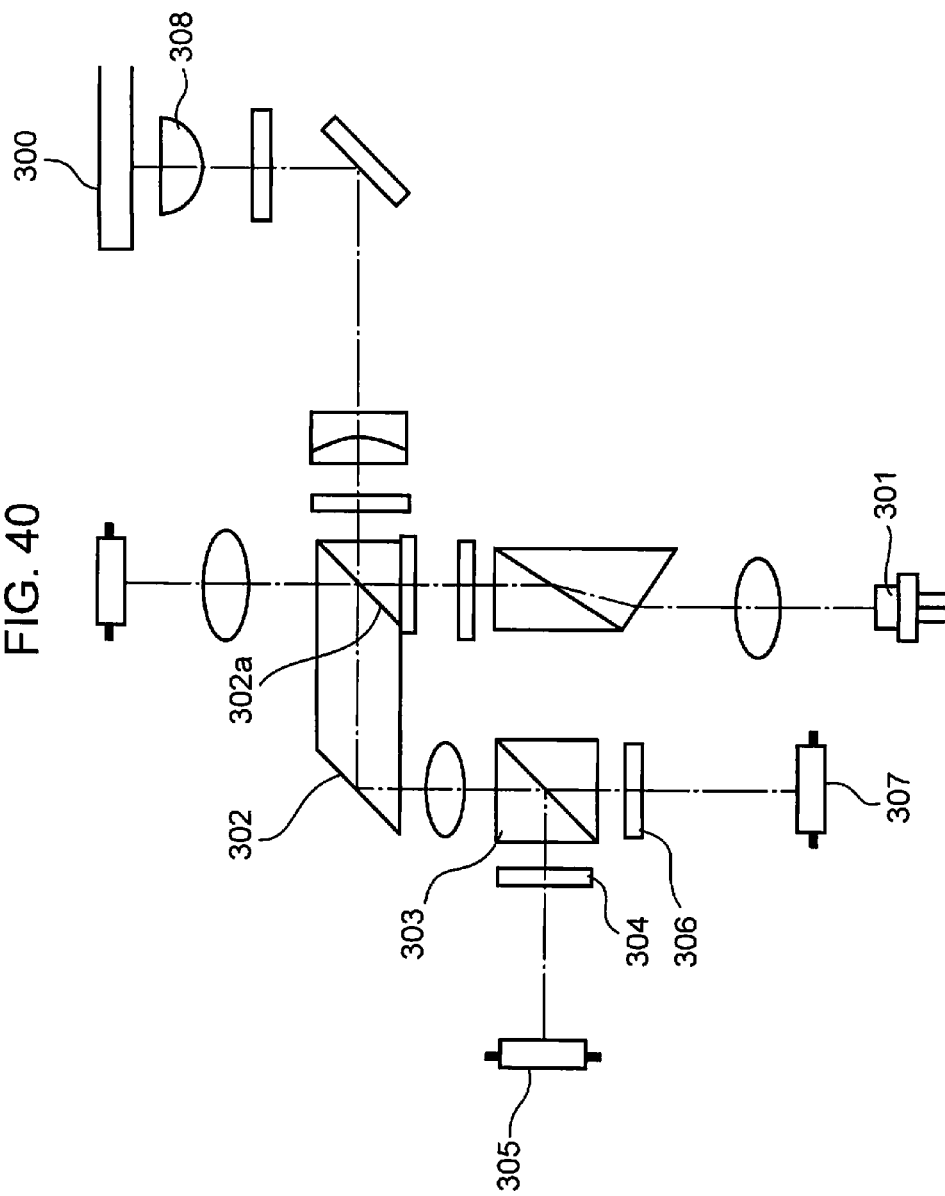
FIG. 40 is a schematic view showing a configuration of a conventional optical pickup.

For example, Japanese Unexamined Patent Publication No. 2002-190124 discloses a configuration in which reflected light from an optical disc is branched into a first optical path and a second optical path and an RF signal and a servo signal are separately generated using two light detectors arranged in the respective optical paths. A configuration of a conventional optical pickup disclosed in Japanese Unexamined Patent Publication No. 2002-190124 will now be described. FIG. 40 is a schematic view showing a configuration of a conventional optical pickup.

In FIG. 40, a light beam having exited a semiconductor laser 301 passes through several optical elements and is reflected by a polarizing beam splitter surface 302a of a polarizing beam splitter prism 302. Accordingly, a traveling direction of the light beam is converted by 90 degrees. The light beam reflected by the polarizing beam splitter surface 302a further passes through several optical elements and is converged on a signal recording surface of an optical disc 300 by an objective lens 308. As a result, a signal is recorded or reproduced.

In addition, the returning light beam having been reflected off of the optical disc 300 returns from the objective lens 308 to the polarizing beam splitter prism 302 but this time passes through the polarizing beam splitter surface 302a and is guided to a beam splitter prism 303. Subsequently, the reflected light is branched into a first optical path and a second optical path by the beam splitter prism 303. The reflected light branched into the first optical path passes through a first light diffraction element 304 and enters a first light detector 305. On the other hand, the reflected light branched into the second optical path passes through a second light diffraction element 306 and enters a second light detector 307 with a cylindrical lens.

In this case, the first light diffraction element 304 and the first light detector 305 detect an information signal (RF signal) reproduced from the optical disc 300 and, at the same time, detect a tracking error signal (a DPD signal) by a DPD method (a differential phase difference method that detects a phase difference of respective light receiving signals). On the other hand, the second light diffraction element 306 and the second light detector 307 detect a focusing error signal (an FE signal) by a spot size method and detect a tracking error signal (a TE signal) by a push-pull method.

As described above, with a configuration in which an optical path is branched on a return path (an optical path on which reflected light from an optical disc is guided to a light detector), an RF signal can be detected separately from a servo system signal and signal detection that is advantageous for reducing the influence of amplifier noise and the like due to a higher frequency can be performed. In addition, since an optical path is branched, light diffraction elements that differ from each other can be respectively provided on the branched optical paths. As a result, optical discs of different types can be accommodated by generating a tracking error signal by a push-pull method, generating a tracking error signal by a DPD method, and the like.

Figure 41:
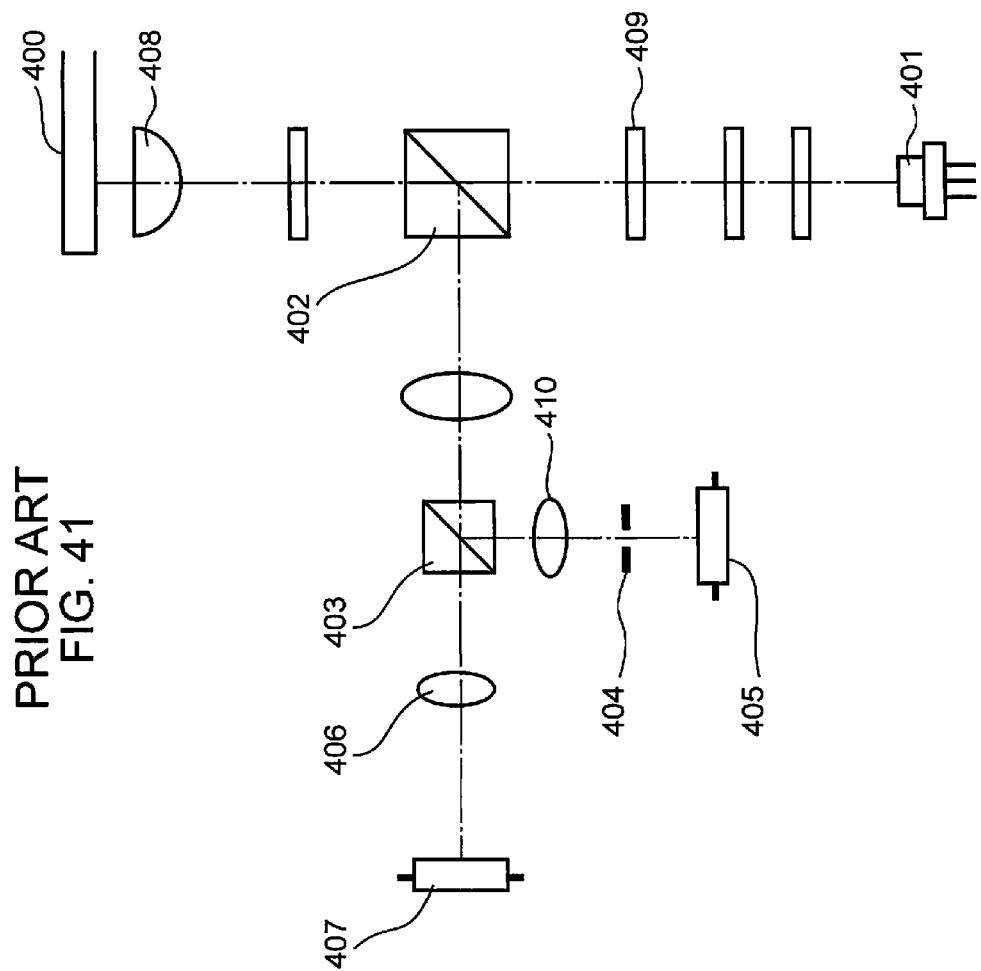
FIG. 41 is a schematic view showing a configuration of a conventional optical pickup.

Furthermore, Japanese Unexamined Patent Publication No. H9-054952 also discloses a configuration in which reflected light from an optical disc is branched into a first optical path and a second optical path and an RF signal and a servo signal are separately generated using two light detectors arranged in the respective optical paths. A configuration of a conventional optical pickup disclosed in Japanese Unexamined Patent Publication No. H9-054952 will now be described. FIG. 41 is a schematic view showing a configuration of a conventional optical pickup.

In FIG. 41, light exiting a semiconductor laser 401 passes through several optical elements and is split approximately into three into 0 order light and ±1 order light for generating a tracking signal. Moreover, while the tracking signal is generated by a 3-beam method or a differential push-pull method, details thereof will be omitted. The light split into three passes through the beam splitter 402, further passes through several optical elements, and is converged on a signal recording surface of an optical disc 400 by an objective lens 408. As a result, a signal is recorded or reproduced.

In addition, a returning light beam having been reflected off of an optical disc returns from the objective lens 408 to the beam splitter 402 and is reflected this time by a beam splitter surface. The light beam whose traveling direction has been converted by 90 degrees is guided to the half mirror 403. Subsequently, the reflected light is branched into a first optical path and a second optical path by the half mirror 403. The reflected light branched into the first optical path is enlarged by a concave lens 410, passes through a slit 404, and is guided to the first light detector 405. The reflected light branched into the second optical path passes through a detection lens 406 and enters a second light detector 407.

In this case, on the first optical path, ±1 order light among a luminous flux enlarged by the concave lens 410 is removed by the slit 404. The first light detector 405 receives 0 order light having passed through the slit 404 and generates an RF signal using the received 0 order light. On the second optical path, the second light detector 407 receives 0 order light and ±1 order light guided by a multi lens and generates a servo signal using the received 0 order light and ±1 order light.

As described above, since an RF signal and a servo signal are generated by different light detectors due to a configuration in which an optical path is branched on a return path, an RF signal and a servo signal can be obtained with high precision. Furthermore, in an RF signal system, since reflected light is enlarged by the concave lens 410, ±1 order light is removed by the slit 404, and only 0 order light is received, a high-precision signal that is more stable with respect to mechanical fluctuations can be obtained.

In addition, although a detailed description will be omitted, Japanese Unexamined Patent Publication No. S62-234256 also discloses an example in which an optical path is branched by a half mirror arranged on an return optical path to generate a reproduced signal and a servo signal with different light detectors.

What these documents have in common is that optical path branching elements are arranged on an optical return path to branch an optical path and that an object is to increase performance of an RF signal (reproduced signal) by separately generating the RF signal and a servo signal.

As described in the documents, by arranging an optical path branching element on an optical return path to branch an optical path and separately receiving an RF signal (reproduced signal) and a servo signal, performance of the RF signal can be improved.

However, a configuration which branches an optical path has a problem in that light intensity decreases as compared to a configuration which does not branch an optical path. In particular, when recording or reproducing information on or from a multilayer optical disc of a BD, since light is caused by the multilayer optical disc of the BD to reach a deeper layer, reflectance of each layer must be lowered. Therefore, a reflected light amount from each recording layer also deceases. As shown in the documents described above, when an optical path is branched on a return path, there is a problem that low reflected light intensity from the multilayer optical disc further decreases, S/N of an RF signal declines, and reproduction quality deteriorates. In addition, the documents described above do not take recording or reproducing information on or from a multilayer optical disc into consideration. Therefore, there is also a problem in that reproduction quality deteriorates due to so-called multilayer stray light that is unnecessary reflected light from a recording layer other than a recording layer on which focusing control is being performed in order to record or reproduce information on or from a multilayer optical disc.

Meanwhile, in order to improve recording density per layer, a method involving increasing track density in a radial direction or a method involving increasing density of a recording pattern itself in a tangential direction of a track is effective. In particular, since signals with a smaller amount of energy must be reproduced when improving recording density in a tangential direction of a track, branching an optical path on a return path and reducing light intensity that reaches a light detector for an RF signal as in the case of the documents described above creates a problem in that S/N of the RF signal declines and causes reproduction quality to deteriorate. Furthermore, the documents described above present another problem in that, when reproducing information from an optical disc with increased track density in a radial direction, reproduction quality deteriorates due to leakage of a reproduced signal to a track being scanned from an adjacent track.

As described above, with conventional configurations, there is a problem in that information cannot be stably recorded or reproduced on or from an optical disc with a larger capacity than conventional optical discs such as a multilayer optical disc and an optical disc with increased recording density in a recording layer.

The following embodiments has been devised in order to solve the problems described above and an object thereof is to provide an optical information apparatus and an information processing apparatus capable of stably recording or reproducing information on or from a recording medium having been multilayered and having attained a narrow track pitch.

Figure 42:
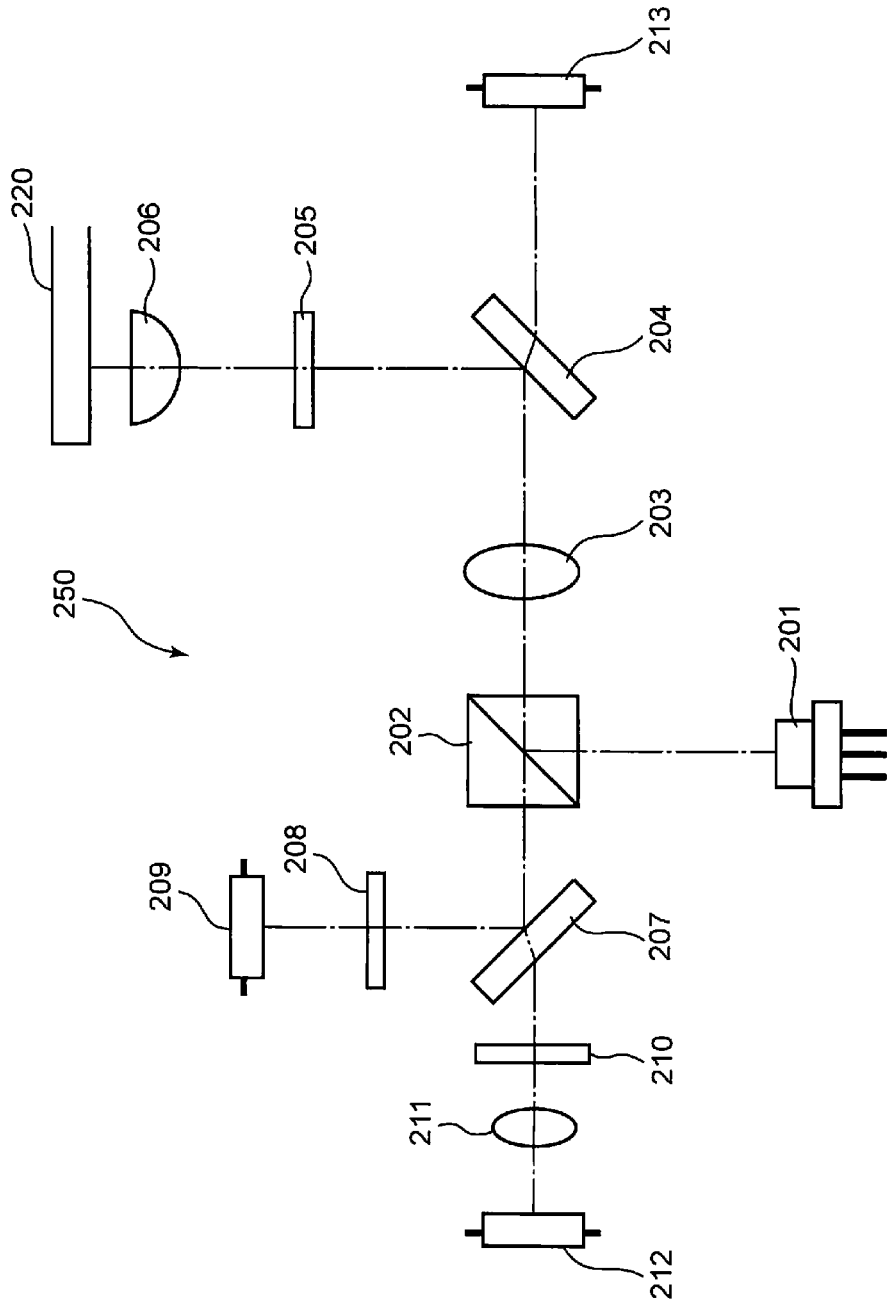
FIG. 42 is a schematic view showing a configuration of an optical pickup according to a ninth embodiment of the present disclosure.

FIG. 42 is a schematic view showing a configuration of an optical pickup according to a ninth embodiment of the present disclosure.

An example of reproducing information from a multilayer BD will be described with reference to FIG. 42. In FIG. 42, an optical pickup 50 includes a light source 201 that emits a light beam, a prism beam splitter 202, a collimating lens 203, a rising mirror 204, a quarter wavelength plate 205, an objective lens 206, a light branching element 207, a first diffraction element 208, a first light detector 209, a second diffraction element 210, a detection lens 211, a second light detector 212, and a front monitor 213. An actuator for driving the objective lens 206 or the collimating lens 203, holders for holding the various optical parts, an optical base, and the like are omitted from the drawing for the sake of simplicity.

A light beam constituted by an approximately straight polarized light with a wavelength of 390 to 420 nm (representatively 405 nm) emitted from the light source 201 is incident on the prism beam splitter 202 and reflected by a beam splitter surface. The reflected light beam is converted into approximately parallel light by the collimating lens 203 and reflected by the rising mirror 204. The reflected light beam travels along an optical axis that is approximately perpendicular to an optical disc (BD) 220, converted from the straight polarized light into approximately circular polarized light by the quarter wavelength plate 205, and caused to converge on an information recording surface of the optical disc (BD) 220 as a light spot by the objective lens 206 via a protective substrate (not shown).

The light beam reflected by the information recording surface of the optical disc 220 is once again transmitted through the objective lens 206, converted by the quarter wavelength plate 205 into straight polarized light that differs from that on the forward path, and is reflected by the rising mirror 204. The reflected light beam is converted into convergent light by the collimating lens 203 and is incident on the prism beam splitter 202. The light beam transmitted through the prism beam splitter 202 is guided by the light branching element 207.

The light beam is branched by the light branching element 207 into a first optical path along which a light beam reflected by the light branching element 207 travels and a second optical path along which a light beam transmitted through the light branching element 207 travels. The light beam reflected off of the light branching element 207 is split by the first diffraction element 208. The split light beam is received by the first light detector 209. The first light detector 209 detects and outputs an RF signal that is an information signal of the optical disc 220.

Meanwhile, the light beam transmitted through the light branching element 207 is split into 0 order diffracted light and 1 order diffracted light by the second diffraction element 210. The split light beam is imparted with astigmatism by the detection lens 211 and received by the second light detector 212. The second light detector 212 detects and outputs a servo signal for performing focusing control or tracking control on the optical disc 220.

The second light detector 212 receives laser light reflected by an information recording surface of the optical disc 220 and outputs a servo signal. The light branching element 207 branches the laser light reflected by an information recording surface of the optical disc 220 into a first optical path on which the first light detector 209 is arranged and a second optical path on which the second light detector 212 is arranged. Light intensity of the laser light branched by the light branching element 207 and incident on the first optical path is greater than light intensity of the laser light branched by the light branching element 207 and incident on the second optical path. The second diffraction element 210 is arranged in the second optical path and splits the laser light reflected by an information recording surface of the optical disc 220 into a plurality of luminous fluxes. The second light detector 212 receives the plurality of luminous fluxes split by the second diffraction element 210 and outputs a servo signal.

The second diffraction element 210, the detection lens 211, and the second light detector 212 which generate servo signals will now be described in detail with reference to FIGS. 43 and 44.

Figure 43:
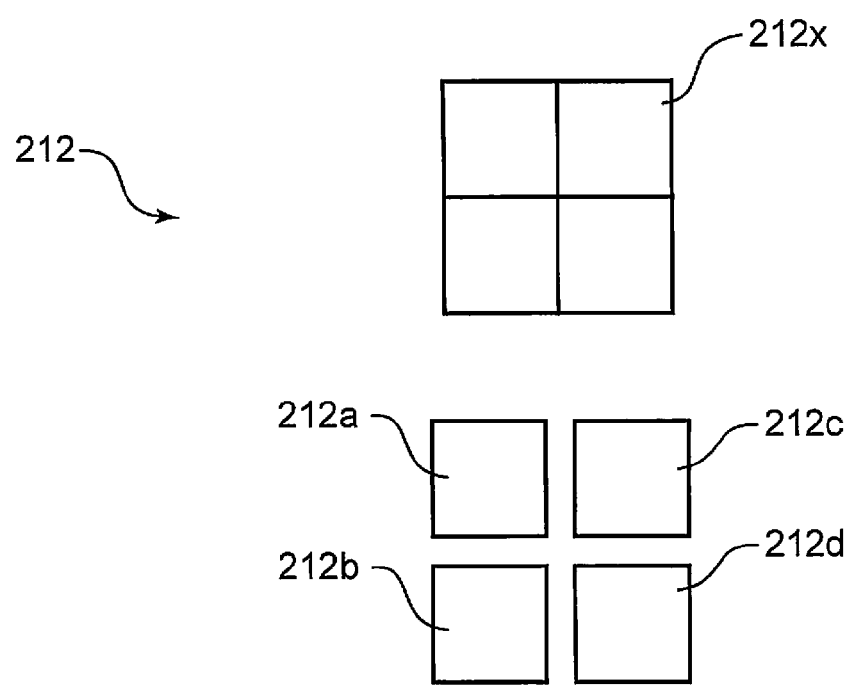
FIG. 43 is a schematic view showing an example of an arrangement pattern of light receiving regions of a second light detector according to the ninth embodiment of the present disclosure.

FIG. 43 is a schematic view showing an example of an arrangement pattern of light receiving regions of the second light detector 212 according to the ninth embodiment of the present disclosure. The second light detector 212 includes five types of light receiving regions 212a to 212d and 212x. For the light receiving region 212x, four divisions make up a set. A focusing error signal for recording or reproducing information on or from the optical disc 220 is detected by a so-called astigmatic method in which a condensed light spot imparted with astigmatism by the detection lens 211 is detected by the four way-divided light receiving region 212x inside the second light detector 212. In addition, while a method of generating an RF signal from a total sum of signals detected by the light receiving region 212x is generally used by a conventional optical pickup, the optical pickup according to the present embodiment is configured not to use this method.

Meanwhile, the tracking error signal is detected by receiving the 0 order diffracted light and the 1 order diffracted light generated when a light beam is transmitted through the second diffraction element 210 by a prescribed light receiving region of the second light detector 212. In the present embodiment, a fluctuation of a tracking error signal created when there is a variation in positions, widths, or depth of grooves of information tracks formed on the optical disc 220 and a fluctuation of a tracking error signal created when information is recorded on an information track and causes a change in reflectance can be suppressed. In addition, with the present embodiment, in the multilayered optical disc 220 having a plurality of information recording surfaces, unnecessary light (multilayer stray light) reflected by an information recording surface that differs from an information recording surface that is a recording or reproducing object can be prevented from entering a light receiving region that detects a tracking error signal.

Figure 44:
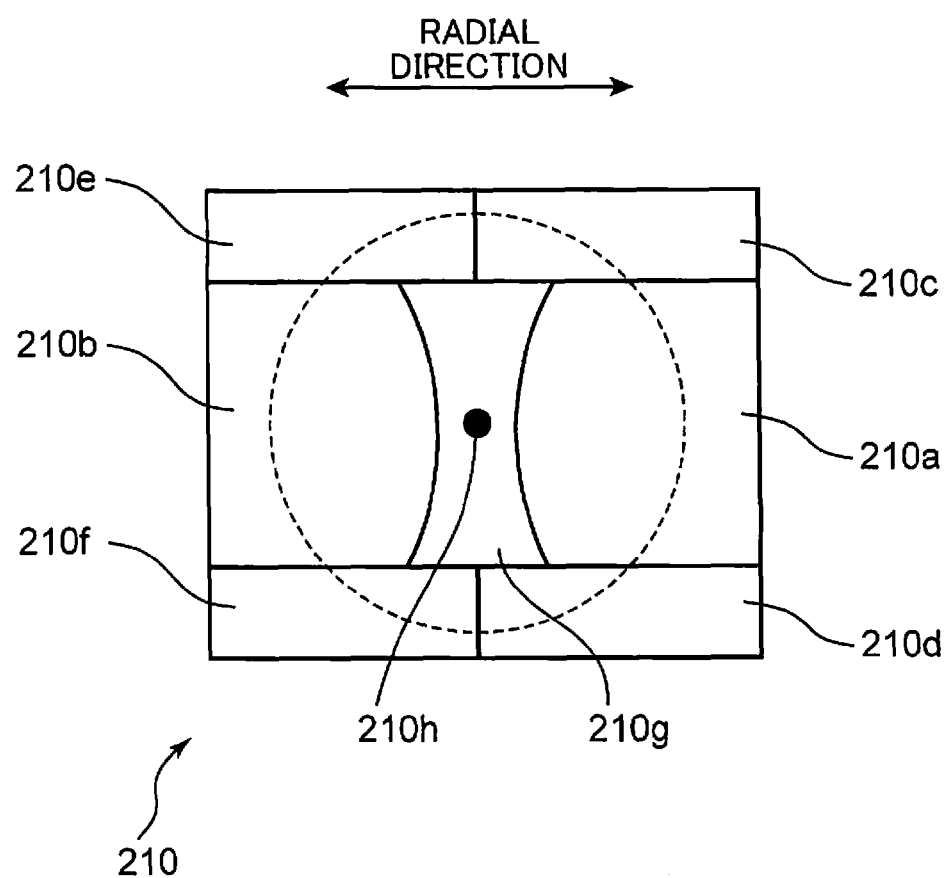
FIG. 44 is a schematic view showing an example of a luminous flux splitting pattern of a second diffraction element according to the ninth embodiment of the present disclosure.

FIG. 44 is a schematic view showing an example of a luminous flux splitting pattern of the second diffraction element 210 according to the ninth embodiment of the present disclosure. A dashed line in FIG. 44 represents a luminous flux diameter on the second diffraction element 210 of a light beam reflected by an information recording surface of the optical disc 220. The second diffraction element 210 has eight types of regions 210a to 210h and splits laser light incident on each region into 0 order diffracted light and ±1 order diffracted light. The split 0 order diffracted light and ±1 order diffracted light are received by the second light detector 212. The 0 order diffracted light of each of the regions 210a to 210f is guided to the light receiving region 212x to generate the focusing error signal described earlier. The +1 order diffracted light having been diffracted by the region 210a is guided to the light receiving region 212a, the +1 order diffracted light having been diffracted by the region 210b is guided to the light receiving region 212b, the +1 order diffracted light having been diffracted by the region 210c and the region 210d is guided to the light receiving region 212c, and the +1 order diffracted light having been diffracted by the region 210e and the region 210f is guided to the light receiving region 212d. The −1 order diffracted light of the respective regions 210a to 210f is not guided to any of the light receiving regions inside the second light detector 212. If outputs in accordance with received light intensity from the light receiving regions 212a to 212d are denoted by $I_A$ to $I_D$, then a tracking error signal TE may be calculated according to the equation below.

$$TE=(I_A-I_B)-k(I_C-I_D),$$

where, k denotes an arbitrary constant.

The region 210h is a removal region for removing so-called multilayer stray light that is unnecessary reflected light from an information recording surface other than an information recording surface on which focusing control is being performed when recording or reproducing information on or from a multilayer optical disc. The removal region is described in detail by the present inventors in Japanese Patent No. 4909449 (Specification) and Japanese Patent No. 5002465 (Specification). In order to effectively remove multilayer stray light, the region 210h that is a removal region must be arranged in a vicinity of a center of a light beam reflected by an information recording surface of the optical disc 220 on the second diffraction element 210. By adjusting relative positions of the second diffraction element 210 and the second light detector 212 so as to guide a light beam passing through the respective regions 210a to 210f to the light receiving regions 212a to 212d and, at the same time, adjusting an optical axis of the 0 order diffracted light of the light beam to coincide with a center of the four way-divided light receiving region 212x, the region 210h that is a removal region is necessarily arranged in a vicinity of the center of the light beam.

Moreover, detection of a focusing error signal and a tracking error signal is not limited to the detection methods described above. Although details will be omitted, for example, a so-called 3-beam method using a main beam and a sub beam generated by a diffraction grating arranged near a light beam exiting side of the light source 201, a differential push-pull method (DPP method), or the like may be used.

In addition, an arrangement pattern of light receiving regions of the second light detector 212 need not necessarily be the arrangement shown in FIG. 43 as long as the second light detector 212 includes the region 212x and the regions 212a to 212d.

Figure 45:
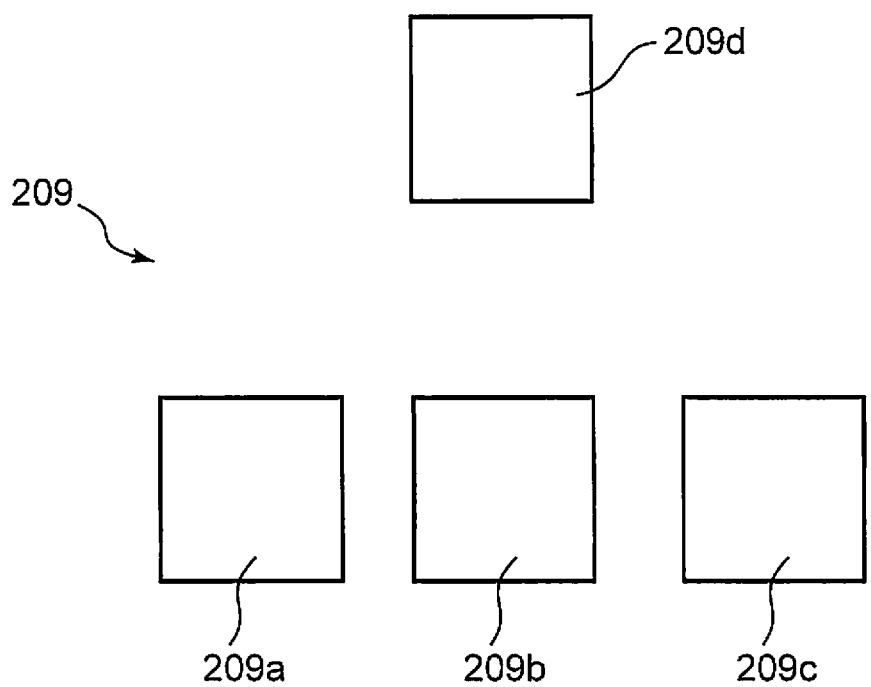
FIG. 45 is a schematic view showing an example of an arrangement pattern of light receiving regions of a first light detector according to the ninth embodiment of the present disclosure.
Figure 46:
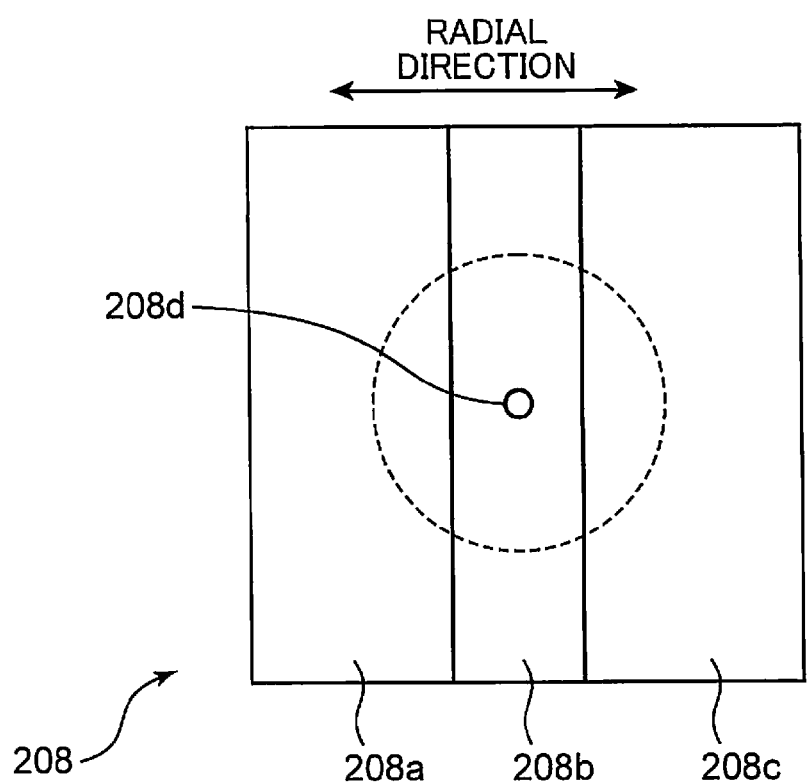
FIG. 46 is a schematic view showing an example of a luminous flux splitting pattern of a first diffraction element according to the ninth embodiment of the present disclosure.

Next, the first diffraction element 208 and the first light detector 209 which generate RF signals will now be described in detail with reference to FIGS. 45 and 46. FIG. 45 is a schematic view showing an example of an arrangement pattern of light receiving regions of the first light detector 209 according to the ninth embodiment of the present disclosure. The first light detector 209 includes four independent light receiving regions 209a to 209d. FIG. 46 is a schematic view showing an example of a luminous flux splitting pattern of the first diffraction element 208 according to the ninth embodiment of the present disclosure. A dashed line in FIG. 46 represents a luminous flux diameter on the first diffraction element 208 of a light beam reflected by an information recording surface of the optical disc 220.

The first diffraction element 208 includes four types of regions 208a to 208d. The first diffraction element 208 is divided into three in a radial direction of the optical disc 220 and includes a region 208b including an optical axis of laser light, regions 208a and 208c that sandwich the region 208b, and a region 208d provided inside the region 208b. A distance between the region 208d and the region 208a is approximately equal to a distance between the region 208d and the region 208c, and the region 208d is arranged approximately at center of the first diffraction element 208.

A light beam incident on each region is split into 0 order diffracted light and ±1 order diffracted light and guided to the first light detector 209. The +1 order diffracted light having been diffracted by the region 208a is guided to the light receiving region 209a, the +1 order diffracted light having been diffracted by the region 208b is guided to the light receiving region 209b, the +1 order diffracted light having been diffracted by the region 208c is guided to the light receiving region 209c, and the +1 order diffracted light having been diffracted by the region 208d is guided to the light receiving region 209d. The 0 order diffracted light and the −1 order diffracted light of reach region is not guided to any of the light receiving regions. If outputs in accordance with received light intensity from the light receiving regions 209a to 209c are denoted by $J_A$ to $J_C$, then an RF signal may be calculated according to the equation below.

$$RF=\alpha J_A+\beta J_B+\gamma J_C,$$

where RF denotes an RF signal and $\alpha$, $\beta$ and $\gamma$ denote arbitrary constants.

As described above, by individually receiving a light beam including an RF signal having been split into three in a radial direction of the optical disc 220 and calculating the RF signal as described above, leakage (crosstalk) of the RF signal from an information track adjacent to an information track being scanned for reproduction can be reduced. In other words, when a light beam including an RF signal is split into three in the radial direction of the optical disc 220, since mixing ratios of a crosstalk component in the respective light receiving regions differ from each other, crosstalk can be reduced by computing weighted signals of the respective light receiving regions. This is an application of, for example, a configuration example proposed by the present inventors in Japanese Unexamined Patent Publication No. H5-242512. The reduction of a crosstalk signal enables track density in the radial direction of the optical disc 220 to be further increased and the capacity of the optical disc to be expanded. Moreover, although a detailed description will be omitted, reproduction quality can be further improved by performing a so-called waveform equalization process in which an RF signal is calculated while changing weighting coefficients of the output $J_A$, the output $J_B$, and the output $J_C$ for each frequency component and providing feedback to the weighting coefficients so that calculation results of the RF signal are optimized.

In this case, although the +1 order diffracted light having been diffracted by the region 208d shown in FIG. 46 is guided to the light receiving region 209d, the region 208d is not used when calculating an RF signal. While the region 208d has an effect of reducing multilayer stray light in a similar manner to the removal region (the region 210h) in FIG. 44 described earlier, the region 208d must be arranged in a vicinity of center of a light beam as described earlier. Hereinafter, a method of adjusting a position of the region 208d will be described.

First, as far as a relative positional relationship between a light beam and the first light detector 209 is concerned, by intentionally changing a position of the first light detector 209 with respect to the light beam, whether all light beams are incident on the respective light receiving regions or whether a light beam protrudes outside of each light receiving region can be determined based on a change in output in accordance with received light intensity at each light receiving region. Therefore, by recognizing coordinates of a position where a light beam has protruded outside a light receiving region and displacing a position of the first light detector 209 to a center of the light beam, the position of the first light detector 209 can be adjusted with high precision with respect to the light beam.

Next, a method of arranging the region 208d that is a removal region of the first diffraction element 208 in a vicinity of center of a light beam will be described. FIGS. 47 to 50 are schematic views showing a position of a light beam on the first diffraction element 208 in a case where a position of the first diffraction element 208 is displaced after fixing the position of the light beam and the position of the first light detector 209.

Figure 47:
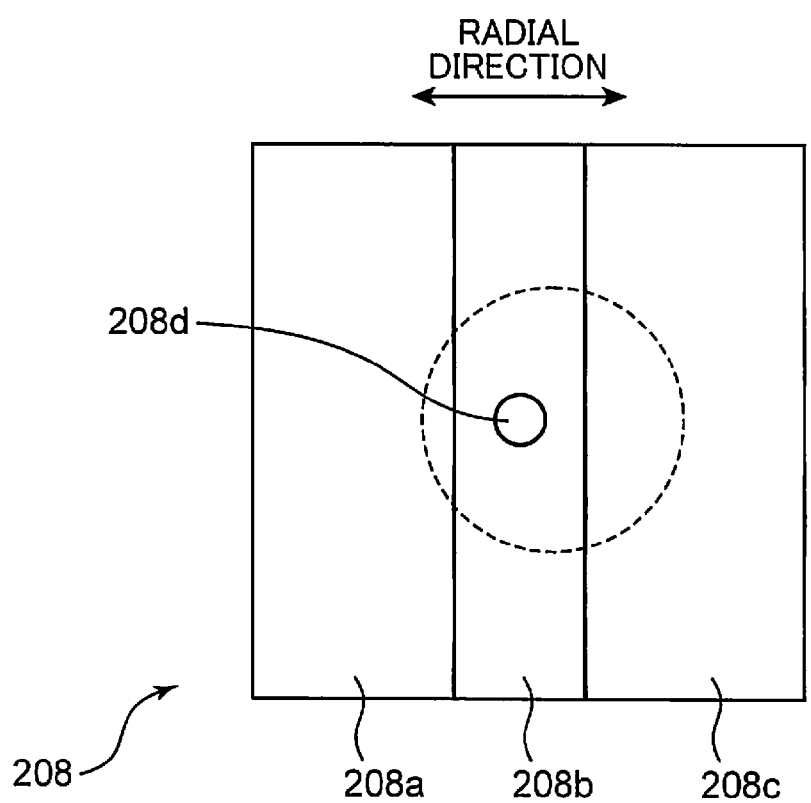
FIG. 47 is a schematic view showing a position of a light beam on a first diffraction element in a case where the first diffraction element is displaced leftward in a radial direction of an optical disc.
Figure 48:
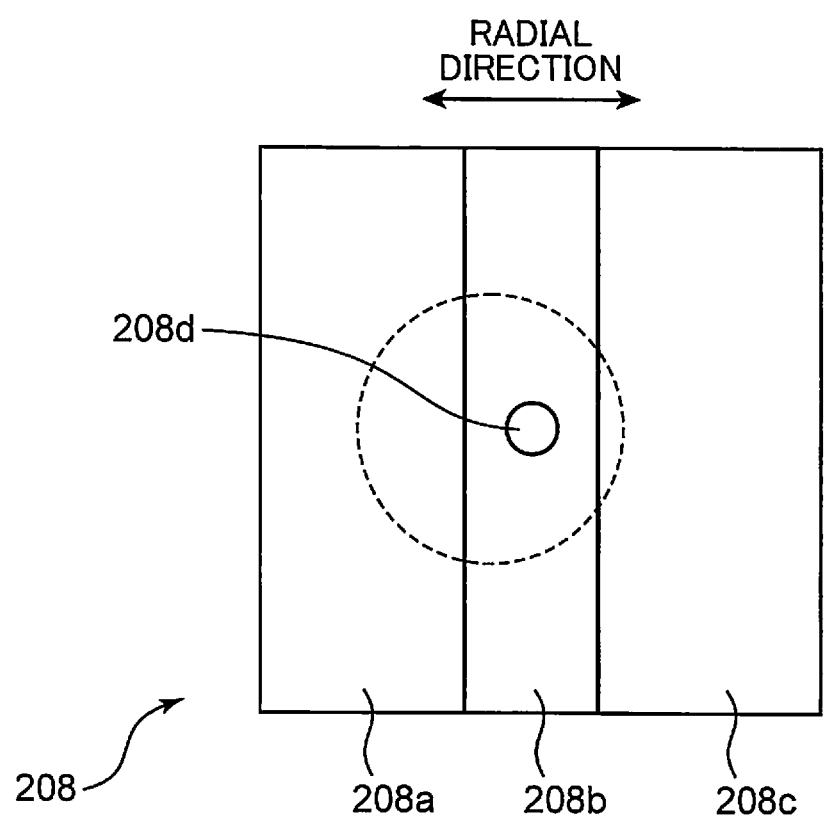
FIG. 48 is a schematic view showing a position of a light beam on a first diffraction element in a case where the first diffraction element is displaced rightward in a radial direction of an optical disc.
Figure 49:
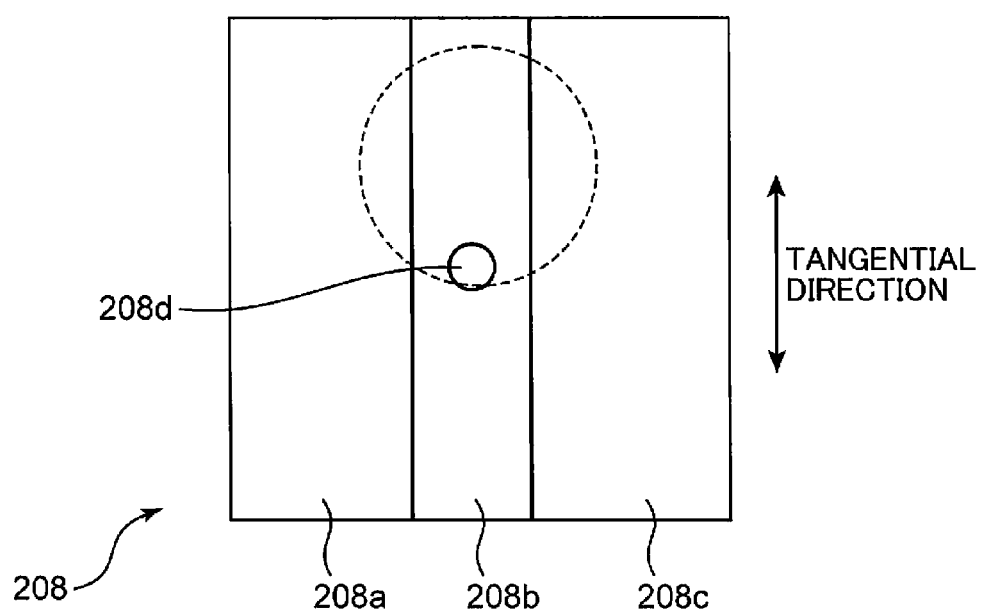
FIG. 49 is a schematic view showing a position of a light beam on a first diffraction element in a case where the first diffraction element is displaced downward in a tangential direction of an information track of an optical disc.
Figure 50:
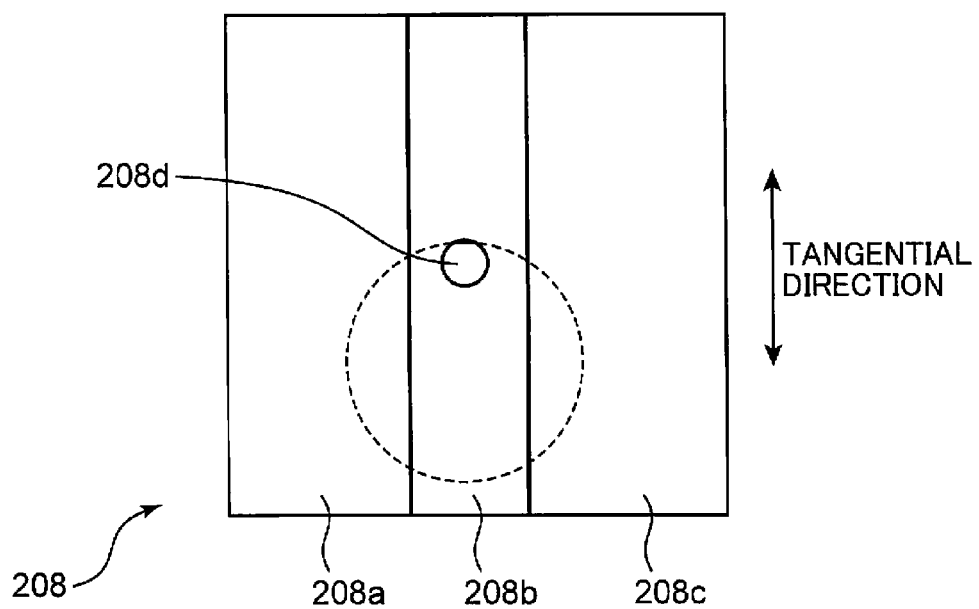
FIG. 50 is a schematic view showing a position of a light beam on a first diffraction element in a case where the first diffraction element is displaced upward in a tangential direction of an information track of an optical disc.

FIG. 47 is a schematic view showing a position of a light beam on the first diffraction element 208 in a case where the first diffraction element 208 is displaced leftward in a radial direction of the optical disc 220, FIG. 48 is a schematic view showing a position of a light beam on the first diffraction element 208 in a case where the first diffraction element 208 is displaced rightward in the radial direction of the optical disc 220, FIG. 49 is a schematic view showing a position of a light beam on the first diffraction element 208 in a case where the first diffraction element 208 is displaced downward in a tangential direction of an information track of the optical disc 220, and FIG. 50 is a schematic view showing a position of a light beam on the first diffraction element 208 in a case where the first diffraction element 208 is displaced upward in the tangential direction of an information track of the optical disc 220.

First, as shown in FIGS. 47 and 48, when the first diffraction element 208 is displaced in the radial direction of the optical disc 220 (in the drawing, left and right directions of a paper surface), since areas of light beams split by the region 208a and the region 208c change, a signal amount output from the light receiving region 209a and the light receiving region 209c also change. Therefore, the first diffraction element 208 is displaced in the radial direction of the optical disc 220 so that a signal amount output from the light receiving region 209a and a signal amount output from the light receiving region 209c become equal to each other. Accordingly, the position of the region 208d that is a removal region of the first diffraction element 208 can be arranged in a vicinity of center of a light beam in the radial direction of the optical disc 220.

Next, as shown in FIGS. 49 and 50, when the first diffraction element 208 is displaced in the tangential direction of an information track of the optical disc 220 (in the drawing, up and down directions of the paper surface), a signal amount output from the light receiving region 209d decreases when a state is created where a light beam is no longer irradiated on the region 208d. Therefore, the first diffraction element 208 is intentionally displaced upward and downward along the tangential direction of an information track of the optical disc, an upper limit position and a lower limit position where a signal amount output from the light receiving region 209d decreases are detected, and the first diffraction element 208 is arranged at a center of the upper limit position and the lower limit position. Accordingly, the position of the region 208d that is a removal region of the first diffraction element 208 can be arranged in a vicinity of center of a light beam in the tangential direction of an information track of the optical disc 220.

Due to the configuration described above, a removal region of the first diffraction element 208 can be arranged in a vicinity of the center of a light beam.

Moreover, an arrangement pattern of light receiving regions of the first light detector 209 need not necessarily be the arrangement pattern shown in FIG. 45 as long as the light receiving regions 209a to 209d are provided. Although a detailed description will not be provided, particularly, when a multilayer optical disc is used as the optical disc 220, there is a possibility that a light beam that cannot be removed by the region 208d among unnecessary reflected light (multilayer stray light) from a recording layer other than a recording layer on which focusing control is being performed may reach the first light detector 209. Therefore, an arrangement pattern that prevents such stray light is effective.

Moreover, the first light detector 209 and the second light detector 212 are desirably constituted by a light receiving region that performs photoelectric conversion and a plurality of amplifiers that amplify a photoelectrically-converted electric signal. By adopting such a configuration, noise or loss of a signal can be reduced and reproduction performance of the optical pickup 250 can be improved. In the configuration according to the present embodiment, the second light detector 212 for detecting a servo signal and the first light detector 209 for detecting an RF signal are separately provided, the first light detector 209 only has four light receiving regions, and an RF signal is generated using signals from only three light receiving regions. Therefore, compared to a configuration in which an RF signal and a servo signal are generated by a same light detector, the configuration according to the present embodiment is capable of reducing the number of amplifiers and reducing amplifier noise to improve S/N of an RF signal.

In this case, the light branching element 207 causes light intensity of a light beam branching into the first light detector 209 to be greater than light intensity of a light beam branching into the second light detector 212. For example, in the configuration example of the optical pickup 250 shown in FIG. 42, if R denotes reflectance of the light branching element 207 and T denotes transmittance of the light branching element 207, a relationship of R>T is satisfied. In other words, among reflected light from the optical disc 220, if light intensity of reflected light received by the first light detector 209 is denoted by E1 and light intensity of reflected light received by the second light detector 212 is denoted by E2, then a relationship of E1>E2 is satisfied.

By adopting such a configuration, the light intensity of a light beam reaching the first light detector 209 that detects an RF signal can be increased and high S/N can be secured with respect to the RF signal. In addition, since an amplification factor of an amplifier of the first light detector 209 need not be forcibly raised, a cutoff frequency (a frequency at which gain drops by 3 dB) can be set high and reproduction quality of RF signals including higher frequency components can also be improved. On the other hand, light intensity of reflected light reaching the second light detector 212 that detects a servo signal decreases. However, since a servo signal does not require as high a cutoff frequency as an RF signal, the amplification factor of an amplifier can be raised and sufficient output of the servo signal can be secured even in a state where light intensity of the reflected light is low. Therefore, stable servo control can be performed.

In the configuration according to the present embodiment, desirably, reflectance R of the light branching element 207 is approximately 80% and transmittance T of the light branching element 207 is approximately 20%. S/N of an RF signal is improved as the reflectance R increases. However, when the transmittance T is excessively low, the amplification factor of an amplifier of the second light detector 212 that detects a servo signal becomes excessively high. As a result, offset components such as a dark current and a temperature drift are also amplified and servo control becomes unstable. Therefore, if the transmittance T of the light branching element 207 is at least approximately 20%, the amplification factor of an amplifier of the second light detector 212 need not be set excessively high and offset components can be sufficiently ignored. Therefore, stable servo control can be performed.

Moreover, a configuration may be adopted so that a condensed light spot of a light beam is formed on each light receiving region of the first light detector 209. By adopting such a configuration, an area of a light receiving region can be reduced as compared to a conventional case where a minimum circle of confusion imparted with astigmatism is received by a light receiving region to generate an RF signal. Therefore, in order to improve a rate at which information is recorded or reproduced, a cutoff frequency can be increased and signal noise can be reduced. Meanwhile, an area of each light receiving region is desirably larger than a condensed light spot. According to such a configuration, robustness with respect to displacement of positions due to a mechanical positional error, a change in environmental temperature, or the like can be enhanced.

Moreover, while an RF signal is generated using only +1 order diffracted light of the first diffraction element 208 in the present embodiment, in order to further improve light utilization efficiency, a diffraction structure of the first diffraction element 208 may be blazed to improve diffraction efficiency of the +1 order diffracted light. Alternatively, in order to improve light utilization efficiency, a light receiving region to which −1 order diffracted light from the regions 208a to 208c of the first diffraction element 208 is guided may be independently provided in the first light detector 209 separately from a light receiving region to which +1 order diffracted light from the regions 208a to 208c of the first diffraction element 208 is guided, and a signal from the light receiving region that receives the −1 order diffracted light may be used in a computation for generating an RF signal. Alternatively, selective blazing may be performed for each region of the first diffraction element 208. For example, the first light detector 209 may individually include a light receiving region that receives +1 order diffracted light from the central region 208b of the first diffraction element 208, a light receiving region that receives −1 order diffracted light from the region 208b, a light receiving region that receives +1 order light from the blazed region 208a, and a light receiving region that receives +1 order light from the blazed region 208c. In this case, light utilization efficiency can be improved.

To summarize the configurations described above, by optimizing characteristics of the light branching element 207, even in a case where a signal detected by a light detector for generating an RF signal becomes smaller due to multilayering of the optical disc 220 or increasing recording density in a tangential direction of an information track of the optical disc 220, S/N of the RF signal can be increased and reproduction performance can be improved. The light detector for generating a servo signal can perform stable servo control by increasing an amplification factor of a detected signal.

In addition, by arranging an RF signal detection system such that a removal region on a diffraction element is arranged in a vicinity of center of a light beam, multilayer stray light that is created due to multilayering of the optical disc 220 can be effectively removed and reproduction performance of a multilayered optical disc can be improved. Furthermore, since a removal region is also provided on a diffraction element in a servo signal detection system, stable servo control can be performed.

Moreover, with the present embodiment, since leakage of an RF signal (a crosstalk signal) from an information track adjacent to an information track being scanned for reproduction can be reduced, reproduction performance of the optical disc 220 having increased track density in the radial direction can be improved.

As described above, even when multilayering, improvement of recording density in the tangential direction of an information track, and improvement of track density in the radial direction are performed on the optical disc 220, the optical pickup 250 according to the present embodiment can obtain high reproduction quality and realize stable servo control. Therefore, a remarkable increase in capacity of the optical disc 220 can be achieved.

Moreover, while the rising mirror 204 is shown bending a light beam in a 90° direction within a paper surface in FIG. 42 for the sake of simplicity, the rising mirror 204 may bend a light beam by 90° in a direction perpendicular to the paper surface. In this case, the optical pickup 250 can be made thinner.

In addition, an objective lens actuator (not shown) supports an objective lens holder (not shown) that is a movable part with a plurality of suspension wires. The objective lens actuator drives the objective lens 206 in a focusing direction and in a tracking direction in accordance with a focusing error signal and a tracking error signal so that a light spot follows an information track of the rotating optical disc 220.

A collimating lens actuator (not shown) moves the collimating lens 203 in the optical axis direction by, for example, driving a stepping motor or the like. Using a position where emitted light from the collimating lens 203 becomes approximately parallel light as a reference position, by moving the collimating lens 203 from the reference position to a light source side (a side of the prism beam splitter 202 in FIG. 42), the emitted light from the collimating lens 203 becomes divergent light. Accordingly, spherical aberration generated in a case where, for example, a protective substrate of the optical disc 220 is thick can be corrected. Moreover, cases where a protective substrate is thick includes a case where a thickness of the protective substrate increases due to a change in temperature and a case where information is recorded or reproduced on or from a recording layer significantly separated from a light incidence surface of a multilayer optical disc.

On the other hand, by moving the collimating lens 203 from the reference position to a side of the objective lens (to a side of the rising mirror 204 in FIG. 42), the emitted light from the collimating lens 203 becomes convergent light. Accordingly, spherical aberration generated in a case where, for example, a protective substrate of the optical disc 220 is thin can be corrected. Moreover, cases where a protective substrate is thin includes a case where the thickness of the protective substrate decreases due to a change in temperature and a case where information is recorded or reproduced on or from a recording layer that is closer to a light incidence surface of a multilayer disc.

In other words, on the optical disc 220 including a plurality of information recording surfaces, by moving the collimating lens 203 in accordance with the thickness of a protective substrate of each information recording surface, spherical aberration can be corrected. Moreover, by moving the collimating lens 203, spherical aberration created due to a change in temperature of an optical element such as the objective lens 206 and spherical aberration created due to a change in a wavelength of a blue-violet light beam emitted from the light source 201 can also be corrected.

The light source 201 is desirably a semiconductor laser. By adopting such a configuration, the size, weight, and power consumption of the optical pickup 250 can be reduced.

Moreover, the prism beam splitter 202 desirably includes a polarization separating film with increased reflectance of specific straight polarized light and increased transmittance of straight polarized light that is perpendicular to the specific straight polarized light. With such a configuration, in combination with the quarter wavelength plate 205, by maximizing reflectance of emitted light from the light source 201 or, in other words, reflectance of a light beam on a forward path and maximizing reflectance of reflected light from the optical disc 220 or, in other words, reflectance of a light beam on a return path, utilization efficiency of light can be increased, reproduction performance of the optical pickup 250 can be improved, and low power consumption can be achieved.

Moreover, the detection lens 211 is an element that creates astigmatism for focusing control in a general astigmatic method. When the detection lens 211 is constituted by, for example, a cylindrical lens, a favorable detected spot can be obtained and focusing control performance can be improved by optimizing lens design. In addition, although not shown, astigmatism may be created by providing a parallel flat plate inserted diagonally with respect to an optical axis into a convergent optical path in place of the detection lens 211. In this case, since the element itself can be fabricated more easily than a cylindrical lens, a reduction in cost can be achieved. Furthermore, since the element is a flat plate element, a margin of mounting accuracy can be increased.

Moreover, the optical pickup 250 may further include the front monitor 213. The front monitor 213 monitors light intensity of a part of a light beam transmitted through the rising mirror 204. Since reflectance and transmittance of the rising mirror 204 are known (constant), light intensity of a light beam emitted from the light source 201 can be calculated, and by performing feedback control, the light intensity of a light beam emitted from the light source 201 can be accurately adjusted in real time as necessary. Accordingly, recording performance or reproduction performance of the optical disc 220 can be improved.

Although an RF signal is generated by the first diffraction element 208 and the first light detector 209 arranged on the first optical path to which a light beam reflected by the light branching element 207 is guided and a servo signal is generated by the second diffraction element 210, the detection lens 211, and the second light detector 212 arranged on the second optical path to which a light beam transmitted through the light branching element 207 is guided in the present embodiment, the present disclosure is not limited thereto. The second diffraction element 210, the detection lens 211, and the second light detector 212 may be arranged on the first optical path to which a light beam reflected by the light branching element 207 is guided, and the first diffraction element 208 and the first light detector 209 may be arranged on the second optical path to which a light beam transmitted through the light branching element 207 is guided. In this case, by setting reflectance R of the light branching element 207 to be lower than transmittance T, a similar effect to the present ninth embodiment may be produced.

Moreover, the present embodiment is not limited to an optical disc and can be widely applied to optical pickups that record or reproduce information on or from an optical information recording medium such as an optical tape and an optical card.

Tenth Embodiment

Figure 51:
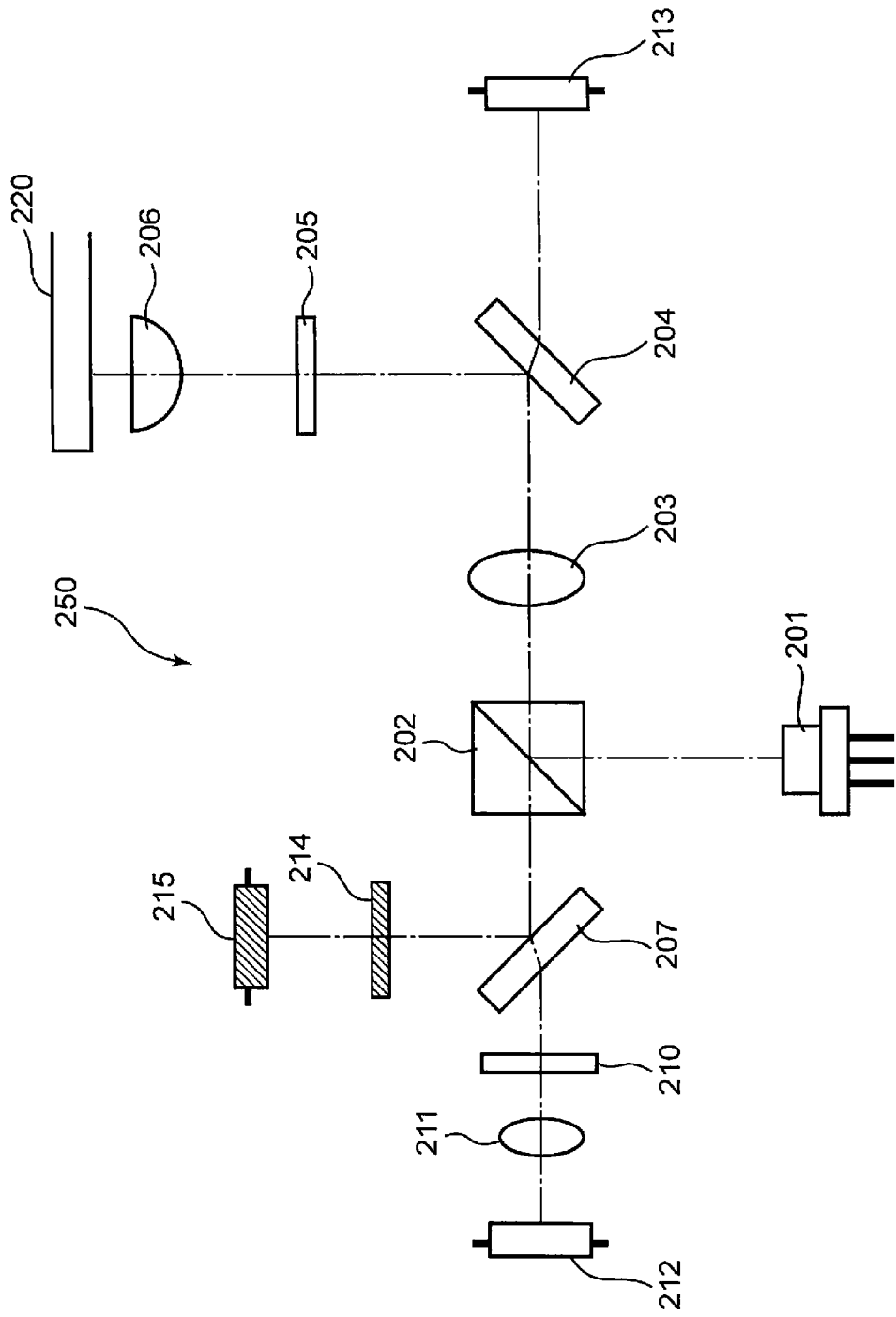
FIG. 51 is a schematic view showing a configuration of an optical pickup according to a tenth embodiment of the present disclosure.

Another embodiment of the present disclosure will be described. FIG. 51 is a schematic view showing a configuration of an optical pickup according to a tenth embodiment of the present disclosure.

In the present tenth embodiment, components in common with the ninth embodiment will be denoted by the same reference characters and a description thereof will be omitted.

The present tenth embodiment differs from the ninth embodiment in that a third diffraction element 214 is provided in place of the first diffraction element 208 and a third light detector 215 is provided in place of the first light detector 209 on the first optical path. Otherwise, the configuration is completely similar to the configuration of the ninth embodiment.

Figure 52:
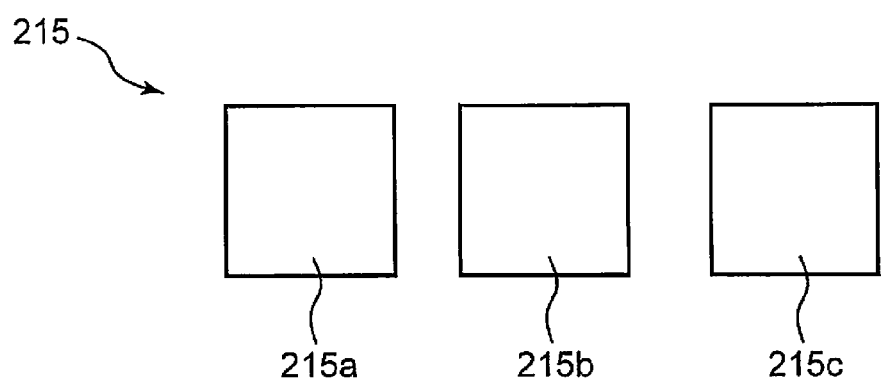
FIG. 52 is a schematic view showing an example of an arrangement pattern of light receiving regions of a third light detector according to the tenth embodiment of the present disclosure.

Next, the third diffraction element 214 and the third light detector 215 which generate RF signals will now be described in detail with reference to FIGS. 52 and 53. FIG. 52 is a schematic view showing an example of an arrangement pattern of light receiving regions of the third light detector 215 according to the tenth embodiment of the present disclosure. The third light detector 215 includes three independent light receiving regions 215a to 215c.

Figure 53:
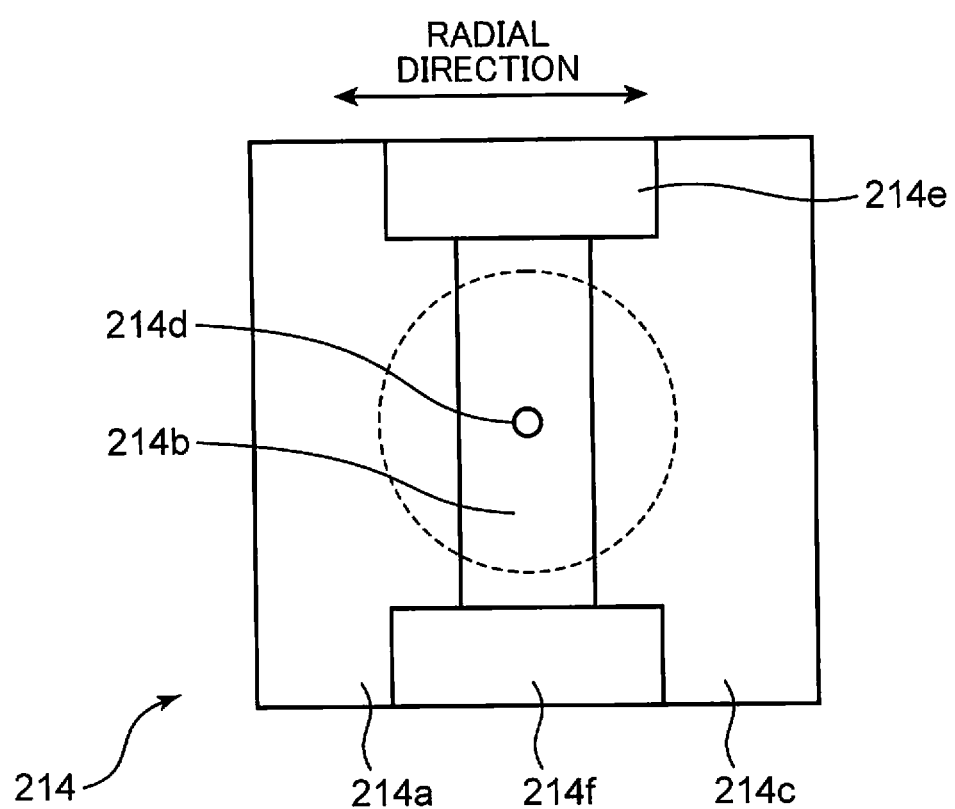
FIG. 53 is a schematic view showing an example of a luminous flux splitting pattern of a third diffraction element according to the tenth embodiment of the present disclosure.

FIG. 53 is a schematic view showing an example of a luminous flux splitting pattern of the third diffraction element 214 according to the tenth embodiment of the present disclosure. A dashed line in FIG. 53 represents a luminous flux diameter on the third diffraction element 214 of a light beam reflected by an information recording surface of the optical disc 220.

The third diffraction element 214 includes six types of regions 214a to 214f. A distance between the region 214d and the region 214a is approximately equal to a distance between the region 214d and the region 214c, and a distance between the region 214d and the region 214e is approximately equal to a distance between the region 214d and the region 214f. A light beam incident on each region is split into 0 order diffracted light and ±1 order diffracted light and guided to the third light detector 215. +1 order diffracted light having been diffracted by the region 214a is guided to the light receiving region 215a, +1 order diffracted light having been diffracted by the region 214b is guided to the light receiving region 215b, and +1 order diffracted light having been diffracted by the region 214c is guided to the light receiving region 215c. +1 order diffracted light having been diffracted by the regions 214d, 214e, and 214f is not guided to any of the light receiving regions. In addition, the 0 order diffracted light and the −1 order diffracted light of reach region is not guided to any of the light receiving regions. If outputs in accordance with received light intensity from the light receiving regions 215a to 215c are denoted by $J_A$ to $J_C$, then an RF signal may be calculated according to the equation below.

$$RF = \alpha J_A + \beta J_B + \gamma J_C,$$

where RF denotes an RF signal and α, β, and γ denote arbitrary constants.

As described above, by individually receiving a light beam including an RF signal having been split into three in a radial direction of the optical disc 220 and calculating the RF signal as described above, leakage (crosstalk) of the RF signal from an information track adjacent to an information track being scanned for reproduction can be reduced in a similar manner to the ninth embodiment. The reduction of crosstalk enables track density in the radial direction of the optical disc 220 to be further increased and the capacity of the optical disc 220 to be expanded.

In this case, the region 214d shown in FIG. 53 is not used when calculating an RF signal. While the region 214d has an effect of reducing multilayer stray light in a similar manner to the removal region (the region 210h) in FIG. 44 according to the ninth embodiment, the region 214d must be arranged in a vicinity of center of a light beam as described earlier. Hereinafter, a method of adjusting a position of the region 214d will be described.

First, as far as a relative positional relationship between a light beam and the third light detector 215 is concerned, by intentionally changing a position of the third light detector 215 with respect to the light beam, whether all light beams are incident on the respective light receiving regions or whether a light beam protrudes outside of each light receiving region can be determined based on a change in output in accordance with received light intensity at each light receiving region. Therefore, by recognizing coordinates of a position where a light beam has protruded outside a light receiving region and displacing a position of the third light detector 215 to a center of the light beam, the position of the third light detector 215 can be adjusted with high precision with respect to the light beam.

Next, a method of arranging the region 214d that is a removal region of the third diffraction element 214 in a vicinity of a center of a light beam will be described. FIGS. 54 to 57 are schematic views showing a position of a light beam on the third diffraction element 214 in a case where a position of the third diffraction element 214 is displaced after fixing the position of the light beam and the position of the third light detector 215.

Figure 54:
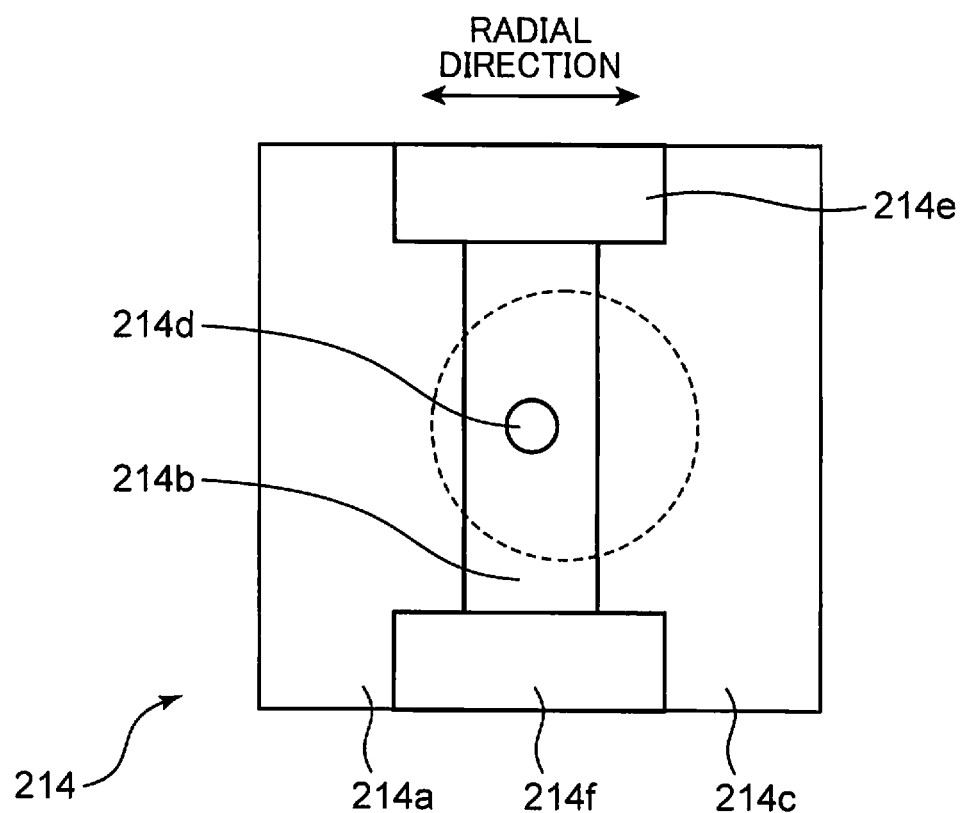
FIG. 54 is a schematic view showing a position of a light beam on a third diffraction element in a case where the third diffraction element is displaced leftward in a radial direction of an optical disc.
Figure 55:
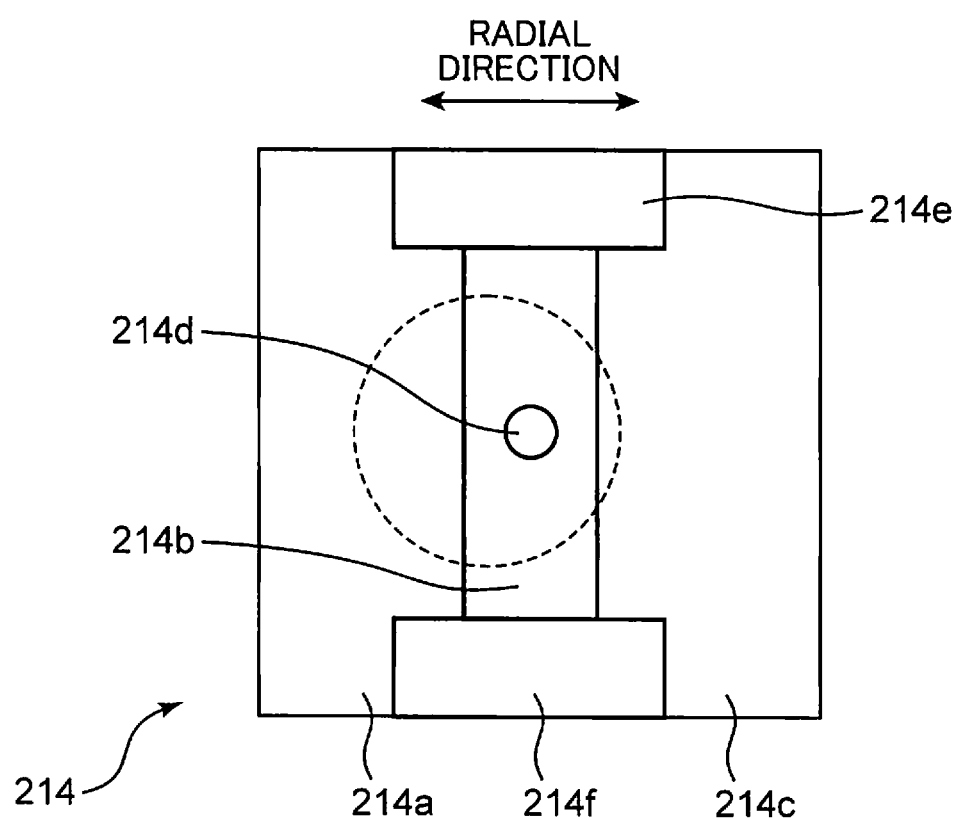
FIG. 55 is a schematic view showing a position of a light beam on a third diffraction element in a case where the third diffraction element is displaced rightward in a radial direction of an optical disc.
Figure 56:
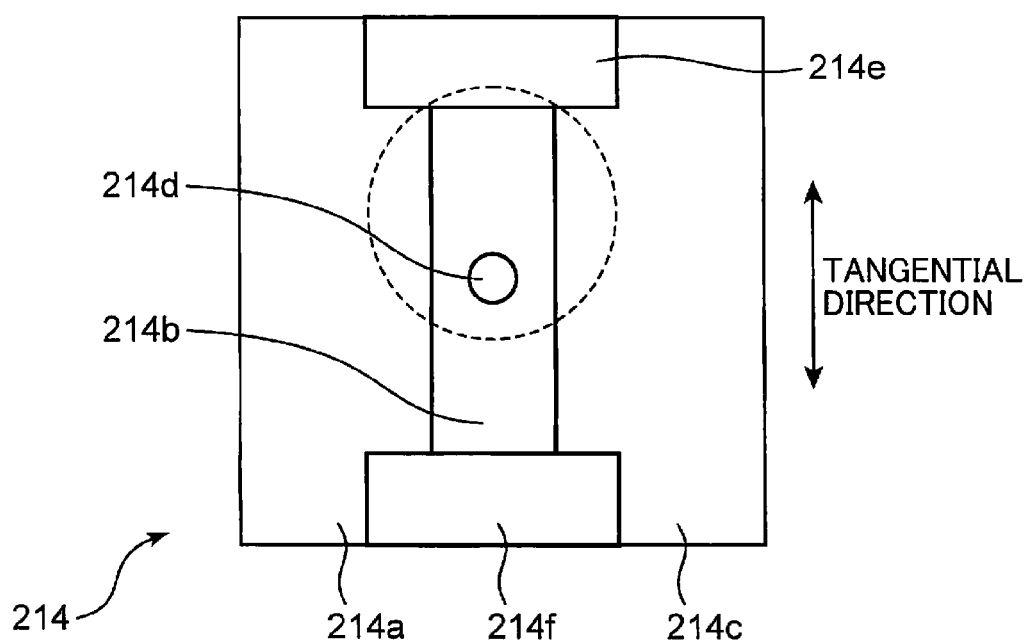
FIG. 56 is a schematic view showing a position of a light beam on a third diffraction element in a case where the third diffraction element is displaced downward in a tangential direction of an information track of an optical disc.
Figure 57:
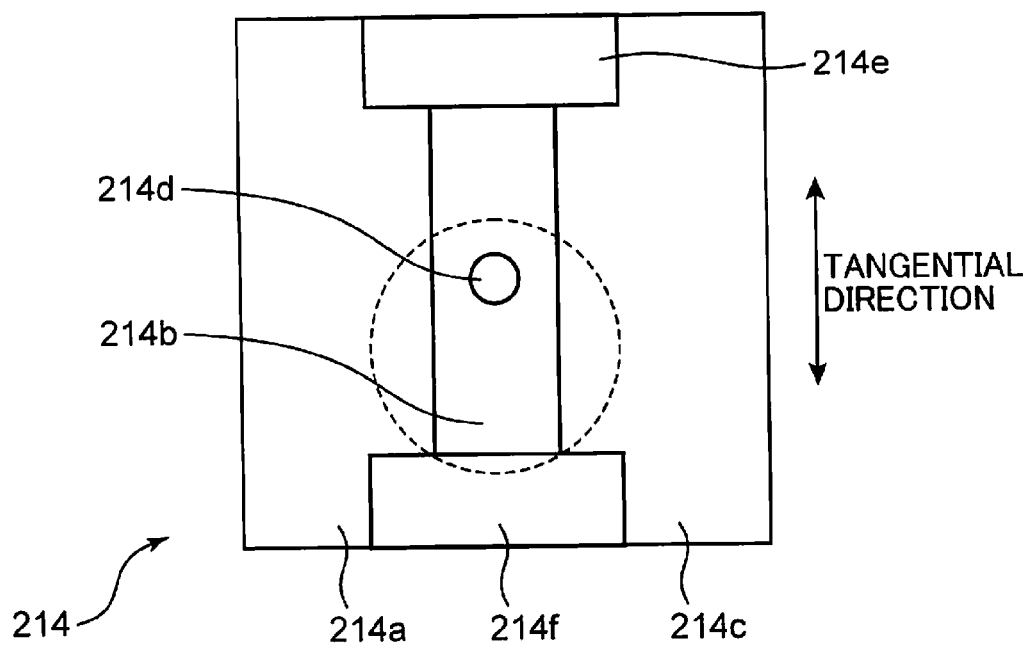
FIG. 57 is a schematic view showing a position of a light beam on a third diffraction element in a case where the third diffraction element is displaced upward in a tangential direction of an information track of an optical disc.

FIG. 54 is a schematic view showing a position of a light beam on the third diffraction element 214 in a case where the third diffraction element 214 is displaced leftward in a radial direction of the optical disc 220, FIG. 55 is a schematic view showing a position of a light beam on the third diffraction element 214 in a case where the third diffraction element 214 is displaced rightward in the radial direction of the optical disc 220, FIG. 56 is a schematic view showing a position of a light beam on the third diffraction element 214 in a case where the third diffraction element 214 is displaced downward in a tangential direction of an information track of the optical disc 220, and FIG. 57 is a schematic view showing a position of a light beam on the third diffraction element 214 in a case where the third diffraction element 214 is displaced upward in the tangential direction of an information track of the optical disc 220.

First, as shown in FIGS. 54 and 55, when the third diffraction element 214 is displaced in the radial direction of the optical disc 220 (in the drawing, left and right directions of a paper surface), since areas of light beams split by the region 214a and the region 214c change, a signal amount output from the light receiving region 215a and the light receiving region 215c also change. Therefore, the third diffraction element 214 is displaced in the radial direction of the optical disc 220 so that a signal amount output from the light receiving region 215a and a signal amount output from the light receiving region 215c become equal to each other. Accordingly, the position of the region 214d that is a removal region of the third diffraction element 214 can be arranged in a vicinity of center of a light beam in the radial direction of the optical disc 220.

Next, as shown in FIGS. 56 and 57, when the third diffraction element 214 is displaced in the tangential direction of an information track of the optical disc 220 (in the drawing, up and down directions of the paper surface), a light beam is incident on the region 214e in an upward direction of the paper surface and a light beam is incident on the region 214f in a downward direction of the paper surface. Since light beams from the regions 214e and 214f are not used to compute an RF signal, when a light beam is incident on the regions 214e and 214f, a signal amount of the RF signal decreases. Therefore, the third diffraction element 214 is intentionally displaced upward and downward along the tangential direction of an information track of the optical disc, an upper limit position and a lower limit position where a signal amount of an RF signal decreases are detected, and the third diffraction element 214 is arranged at a center of the upper limit position and the lower limit position. Accordingly, the position of the region 214d that is a removal region of the third diffraction element 214 can be arranged in a vicinity of center of a light beam in the tangential direction of an information track of the optical disc 220. In particular, in a case where a luminous flux diameter (diameter) of a light beam on the third diffraction element 214 is greater than a distance between the region 214d and the region 214e or a distance between the region 214d and the region 214f, the configuration according to the present tenth embodiment can reduce an amount of displacement for adjusting the position of the third diffraction element 214 as compared to the configuration according to the ninth embodiment. Therefore, a configuration of the optical pickup can be downsized and simplified.

Moreover, an arrangement pattern of light receiving regions of the third light detector 215 need not necessarily be the arrangement pattern shown in FIG. 52 as long as the light receiving regions 215a to 215d (or the light receiving regions 215a to 215f) are provided. Although a detailed description will not be provided, particularly, when a multilayer optical disc is used as the optical disc 220, there is a possibility that a light beam that cannot be removed by the region 214d among unnecessary reflected light (multilayer stray light) from a recording layer other than a recording layer on which focusing control is being performed may reach the third light detector 215. Therefore, an arrangement pattern that prevents such stray light is effective.

In addition, in the present embodiment, light beams from the region 214*d*, the region 214*e*, and the region 214*f* that are not required when generating an RF signal are favorably not guided to the third light detector 215. Furthermore, the light beams from the region 214*d*, the region 214*e*, and the region 214*f* are favorably guided to a location where a light receiving region is not arranged in the third light detector 215. In this case, since a diffraction pitch of the third diffraction element 214 can be widened, the configuration of the optical pickup can be simplified. However, in a case where light beams guided from the region 214*d*, the region 214*e*, and the region 214*f* are received at a location where a light receiving region is not arranged in the third light detector 215, since the multilayer stray light described earlier is also guided into the third light detector 215 by the region 214*d*, the region 214*e*, and the region 214*f*, a configuration in which the light receiving regions 215*a* to 215*c* are arranged so as to avoid the multilayer stray light is effective.

In addition, the third light detector 215 may further include a light receiving region 215*e* (not shown) that receives a light beam from the region 214*e* of the third diffraction element 214 and a light receiving region 215*f* (not shown) that receives a light beam from the region 214*f* of the third diffraction element 214. By adopting such a configuration, since a light beam is incident on the region 214*e* or the region 214*f* when the third diffraction element 214 is displaced in the tangential direction of an information track (in the drawing, upward and downward directions on a paper surface) of the optical disc 220 as shown in FIGS. 56 and 57, a signal output from the light receiving region 215*e* or the light receiving region 215*f* can be detected. Therefore, precision of adjustment of the position of the third diffraction element 214 in the tangential direction of an information track of the optical disc 220 can be improved.

On the other hand, in a case where the third light detector 215 does not include the light receiving region 215*e* and the light receiving region 215*f*, since the number of light receiving regions can be reduced to just three, the number of amplifiers can be further reduced as compared to the ninth embodiment. As a result, amplifier noise can be reduced and S/N of an RF signal can be improved. Moreover, in the case of this configuration, the region 214*d* that is a removal region can absorb or reflect a light beam as a light shielding region and the all of the effects described earlier can be produced in a similar manner. Even with this configuration, it is obvious that light receiving regions are effectively arranged in consideration of multilayer stray light.

As described above, in contrast to the first diffraction element 208 according to the ninth embodiment being able to simplify a division pattern, in the present tenth embodiment, by intentionally providing the originally-unnecessary regions 214*e* and 214*f* on the third diffraction element 214, a position of the third diffraction element 214 can be adjusted with higher precision. As a result, a configuration required for position adjustment can be downsized and a configuration required for position adjustment can be simplified. In addition, by reducing the number of light receiving regions of the third light detector 215, amplifier noise can be further reduced.

Moreover, even in the present tenth embodiment, a configuration may be adopted so that a condensed light spot of a light beam is formed on each light receiving region of the third light detector 215. By adopting such a configuration, an area of the light receiving regions can be reduced as compared to a conventional case where a minimum circle of confusion imparted with astigmatism is received by a light receiving region to generate an RF signal. Therefore, in order to improve a rate at which information is recorded or reproduced, a cutoff frequency can be increased and signal noise can be reduced. Meanwhile, an area of each light receiving region is desirably larger than a condensed light spot. According to such a configuration, robustness with respect to displacement of positions due to a mechanical positional error, a change in environmental temperature, or the like can be enhanced.

Moreover, while an RF signal is generated using only +1 order diffracted light of the third diffraction element 214 in the present embodiment, in order to further improve light utilization efficiency, a diffraction structure of the third diffraction element 214 may be blazed to improve diffraction efficiency of +1 order diffracted light. Alternatively, in order to improve light utilization efficiency, a light receiving region to which −1 order diffracted light from the regions 214*a* to 214*c* of the third diffraction element 214 is guided may be independently provided in the third light detector 215 separately from a light receiving region to which +1 order diffracted light from the regions 214*a* to 214*c* of the third diffraction element 214 is guided, and a signal from the light receiving region that receives the −1 order diffracted light may be used in a computation for generating an RF signal. Alternatively, selective blazing may be performed for each region of the third diffraction element 214. For example, the third light detector 215 may individually include a light receiving region that receives +1 order diffracted light from the central region 214*b* of the third diffraction element 214, a light receiving region that receives −1 order diffracted light from the region 214*b*, a light receiving region that receives +1 order light from the blazed region 214*a*, and a light receiving region that receives +1 order light from the blazed region 214*c*. In this case, light utilization efficiency can be improved.

Due to the configurations described above, even in a case where a signal detected by a light detector for generating an RF signal becomes smaller due to multilayering of the optical disc 220 or increasing recording density in a tangential direction of an information track of the optical disc 220, S/N of the RF signal can be increased and reproduction performance can be improved. The light detector for generating a servo signal can perform stable servo control by increasing an amplification factor of a detected signal.

In addition, by arranging an RF signal detection system such that a removal region on a diffraction element is arranged in a vicinity of center of a light beam, multilayer stray light that is created due to multilayering of the optical disc 220 can be effectively removed and reproduction performance of a multilayered optical disc can be improved. Furthermore, since a removal region is also provided on a diffraction element in a servo signal detection system, stable servo control can be performed.

Moreover, with the present embodiment, since leakage of an RF signal (a crosstalk signal) from an information track adjacent to an information track being scanned for reproduction can be reduced, reproduction performance of the optical disc 220 having increased track density in the radial direction can be improved.

As described above, even when multilayering, improvement of recording density in the tangential direction of an information track, and improvement of track density in the radial direction of the optical disc 220 are performed, the optical pickup 250 according to the present embodiment can obtain high reproduction quality and realize stable servo control. Therefore, a remarkable increase in capacity of the optical disc 220 can be achieved.

With respect to configurations that are the same as those of the ninth embodiment besides the configurations described in the present tenth embodiment, it is assumed that effects thereof can be similarly produced.

Eleventh Embodiment

Figure 58:
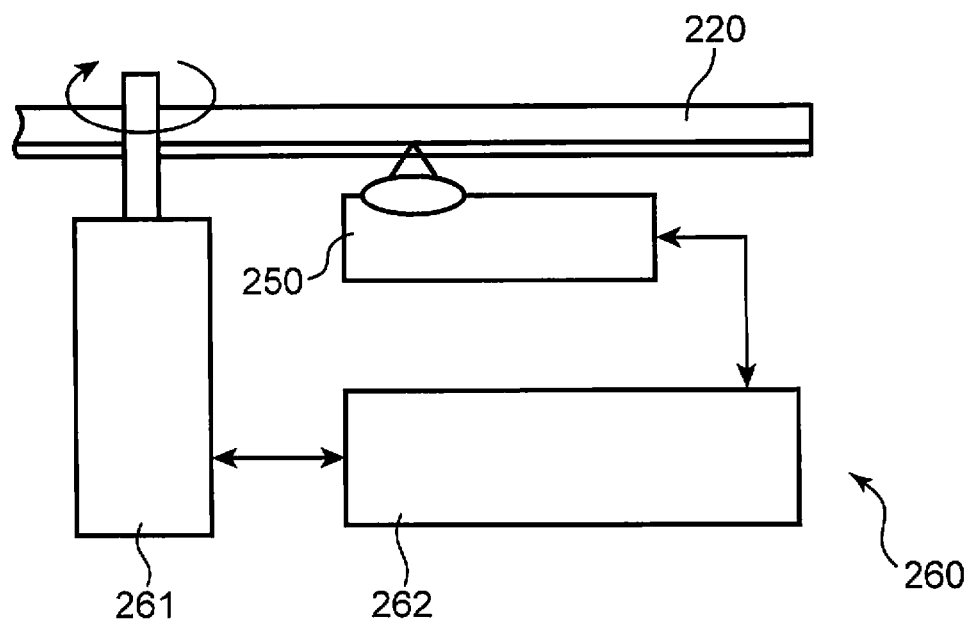
FIG. 58 is a schematic view showing a configuration of an optical disk apparatus according to an eleventh embodiment of the present disclosure.

FIG. 58 is a diagram showing a configuration of an optical disc apparatus according to an eleventh embodiment of the present disclosure.

In FIG. 58, an optical disc apparatus 260 includes a drive section 261, a control section 262, and an optical pickup 250.

The drive section 261 drives an optical information recording medium. For example, when the optical information recording medium is the optical disc 220, the drive section 261 rotationally drives the optical disc 220. The optical pickup 250 is any of the optical pickups described in the ninth embodiment and the tenth embodiment. The control section 262 controls the drive section 261 and driving of the optical pickup 250 and, at the same time, performs signal processing of a control signal and an information signal photoelectrically converted and computed by the optical pickup 250. In addition, the control section 262 has a function of interfacing an information signal between outside and inside of the optical disc apparatus 260.

The control section 262 receives a control signal obtained from the optical pickup 250 and, based on the control signal, performs focusing control, tracking control, information reproduction control, and rotation control of the drive section 261. In addition, the control section 262 reproduces information from an information signal and transmits a recording signal to the optical pickup 250.

Moreover, an optical information recording medium is not limited to the optical disc 220 and may instead be an optical tape or an optical card.

Since the optical disc apparatus 260 is mounted with any of the optical pickups 250 described in the ninth embodiment and the tenth embodiment, the optical disc apparatus 260 according to the present eleventh embodiment can favorably record or reproduce information on or from a large-capacity optical disc.

Twelfth Embodiment

Figure 59:
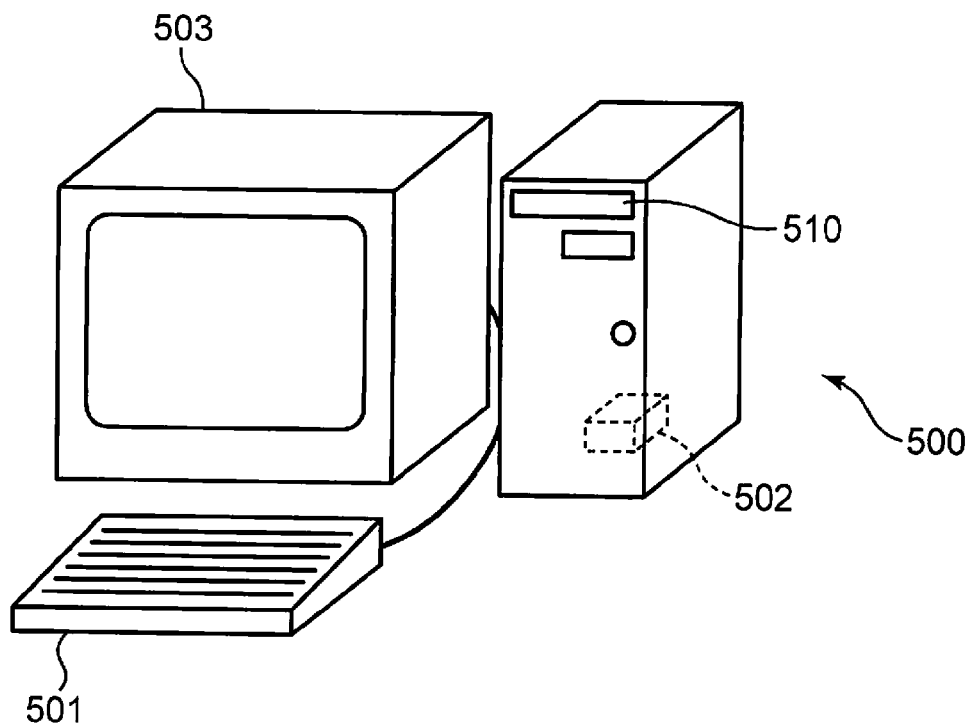
FIG. 59 is a schematic view showing a configuration of a computer according to a twelfth embodiment of the present disclosure.

FIG. 59 is a schematic view showing a configuration of a computer according to a twelfth embodiment of the present disclosure.

In FIG. 59, a computer 500 includes an optical disc apparatus 510, an input apparatus 501, a computing apparatus 502, and an output apparatus 503.

The optical disc apparatus 510 is any of the optical disc apparatuses according to the first to eighth and eleventh embodiments. The input apparatus 501 is constituted by a keyboard, a mouse, a touch panel, or the like and is used to input information. The computing apparatus 502 is constituted by a central processing unit (CPU) or the like and performs computations based on information input from the input apparatus 501, information read from the optical disc apparatus 510, and the like. The output apparatus 503 is constituted by a display apparatus (a cathode ray tube, a liquid crystal display apparatus, or the like), a printer, or the like and outputs information such as a result of a computation by the computing apparatus 502. Moreover, the display apparatus displays information such as a result of a computation by the computing apparatus 502 and the printer prints out information such as a result of a computation by the computing apparatus 502.

Since the computer 500 includes the optical disc apparatus 510 according to any of the first to eighth and eleventh embodiments, the computer 500 can favorably record or reproduce information on or from a high-density optical disc having been multilayered and having attained a narrow track pitch and can be used in a wide range of applications.

Thirteenth Embodiment

Figure 60:
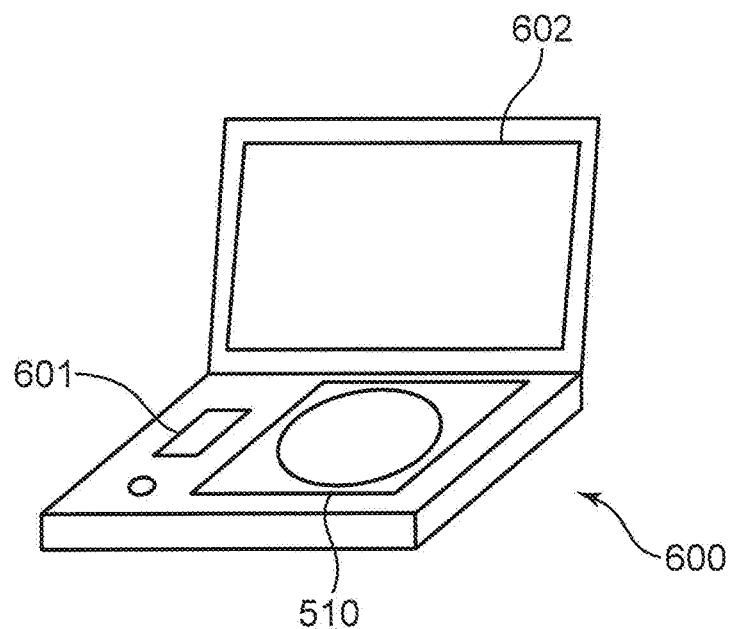
FIG. 60 is a schematic view showing a configuration of an optical disc player according to a thirteenth embodiment of the present disclosure.

FIG. 60 is a schematic view showing a configuration of an optical disc player according to a thirteenth embodiment of the present disclosure.

In FIG. 60, an optical disc player 600 includes an optical disc apparatus 510 and a decoder 601. The optical disc apparatus 510 is any of the optical disc apparatuses according to the first to eighth and eleventh embodiments. The decoder 601 converts an information signal obtained from the optical disc apparatus 510 into image information.

Moreover, by adding a positional sensor such as a GPS (Global Positioning System) and a central processing unit (CPU), the optical disc player 600 can also be used as a car navigation system. In addition, the optical disc player 600 may include a display apparatus 602. The display apparatus 602 is constituted by a liquid crystal display apparatus or the like and displays image information converted by the decoder 601.

Since the optical disc player 600 includes the optical disc apparatus 510 according to any of the first to eighth and eleventh embodiments, the computer 500 can favorably record or reproduce information on or from a high-density optical disc having been multilayered and having attained a narrow track pitch and can be used in a wide range of applications.

Fourteenth Embodiment

Figure 61:
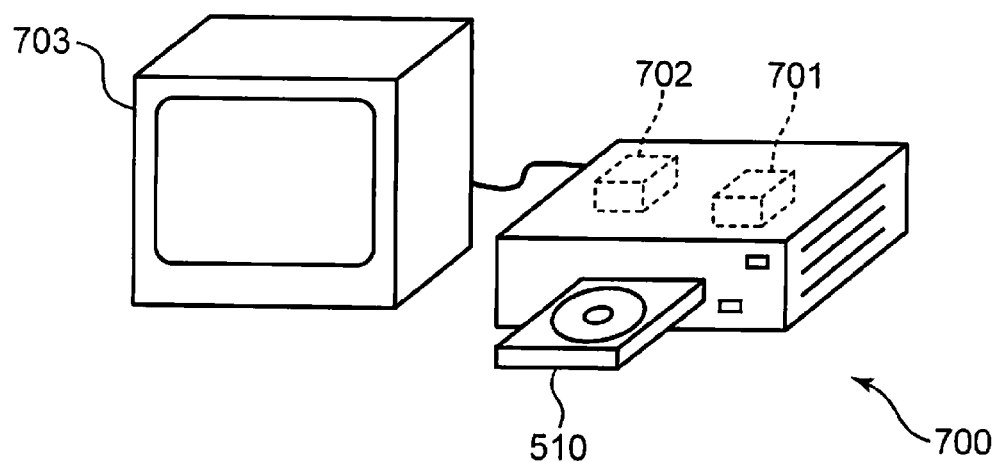
FIG. 61 is a schematic view showing a configuration of an optical disc recorder according to a fourteenth embodiment of the present disclosure.

FIG. 61 is a schematic view showing a configuration of an optical disc recorder according to a fourteenth embodiment of the present disclosure.

In FIG. 61, an optical disc recorder 700 includes an optical disc apparatus 510 and an encoder 701. The optical disc apparatus 510 is any of the optical disc apparatuses according to the first to eighth and eleventh embodiments. The encoder 701 converts image information into an information signal to be recorded on an optical disc by the optical disc apparatus 510. Desirably, the optical disc recorder 700 may further include a decoder 702 that converts an information signal obtained from the optical disc apparatus 510 into image information. Accordingly, a recorded image can also be reproduced.

Moreover, the optical disc recorder 700 may include an output apparatus 703. The output apparatus 703 is constituted by a display apparatus (a cathode ray tube, a liquid crystal display apparatus, or the like), a printer, or the like and outputs image information converted by the decoder 702. The display apparatus displays image information converted by the decoder 702 and the printer prints out image information converted by the decoder 702.

Since the optical disc recorder 700 includes the optical disc apparatus 510 according to any of the first to eighth and eleventh embodiments, the computer 500 can favorably record or reproduce information on or from a high-density optical disc having been multilayered and having attained a narrow track pitch and can be used in a wide range of applications.

Fifteenth Embodiment

Figure 62:
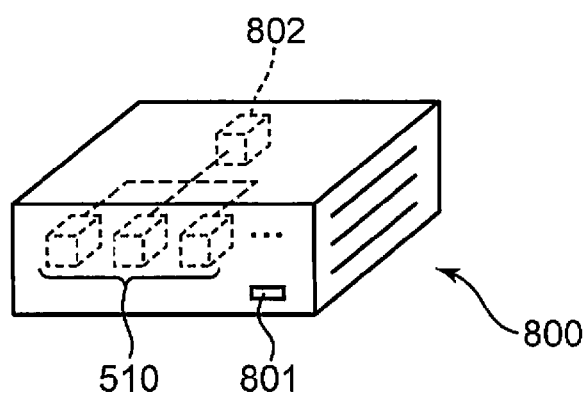
FIG. 62 is a schematic view showing a configuration of a storage server according to a fifteenth embodiment of the present disclosure.
Figure 63:
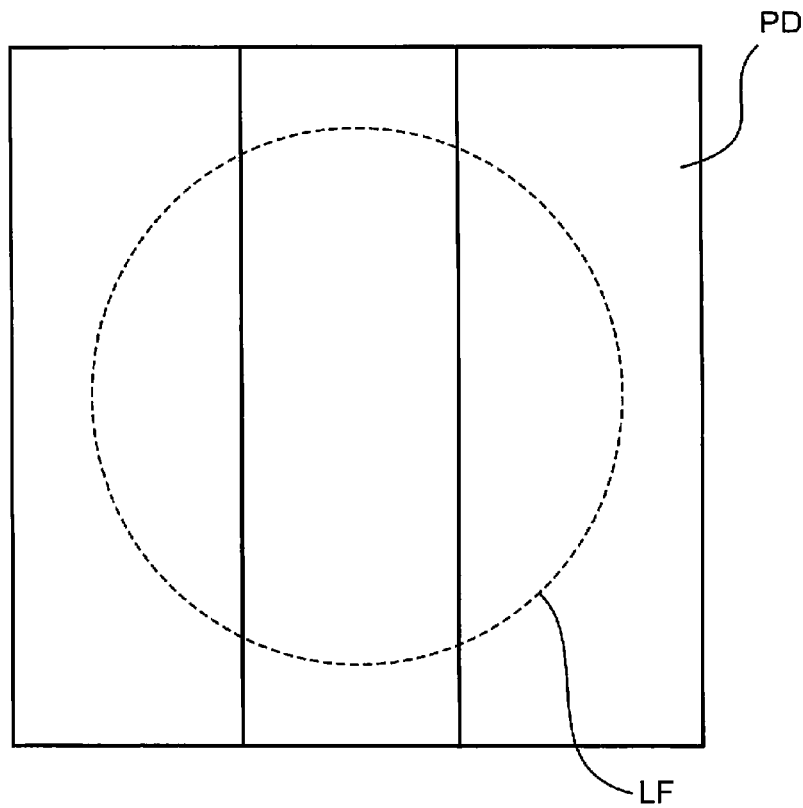
FIG. 63 is a diagram showing a configuration of a light receiving section of a conventional optical disc apparatus.

FIG. 62 is a schematic view showing a configuration of a storage server according to a fifteenth embodiment of the present disclosure.

In FIG. 62, a storage server 800 includes an I/O terminal 801 and an optical disc apparatus 510. The optical disc apparatus 510 is any of the optical disc apparatuses according to the first to eighth and eleventh embodiments. The I/O terminal 801 performs input and output of data from and to the outside. The storage server 800 saves large-capacity data in the optical disc apparatus 510 and retrieves large-capacity data from the optical disc apparatus 510.

In addition, the storage server 800 favorably includes a plurality of optical disc apparatuses 510 and a data controller 802 that sorts data to the plurality of optical disc apparatuses 510. Accordingly, an even larger capacity of data can be handled.

Furthermore, although not shown, the storage server 800 may include an input apparatus, a computing apparatus, and an output apparatus. The input apparatus is constituted by a keyboard, a mouse, a touch panel, or the like and is used to selectively input information. The computing apparatus is constituted by a central processing unit (CPU) or the like and performs computations based on information input from the input apparatus, information read from the optical disc apparatus 510, and the like. The output apparatus is constituted by a display apparatus (a cathode ray tube, a liquid crystal display apparatus, or the like), a printer, or the like and outputs information such as a result of a computation by the computing apparatus. Moreover, the display apparatus displays information such as a result of a computation by the computing apparatus and the printer prints out information such as a result of a computation by the computing apparatus.

Since the storage server 800 includes the optical disc apparatus 510 according to any of the first to eighth and eleventh embodiments, the storage server 800 can favorably record or reproduce information on or from a high-density optical disc having been multilayered and having attained a narrow track pitch and can be used in a wide range of applications.

The examples and embodiments set forth in the section titled Description of Embodiments are merely intended to elucidate the technical details of the present disclosure and, as such, the present disclosure should not be narrowly interpreted as being limited to such specific examples. It is to be understood that various changes and modifications can be made to the present disclosure without departing from the spirit thereof and from the scope of the subjoined claims.

Moreover, the specific embodiments described above primarily include a disclosure configured as described below.

An optical information apparatus according to an aspect of the present disclosure is an optical information apparatus that records and/or reproduces information on and/or from a recording medium having a plurality of information recording surfaces, the optical information apparatus including: a light source that emits laser light with a wavelength of $\lambda$; an objective lens that causes the laser light from the light source to converge on any of the plurality of information recording surfaces of the recording medium; a luminous flux splitting element which is divided in a direction perpendicular to a tangent line of an information track of the information recording surface of the recording medium, which has a central region including an optical axis of the laser light and a first end portion region and a second end portion region that sandwich the central region, and which splits the laser light reflected by any of the information recording surfaces of the recording medium into a luminous flux diffracted by the central region, a luminous flux diffracted by the first end portion region, and a luminous flux diffracted by the second end portion region; a first light detector which receives a plurality of luminous fluxes split by the luminous flux splitting element and which outputs a plurality of signals in accordance with light intensities of the plurality of received luminous fluxes; a plurality of waveform equalizers which impart different gains to the plurality of signals output from the first light detector in accordance with a frequency component of each signal; an adder which adds up a plurality of signals output from the plurality of waveform equalizers and which outputs the added signals as an information signal; and a signal processing section which processes the information signal, wherein the central region is formed by a binary diffraction grating and generates ±1 order diffracted light from the laser light incident on the central region, the first end portion region is formed by a blazed diffraction grating and generates first +1 order diffracted light from the laser light incident on the first end portion region, the second end portion region is formed by a blazed diffraction grating and generates second +1 order diffracted light from the laser light incident on the second end portion region, and the first light detector receives both the ±1 order diffracted light generated by the central region, the first +1 order diffracted light generated by the first end portion region, and the second +1 order diffracted light generated by the second end portion region.

According to this configuration, due to the luminous flux splitting element which only produces a significantly small loss in light intensity of the first end portion region and the second end portion region which contribute significantly to an amplitude of an information signal or in other words, due to the luminous flux splitting element suitable for crosstalk cancellation, since another layer-reflected stray light and surface-reflected stray light incident on the luminous flux splitting element do not overlap on the first light detector with signal light reflected by the information recording surface that is a recording or reproducing object, signal light and stray light do not interfere with each other. Therefore, information can be stably recorded or reproduced on or from a recording medium having been multilayered and having attained a narrow track pitch.

In addition, in the optical information apparatus described above, favorably, diffraction pitches of the blazed diffraction gratings formed in the first end portion region and the second end portion region are larger than a diffraction pitch of the binary diffraction grating formed in the central region.

According to this configuration, even in a case where a blazed diffraction grating is created by approximation using a stepped diffraction grating, since a line width of the stepped diffraction grating is sufficiently large, the stepped diffraction grating can be readily created and, at the same time, sufficiently high diffraction efficiency can be secured.

Furthermore, in the optical information apparatus described above, favorably, diffraction efficiencies of the ±1 order diffracted light at the wavelength $\lambda$ of the binary diffraction grating formed in the central region are respectively 30% or higher and diffraction efficiencies of the first and second +1 order diffracted light at the wavelength $\lambda$ of the blazed diffraction gratings formed in the first end portion region and the second end portion region are respectively 80% or higher.

According to this configuration, since a loss in light intensity of the first end portion region and the second end portion region which contribute significantly to an amplitude of an information signal is small, an information signal with a high signal-to-noise intensity ratio (S/N) can be obtained.

In addition, favorably, the optical information apparatus described above further includes a wobble signal generating section that generates a wobble signal by calculating a difference signal between a signal in accordance with light intensity of the first +1 order diffracted light generated by the first end portion region and a signal in accordance with light intensity of the second +1 order diffracted light generated by the second end portion region.

According to this configuration, since a wobble signal is generated, information can be recorded and/or reproduced by accessing an arbitrary address of a recording medium.

Furthermore, in the optical information apparatus described above, favorably, the blazed diffraction gratings formed in the first end portion region and the second end portion region each have power of a convex lens.

According to this configuration, since the blazed diffraction gratings formed in the first end portion region and the second end portion region each have power of a convex lens, a best image point position of the ±1 order diffracted light having been diffracted by the central region and a best image point position of the +1 order light having been diffracted by the first end portion region and the second end portion region can be caused to coincide with each other, the +1 order light transmitted through the first end portion region and the +1 order light transmitted through the second end portion region can be detected respectively separated from one another by different light receiving sections on the first light detector, and a detected spot on the first light detector can be caused to completely converge.

In addition, in the optical information apparatus described above, favorably, the luminous flux splitting element is further divided in a direction of the tangent line of the information track of the information recording surface of the recording medium, further includes a first adjustment region and a second adjustment region which sandwich the central region, the first end portion region, and the second end portion region, and further splits the laser light reflected by any of the information recording surfaces of the recording medium into a luminous flux diffracted by the first adjustment region and a luminous flux diffracted by the second adjustment region, the first adjustment region is formed by a binary diffraction grating and generates ±1 order diffracted light from the laser light incident on the first adjustment region, the second adjustment region is formed by a binary diffraction grating and generates ±1 order diffracted light from the laser light incident on the second adjustment region, and the first light detector receives at least one of the ±1 order diffracted light having been diffracted by the first adjustment region and at least one of the ±1 order diffracted light having been diffracted by the second adjustment region, and outputs a signal in accordance with received light intensity.

According to this configuration, relative positions of a luminous flux and the luminous flux splitting element in the tangential direction of an information track can be readily adjusted.

Furthermore, in the optical information apparatus described above, favorably, a diffraction pitch of the binary diffraction grating formed in the first adjustment region and a diffraction pitch of the binary diffraction grating formed in the second adjustment region are approximately equal to each other.

According to this configuration, a diffraction efficiency of the first adjustment region and a diffraction efficiency of the second adjustment region can be set approximately equal to each other, and relative positions of a luminous flux and the luminous flux splitting element in the tangential direction of an information track can be readily adjusted using diffracted light from the first adjustment region and the second adjustment region with approximately equal diffraction efficiencies.

In addition, in the optical information apparatus described above, favorably, the luminous flux splitting element includes a light shielding region having a transmittance of 10% or lower at the wavelength $\lambda$ in the central region.

According to this configuration, by providing the light shielding region having a transmittance of 10% or lower at the wavelength $\lambda$ in the central region, signal light incident on the central region, another layer-reflected stray light, and surface-reflected stray light can be prevented from overlapping and interfering with each other on the first light detector.

Furthermore, in the optical information apparatus described above, favorably, the plurality of waveform equalizers impart gains to the plurality of signals output from the first light detector so that energy of a signal in accordance with light intensity of the laser light incident on the first end portion region and the second end portion region is greater than energy of a signal in accordance with light intensity of the laser light incident on the central region.

According to this configuration, by setting energy of a signal in accordance with light intensity of the laser light incident on the first end portion region and the second end portion region to be greater than energy of a signal in accordance with light intensity of the laser light incident on the central region, crosstalk from an adjacent track can be effectively reduced.

In addition, in the optical information apparatus described above, favorably, the luminous flux splitting element is divided into two in a direction corresponding to a direction of the tangent line of the information track of the information recording surface of the recording medium, and includes a divided region and a tangential direction end portion region, the divided region is divided into four in a direction perpendicular to the tangent line of the information track, the central region includes two divided central regions positioned at a central portion of the divided region, the first end portion region includes one of two radial direction end portion regions that sandwich the two divided central regions, and the second end portion region includes the other of the two radial direction end portion regions that sandwich the two divided central regions.

According to this configuration, by dividing the central region with a division line that approximately passes a vicinity of an optical axis, a deterioration in performance with respect to stress in a case where the objective lens moves in a radial direction in order to follow a groove-like track of the recording medium or the like can be prevented and a margin can be secured. In addition, by providing a tangential direction end portion region in the direction of a tangent line of an information track, quality of a reproduced signal with respect to a lens shift becomes more favorable. As a result, an improvement in signal quality and an enlargement of a lens shift margin can be achieved in both the radial direction and the direction of a tangent line of an information track. Furthermore, since the number of types of regions has been reduced, an increase in size of the reproduced signal processing section can be suppressed and, at the same time, an improvement of quality of a reproduced signal including an enlargement of a lens shift margin can be achieved.

Furthermore, favorably, the optical information apparatus described above further includes: a second light detector which receives the laser light reflected by the information recording surface of the recording medium and which outputs a servo signal; and a light branching element which branches the laser light reflected by the information recording surface of the recording medium into a first optical path on which the first light detector is arranged and a second optical path on which the second light detector is arranged, wherein light intensity of the laser light branched by the light branching element and incident on the first optical path is greater than light intensity of the laser light branched by the light branching element and incident on the second optical path.

According to this configuration, the light intensity of laser light reaching the first light detector that detects an information signal can be increased and high S/N can be secured with respect to the information signal. In addition, since an amplification factor of an amplifier of the first light detector need not be forcibly raised, a cutoff frequency can be set high and reproduction quality of an information signal including a higher frequency component can also be improved. Furthermore, although light intensity of reflected light reaching the second light detector that detects a servo signal decreases, since a servo signal does not require as high a cutoff frequency as an information signal, the amplification factor of an amplifier can be raised and sufficient output of the servo signal can be secured even in a state where light intensity of the reflected light is low. Therefore, stable servo control can be performed In addition, favorably, the optical information apparatus described above further includes a second luminous flux splitting element which is arranged on the second optical path and which splits the laser light reflected by the information recording surface of the recording medium into a plurality of luminous fluxes, wherein the second light detector receives the plurality of luminous fluxes split by the second luminous flux splitting element and outputs a servo signal.

According to this configuration, a fluctuation of a servo signal (in particular, a tracking error signal) which is created when variations exist in positions, widths, and depths of grooves of information tracks formed on the recording medium can be suppressed. In addition, a fluctuation in a servo signal (in particular, a tracking error signal) which is created when information is recorded on an information track and reflectance changes can also be suppressed. Furthermore, incidence of stray light reflected by an information recording surface that differs from an information recording surface that is a recording or reproducing object to the second light detector can be avoided.

Furthermore, in the optical information apparatus described above, favorably, the light branching element branches approximately 80% of the laser light reflected by the information recording surface of the recording medium into the first optical path and approximately 20% of the laser light reflected by the information recording surface of the recording medium into the second optical path.

According to this configuration, by having approximately 20% of the laser light branched into the second optical path, an amplification factor of an amplifier of the second light detector need not be set excessively high and offset components can be sufficiently ignored. Therefore, stable servo control can be performed An information processing apparatus according to another aspect of the present disclosure includes: any one of the optical information apparatuses described above; and an information processing section that processes information to be recorded on the optical information apparatus and/or information reproduced from the optical information apparatus.

According to this configuration, any one of the optical information apparatuses described above can be applied to an information processing apparatus.

INDUSTRIAL APPLICABILITY

The optical information apparatus according to the present disclosure is capable of stably recording or reproducing information on or from a recording medium having been multi-layered and having attained a narrow track pitch and is useful in an optical information apparatus that records and/or reproduces information on and/or from a recording medium including a plurality of information recording surfaces.

In addition, information processing apparatuses such as a computer, an optical disc player, an optical disc recorder, and a storage server including this optical information apparatus can be used in a wide range of applications.

The invention claimed is:

1. An optical information apparatus that records and/or reproduces information on and/or from a recording medium having a plurality of information recording surfaces, the optical information apparatus comprising:

a light source that emits laser light with a wavelength of λ;

an objective lens that causes the laser light from the light source to converge on any of the plurality of information recording surfaces of the recording medium;

a luminous flux splitting element which is divided in a direction perpendicular to a tangent line of an information track of the information recording surface of the recording medium, which has a central region including an optical axis of the laser light and a first end portion region and a second end portion region that sandwich the central region, and which splits the laser light reflected by any of the information recording surfaces of the recording medium into a luminous flux diffracted by the central region, a luminous flux diffracted by the first end portion region, and a luminous flux diffracted by the second end portion region;

a first light detector which receives a plurality of luminous fluxes split by the luminous flux splitting element and which outputs a plurality of signals in accordance with light intensities of the plurality of received luminous fluxes;

a plurality of waveform equalizers which impart different gains to the plurality of signals output from the first light detector in accordance with a frequency component of each signal;

an adder which adds up a plurality of signals output from the plurality of waveform equalizers and which outputs the added signals as an information signal; and a signal processing section which processes the information signal, wherein the central region is formed by a binary diffraction grating and generates ±1 order diffracted light from the laser light incident on the central region, the first end portion region is formed by a blazed diffraction grating and generates first +1 order diffracted light from the laser light incident on the first end portion region, the second end portion region is formed by a blazed diffraction grating and generates second +1 order diffracted light from the laser light incident on the second end portion region, and the first light detector receives both the ±1 order diffracted light generated by the central region, the first +1 order diffracted light generated by the first end portion region, and the second +1 order diffracted light generated by the second end portion region.

2. The optical information apparatus according to claim 1, wherein
diffraction pitches of the blazed diffraction gratings formed in the first end portion region and the second end portion region are larger than a diffraction pitch of the binary diffraction grating formed in the central region.

3. The optical information apparatus according to claim 1, wherein
diffraction efficiencies of the ±1 order diffracted light at the wavelength λ of the binary diffraction grating formed in the central region are respectively 30% or higher, and
diffraction efficiencies of the first and second +1 order diffracted light at the wavelength λ of the blazed diffraction gratings formed in the first end portion region and the second end portion region are respectively 80% or higher.

4. The optical information apparatus according to claim 1, further comprising a wobble signal generating section that generates a wobble signal by calculating a difference signal between a signal in accordance with light intensity of the first +1 order diffracted light generated by the first end portion region and a signal in accordance with light intensity of the second +1 order diffracted light generated by the second end portion region.

5. The optical information apparatus according to claim 1, wherein
the blazed diffraction gratings formed in the first end portion region and the second end portion region each have power of a convex lens.

6. The optical information apparatus according to claim 1, wherein
the luminous flux splitting element is further divided in a direction of the tangent line of the information track of the information recording surface of the recording medium, further includes a first adjustment region and a second adjustment region which sandwich the central region, the first end portion region, and the second end portion region, and further splits the laser light reflected by any of the information recording surfaces of the recording medium into a luminous flux diffracted by the first adjustment region and a luminous flux diffracted by the second adjustment region,
the first adjustment region is formed by a binary diffraction grating and generates ±1 order diffracted light from the laser light incident on the first adjustment region,
the second adjustment region is formed by a binary diffraction grating and generates ±1 order diffracted light from the laser light incident on the second adjustment region, and
the first light detector receives at least one of the ±1 order diffracted light having been diffracted by the first adjustment region and at least one of the ±1 order diffracted light having been diffracted by the second adjustment region, and outputs a signal in accordance with received light intensity.

7. The optical information apparatus according to claim 6, wherein
a diffraction pitch of the binary diffraction grating formed in the first adjustment region and a diffraction pitch of the binary diffraction grating formed in the second adjustment region are approximately equal to each other.

8. The optical information apparatus according to claim 1, wherein
the luminous flux splitting element includes a light shielding region having a transmittance of 10% or lower at the wavelength λ in the central region.

9. The optical information apparatus according to claim 1, wherein
the plurality of waveform equalizers impart gains to the plurality of signals output from the first light detector so that energy of a signal in accordance with light intensity of the laser light incident on the first end portion region and the second end portion region is greater than energy of a signal in accordance with light intensity of the laser light incident on the central region.

10. The optical information apparatus according to claim 1, wherein
the luminous flux splitting element is divided into two in a direction corresponding to a direction of the tangent line of the information track of the information recording surface of the recording medium, and includes a divided region and a tangential direction end portion region,
the divided region is divided into four in a direction perpendicular to the tangent line of the information track,
the central region includes two divided central regions positioned at a central portion of the divided region,
the first end portion region includes one of two radial direction end portion regions that sandwich the two divided central regions, and
the second end portion region includes the other of the two radial direction end portion regions that sandwich the two divided central regions.

11. The optical information apparatus according to claim 1, further comprising:
a second light detector which receives the laser light reflected by the information recording surface of the recording medium and which outputs a servo signal; and
a light branching element which branches the laser light reflected by the information recording surface of the recording medium into a first optical path on which the first light detector is arranged and a second optical path on which the second light detector is arranged, wherein
light intensity of the laser light branched by the light branching element and incident on the first optical path is greater than light intensity of the laser light branched by the light branching element and incident on the second optical path.

12. The optical information apparatus according to claim 11, further comprising a second luminous flux splitting element which is arranged on the second optical path and which splits the laser light reflected by the information recording surface of the recording medium into a plurality of luminous fluxes, wherein
the second light detector receives the plurality of luminous fluxes split by the second luminous flux splitting element and outputs a servo signal.

13. The optical information apparatus according to claim 11, wherein
the light branching element branches approximately 80% of the laser light reflected by the information recording surface of the recording medium into the first optical path and approximately 20% of the laser light reflected by the information recording surface of the recording medium into the second optical path.

14. An information processing apparatus comprising:
the optical information apparatus according to claim 1; and
an information processing section that processes information to be recorded on the optical information apparatus and/or information reproduced from the optical information apparatus.

* * * * *